United States Patent
Takashima et al.

(10) Patent No.: US 8,913,742 B2
(45) Date of Patent: Dec. 16, 2014

(54) CRYPTOGRAPHIC PROCESSING SYSTEM, KEY GENERATION DEVICE, ENCRYPTION DEVICE, DECRYPTION DEVICE, SIGNATURE PROCESSING SYSTEM, SIGNATURE DEVICE, AND VERIFICATION DEVICE

(75) Inventors: Katsuyuki Takashima, Tokyo (JP); Tatsuaki Okamoto, Tokyo (JP)

(73) Assignees: Mitsubishi Electric Corporation, Tokyo (JP); Nippon Telegraph and Telephone Corporation, Tokyo (JP)

( * ) Notice: Subject to any disclaimer, the term of this patent is extended or adjusted under 35 U.S.C. 154(b) by 166 days.

(21) Appl. No.: 13/640,885

(22) PCT Filed: Feb. 15, 2011

(86) PCT No.: PCT/JP2011/053174
§ 371 (c)(1), (2), (4) Date: Oct. 12, 2012

(87) PCT Pub. No.: WO2011/135895
PCT Pub. Date: Nov. 3, 2011

(65) Prior Publication Data
US 2013/0028415 A1    Jan. 31, 2013

(30) Foreign Application Priority Data
Apr. 27, 2010    (JP) .................. 2010-101657

(51) Int. Cl.
*H04L 9/08* (2006.01)
*H04L 9/30* (2006.01)
*H04L 9/32* (2006.01)

(52) U.S. Cl.
CPC ............ *H04L 9/0869* (2013.01); *H04L 9/0847* (2013.01); *H04L 9/3073* (2013.01); *H04L 9/3247* (2013.01)

USPC .......................................... 380/44

(58) Field of Classification Search
CPC .... H04L 9/0847; H04L 9/3073; H04L 9/0869
See application file for complete search history.

(56) References Cited

U.S. PATENT DOCUMENTS

| | | |
|---|---|---|
| 2012/0027210 A1 | 2/2012 | Takeuchi et al. |
| 2012/0030464 A1 | 2/2012 | Nishimaki et al. |
| 2012/0045056 A1 | 2/2012 | Takashima et al. |

FOREIGN PATENT DOCUMENTS

| | | |
|---|---|---|
| JP | 2007 235659 | 9/2007 |
| JP | 2010 273317 | 12/2010 |

(Continued)

OTHER PUBLICATIONS

Lewko, A., et al., "Fully Secure Functional Encryption: Attribute-Based Encryption and (Hierarchical) Inner Product Encryption," Cryptology ePrint Archive: Report 2010/110, Total 57 Pages (Mar. 9, 2010).

(Continued)

*Primary Examiner* — Nirav B Patel
*Assistant Examiner* — Mohammed Waliullah
(74) *Attorney, Agent, or Firm* — Oblon, Spivak, McClelland, Maier & Neustadt, L.L.P.

(57) ABSTRACT

The object is to provide a secure functional encryption scheme having a large number of cryptographic functions. An access structure is constituted by applying the inner-product of attribute vectors to a span program. The access structure has a degree of freedom in design of the span program and design of the attribute vectors, thus having a large degree of freedom in design of access control. A secure functional encryption process having a large number of cryptographic functions is implemented by employing the concept of secret sharing for the access structure.

15 Claims, 22 Drawing Sheets

(56) References Cited

FOREIGN PATENT DOCUMENTS

| WO | 2010 123114 | 10/2010 |
|---|---|---|
| WO | 2010 123122 | 10/2010 |

OTHER PUBLICATIONS

Waters, B., "Dual System Encryption: Realizing Fully Secure IBE and HIBE under Simple Assumptions," CRYPTO 2009, LNCS, vol. 5677, pp. 619-636, (2009).

Okamoto, T., et al., "Fully Secure Functional Encryption with General Relations from the Decisional Linear Assumption," ePrint Archive, Report 2010/563, Total 50 Pages, (Nov. 5, 2010).

Beimel, A., "Secure Schemes for Secret Sharing and Key Distribution," Israel Institute of Technology, Total 115 Pages, (1996).

Bethencourt, J., et al., "Ciphertext-Policy Attribute-Based Encryption," Proceedings of the 2007 IEEE Symposium on Security and Privacy, pp. 321-334, (2007).

Boneh, D., et al., "Efficient Selective-ID Secure Identity Based Encryption Without Random Oracles", EUROCRYPT 2004, LNCS, vol. 3027, Springer-Verlag, pp. 223-238, (2004).

Boneh, D., et al., "Secure Identity Based Encryption Without Random Oracles," CRYPTO 2004, LNCS, vol. 3152, pp. 443-459, (2004).

Boneh, D., et al., "Hierarchical Identity Based Encryption with Constant Size Ciphertext," EUROCRYPT 2005, LNCS, vol. 3494, pp. 440-456, (2005).

Boneh, D., et al., "Identity-Based Encryption from the Well Pairing," CRYPTO 2001, LNCS, vol. 2139, pp. 213-229 (2001).

Boneh, D., et al., "Generalized Identity Based and Broadcast Encryption Schemes," ASIACRYPT 2008, LNCS, vol. 5350, pp. 455-470, (2008).

Boneh, D., et al., "Improved Efficient for CCA-Secure Cryptosystems Built Using Identity-Based Encryption," RSA-CT 2005, LNCS, Total 16 Pages (2005).

Boneh, D., et al., "Conjunctive, Subset, and Range Queries on Encrypted Data," TCC 2007, LNCS, vol. 4392, pp. 535-554, (2007).

Boyen, X., et al., "Anonymous Hierarchical Identity-Based Encryption (Without Random Oracles)," CRYPTO 2006, LNCS, vol. 4117, pp. 290-307, (2006).

Canetti, R., et al., "Chosen-Ciphertext Security from Identity-Based Encryption," EUROCRYPT 2004, LNCS, Total 15 Pages, (2004).

Cocks, C., "An Identity Based Encryption Scheme Based on Quadratic Residues," IMAInt. Conf. LNCS, vol. 2260, pp. 360-363, (2001).

Gentry, C., "Practical Identity-Based Encryption Without Random Oracles," EUROCRYPT, LNCS, vol. 4004, pp. 445-464, (2006).

Gentry, C., et al., "Hierarchical Identity Based Encryption with Polynomially Many Levels," TCC 2009, LNCS, vol. 5444, pp. 437-456, (2009).

Gentry, C., et al., "Hierarchical ID-Based Cryptography," ASIACRYPT 2002, LNCS, vol. 2501, pp. 548-566, (2002).

Goyal, V., et al., "Attribute-Based Encryption for Fine-Grained Access Control of Encrypted Data," ACM Conference on Computer and Communication Security 2006, pp. 89-98, (2006).

Groth, J., et al., "Efficient Non-interactive Proof Systems for Bilinear Groups," EUROCRYPT 2008, LNCS, vol. 4965, pp. 415-432, (2008).

Horwitz, J., et al., "Toward Hierarchical Identity-Based Encryption," EUROCRYPT 2002, LNCS, vol. 2332, pp. 466-81, (2002).

Katz, J., et al., "Predicate Encryption Supporting Disjunctions, Polynomial Equations, and Inner Products," EUROCRYPT 2008, LNCS, vol. 4965, pp. 146-162, (2008).

Lewko, A., et al., "New Techniques for Dual System Encryption and Fully Secure HIBE with Short Ciphertexts," ePrint, IACR, Total 22 Pages, (2009).

Okamoto, T., "Homomorphic Encryption and Signatures from Vector Decomposition," Pairing 2008, LNCS, vol. 5209, pp. 57-64, (2008).

Okamoto, T., et al., "Hierarchical Predicate Encryption for Inner-Products," ASIACRYPT 2009, Total 18 Pages, (2009).

Ostrovsky, R., et al., "Attribute-Based Encryption with Non-Monotonic Access Structures," ACM Conference on Computer and Communication Security 2007, pp. 195-203, (2007).

Pirretti, M., et al., "Secure Attribute-Based Systems," ACM Conference on Computer and Communication Security 2006, pp. 99-112, (2006).

Sahai, A., et al., "Fuzzy Identity-Based Encryption," EUROCRYPT 2005, LNCS, vol. 3494, pp. 457-473, (2005).

Shi, E., et al., "Delegating Capabilities in Predicate Encryption Systems," ICALP (2) 2008, LNCS, vol. 5126, pp. 560-578, (2008).

Waters, B., "Efficient Identity-Based Encryption Without Random Oracles," Eurocrypt 2006, LNCS, No. 3152, pp. 443-459, (2005).

Waters, B., "Ciphertext-Policy Attribute-Based Encryption: An Expressive, Efficient, and Provably Secure Realization," ePrint, IACR, Total 30 Pages, (2008).

Galbraith, S.D., et al., "An analysis of the vector decomposition problem," PKC 2008, LNCS, vol. 4939, pp. 308-327, (2008).

Duursma, I., et al., "The Vector Decomposition Problem for Elliptic and Hyperelliptic Curves," J. Ramanujan Math Soc., vol. 20, Total 20 Pages, (2005).

Duursma, I.M., et al., "ElGamal type signature schemes for n-dimensional vector spaces," IACR ePrint, vol. 312, Total 13 Pages, (2006).

Yoshida, M., et al., "Vector Decomposition Problem and the Trapdoor Inseperable Multiplex Transmission Scheme based the Problem," SCIS, Total 6 Pages, (2003).

Yoshida, M., "Inseperable Multiplex Transmission Using the Pairing on Elliptic Curves and Its Application to Watermarking," Fifth Conference on Algebraic Geometry, Number theoru and Cryptography, Total 11 Pages, (2003).

Okamoto, T., et al., "A Geometric Approach on Pairings and Hierarchical Predicate Encryption," Total 1 Page, (2009).

International Search Report Issued Dec. 6, 2011 in PCT/JP11/53174 Filed Oct. 17, 2011.

U.S. Appl. No. 14/003,485, filed Sep. 6, 2013, Takashima, et al.

Fig. 3

$$s_0 = \underbrace{(1,\ldots,1)}_{r \text{ COLUMNS}} \begin{pmatrix} f_1, \ldots, f_r \end{pmatrix} = \sum_{k=1}^{r} f_k$$

Fig. 4

$$\vec{s}^T = \begin{pmatrix} M_{1,1} & M_{1,2} & \cdots & M_{1,r} \\ M_{2,1} & M_{2,2} & \cdots & M_{2,r} \\ & & \cdots & \\ M_{L,1} & M_{L,2} & \cdots & M_{L,r} \end{pmatrix} \begin{pmatrix} f_1, & \cdots & , f_r \end{pmatrix} = \begin{pmatrix} s_1, & \cdots & , s_r \end{pmatrix}$$

CRYPTOGRAPHIC PROCESSING SYSTEM, KEY GENERATION DEVICE, ENCRYPTION DEVICE, DECRYPTION DEVICE, SIGNATURE PROCESSING SYSTEM, SIGNATURE DEVICE, AND VERIFICATION DEVICE

TECHNICAL FIELD

The present invention relates to a functional encryption (FE) scheme.

BACKGROUND ART

Non-Patent Literatures 3 to 6, 10, 12, 13, 15, and 18 describe an ID (Identity)-based encryption (IBE) scheme which constitutes one class of the functional encryption scheme. Non-Patent Literatures 2, 7, 9, 16, 19, 23 to 26, and 28 describe an attribute-based encryption (ABE) scheme which constitutes another class of the functional encryption scheme.

CITATION LIST

Non-Patent Literature

Non-Patent Literature 1: Beimel, A., Secure schemes for secret sharing and key distribution. PhD Thesis, Israel Institute of Technology, Technion, Haifa, Israel, 1996

Non-Patent Literature 2: Bethencourt, J., Sahai, A., Waters, B.: ciphertext policy attribute-based encryption. In: 2007 IEEE Symposium on Security and Privacy, pp. 321•34. IEEE Press (2007)

Non-Patent Literature 3: Boneh, D., Boyen, X.: Efficient selective-ID secure identity based encryption without random oracles. In: Cachin, C., Camenisch, J. (eds.) EUROCRYPT 2004. LNCS, vol. 3027, pp. 223-38. Springer Heidelberg (2004)

Non-Patent Literature 4: Boneh, D., Boyen, X.: Secure identity based encryption without random oracles. In: Franklin, M. K. (ed.) CRYPTO 2004. LNCS, vol. 3152, pp. 443•59. Springer Heidelberg (2004)

Non-Patent Literature 5: Boneh, D., Boyen, X., Goh, E.: Hierarchical identity based encryption with constant size ciphertext. In: Cramer, R. (ed.) EUROCRYPT 2005. LNCS, vol. 3494, pp. 440•56. Springer Heidelberg (2005)

Non-Patent Literature 6: Boneh, D., Franklin, M.: Identity-based encryption from the Weil pairing. In: Kilian, J. (ed.) CRYPTO2001. LNCS, vol. 2139, pp. 213•29. Springer Heidelberg (2001)

Non-Patent Literature 7: Boneh, D., Hamburg, M.: Generalized identity based and broadcast encryption scheme. In: Pieprzyk, J. (ed.) ASIACRYPT 2008. LNCS, vol. 5350, pp. 455•70. Springer Heidelberg (2008)

Non-Patent Literature 8: Boneh, D., Katz, J., Improved efficiency for CCA-secure cryptosystems built using identity based encryption. RSA-CT 2005, LNCS, Springer Verlag (2005)

Non-Patent Literature 9: Boneh, D., Waters, B.: Conjunctive, subset, and range queries on encrypted data. In: Vadhan, S. P. (ed.) TCC 2007. LNCS, vol. 4392, pp. 535•54. Springer Heidelberg (2007)

Non-Patent Literature 10: Boyen, X., Waters, B.: Anonymous hierarchical identity-based encryption (without random oracles). In: Dwork, C. (ed.) CRYPTO 2006. LNCS, vol. 4117, pp. 290•07. Springer Heidelberg (2006)

Non-Patent Literature 11: Canetti, R., Halevi S., Katz J., Chosen-ciphertext security from identity-based encryption. EUROCRYPT2004, LNCS, Springer-Verlag (2004)

Non-Patent Literature 12: Cocks, C.: An identity based encryption scheme based on quadratic residues. In: Honary, B. (ed.) IMAInt. Conf. LNCS, vol. 2260, pp. 360•63. Springer Heidelberg (2001)

Non-Patent Literature 13: Gentry, C.: Practical identity-based encryption without random oracles. In: Vaudenay, S. (ed.) EUROCRYPT 2006. LNCS, vol. 4004, pp. 445•64. Springer Heidelberg (2006)

Non-Patent Literature 14: Gentry, C., Halevi, S.: Hierarchical identity-based encryption with polynomially many levels. In: Reingold, O. (ed.) TCC 2009. LNCS, vol. 5444, pp. 437•56. Springer Heidelberg (2009)

Non-Patent Literature 15: Gentry, C., Silverberg, A.: Hierarchical ID-based cryptography. In: Zheng, Y. (ed.) ASIACRYPT 2002. LNCS, vol. 2501, pp. 548•66. Springer Heidelberg (2002)

Non-Patent Literature 16: Goyal, V., Pandey, O., Sahai, A., Waters, B.: Attribute-based encryption for fine-grained access control of encrypted data. In: ACM Conference on Computer and Communication Security 2006, pp. 89•8, ACM (2006)

Non-Patent Literature 17: Groth, J., Sahai, A.: Efficient non-interactive proof systems for bilinear groups. In: Smart, N. P. (ed.) EUROCRYPT 2008. LNCS, vol. 4965, pp. 415•32. Springer Heidelberg (2008)

Non-Patent Literature 18: Horwitz, J., Lynn, B.: Towards hierarchical identity-based encryption. In: Knudsen, L. R. (ed.) EUROCRYPT 2002. LNCS, vol. 2332, pp. 466•81. Springer Heidelberg (2002)

Non-Patent Literature 19: Katz, J., Sahai, A., Waters, B.: Predicate encryption supporting disjunctions, polynomial equations, and inner products. In: Smart, N. P. (ed.) EUROCRYPT 2008. LNCS, vol. 4965, pp. 146•62. Springer Heidelberg (2008)

Non-Patent Literature 20: Lewko, A. B., Waters, B.: Fully secure HIBE with short ciphertexts. ePrint, IACR, http://eprint.iacr.org/2009/482

Non-Patent Literature 21: Okamoto, T., Takashima, K.: Homomorphic encryption and signatures from vector decomposition. In: Galbraith, S. D., Paterson, K. G. (eds.) Pairing 2008. LNCS, vol. 5209, pp 57•4. Springer Heidelberg (2008)

Non-Patent Literature 22: Okamoto, T., Takashima, K.: Hierarchical predicate encryption for Inner-Products, In: ASIACRYPT 2009, Springer Heidelberg (2009)

Non-Patent Literature 23: Ostrovsky, R., Sahai, A., Waters, B.: Attribute-based encryption with non-monotonic access structures. In: ACM Conference on Computer and Communication Security 2007, pp. 195•03, ACM (2007)

Non-Patent Literature 24: Pirretti, M., Traynor, P., McDaniel, P., Waters, B.: Secure attribute-based systems. In: ACM Conference on Computer and Communication Security 2006, pp. 99•12, ACM, (2006)

Non-Patent Literature 25: Sahai, A., Waters, B.: Fuzzy identity-based encryption. In: Cramer, R. (ed.) EUROCRYPT 2005. LNCS, vol. 3494, pp. 457•73. Springer Heidelberg (2005)

Non-Patent Literature 26: Shi, E., Waters, B.: Delegating capability in predicate encryption systems. In: Aceto, L., Damgard, I., Goldberg, L. A., Halldosson, M. M., Ingofsdotir, A., Walukiewicz, I. (eds.) ICALP (2) 2008. LNCS, vol. 5126, pp. 560•78. Springer Heidelberg (2008)

Non-Patent Literature 27: Waters, B.: Efficient identity based encryption without random oracles. Eurocrypt 2005, LNCS No. 3152, pp. 443•59. Springer Verlag, 2005.

Non-Patent Literature 28: Waters, B.: ciphertext-policy attribute-based encryption: an expressive, efficient, and provably secure realization. ePrint, IACR, http://eprint.iacr.org/2008/290

Non-Patent Literature 29: Waters, B.: Dual system encryption: Realizing fully secure IBE and HIBE under simple assumptions. In: Halevi, S. (ed.) CRYPTO 2009. LNCS, vol. 5677, pp. 619•36. Springer Heidelberg (2009)

SUMMARY OF INVENTION

Technical Problem

It is an object of the present invention to provide a secure functional encryption scheme having diversified cryptographic functions.

Solution to Problem

A cryptographic processing system according to the present invention includes a key generation device, an encryption device, and a decryption device, and serving to execute a cryptographic process using a basis $B_t$ and a basis $B^*_t$ for each integer $t=0, \ldots, d$ (d is an integer of 1 or more), wherein the key generation device includes a first information input part which takes as input, a variable $\rho(i)$ for each integer $i=1, \ldots, L$ (L is an integer of 1 or more), which variable $\rho(i)$ is either one of a positive tuple $(t, \vec{v}_i)$ and a negative tuple $\neg (t, \vec{v}_i)$ of identification information t (t is any one integer of $t=1, \ldots, d$) and an attribute vector $\vec{v}_i := (v_{i,i'})$ ($i'=1, \ldots, n_t$ where $n_t$ is an integer of 1 or more), and a predetermined matrix M having L rows and r columns (r is an integer of 1 or more), and a decryption key generation part which generates an element $k^*_0$, and an element $k^*_i$ for each integer $i=1 \ldots, L$, based on a column vector $\vec{s}^T := (s_1, \ldots, s_L)^T := M \cdot \vec{f}^T$ generated based on a vector $\vec{f}$ and a vector each having r pieces of elements, and the matrix M inputted by the first information input part; a value $s_0 := \vec{w} \cdot \vec{f}^T$; and a predetermined value $\theta_i$ ($i=1, \ldots, L$), the decryption key generation part being configured to generate the element $k^*_0$ by setting a value $-s_0$ as a coefficient for a basis vector $b^*_{0,p}$ (p is a predetermined value) of the basis $B^*_0$ and by setting a predetermined value $\kappa$ as a coefficient for a basis vector $b^*_{0,q}$ (q is a predetermined value different from prescribed p), and to generate the element $k^*_i$ for each integer $i=1, \ldots, L$, when the variable $\rho(i)$ is a positive tuple $(t, \vec{v}_i)$, by setting $s_i + \theta_i v_{i,1}$ as a coefficient for a basis vector $b^*_{t,1}$ of the basis $B^*_t$ indicated by identification information t of the positive tuple, and by setting $\theta_i v_{i,i'}$ as a coefficient for a basis vector $b^*_{t,i'}$ indicated by the identification information t and each integer $i'=2, \ldots, n_t$, and when the variable $\rho(i)$ is a negative tuple $\neg (t, \vec{v}_i)$, by setting $s_i v_{i,i'}$ as a coefficient for the basis vector indicated by the identification information t of the negative tuple and by each integer $i'=1, \ldots, n_t$, wherein the encryption device includes a second information input part which takes as input, an attribute set $\Gamma$ having the identification information t and an attribute vector $\vec{x}_t := (x_{t,i'})$ ($i'=1, \ldots, n_t$ where $n_t$ is an integer of 1 or more) for at least one integer $t=1, \ldots, d$, and an encrypted data generation part which generates an element $c_0$, and an element $c_t$ concerning each identification information t included in the attribute set $\Gamma$, based on the attribute set $\Gamma$ inputted by the second information input part, the encrypted data generation part being configured to generate the element $c_0$ where a random value $\delta$ is set as a coefficient for a basis vector $b_{0,p}$ (p is prescribed p) of a basis $B_0$, and where a predetermined value is set as a coefficient for a basis vector $b_{0,q}$ (q is prescribed q) of a basis $B_0$, and to generate the element $c_t$ where $x_{t,i'}$ multiplied by the random value $\delta$ is set as a coefficient for a basis vector $b_{t,i'}$ ($i'=1, \ldots, n_t$) of the basis $B_t$ for each identification information t included in the attribute set $\Gamma$, and wherein the decryption device includes a data acquisition part which acquires encrypted data c including the elements $c_0$ and $c_t$, and the attribute set $\Gamma$, the elements $c_0$ and $c_t$ being generated by the encrypted data generation part, a decryption key acquisition part which acquires a decryption key $sk_s$ including the elements $k^*_0$ and $k^*_i$ and the variable number $\rho(i)$, the elements $k^*_0$ and $k^*_i$ being generated by the decryption key generation part, a complementary coefficient calculation part which, based on the attribute set $\Gamma$ included in the encrypted data c acquired by the data acquisition part, and the variable $\rho(i)$ included in the decryption key $sk_s$ acquired by the decryption key acquisition part, specifies, among integers $i=1, \ldots, L$, a set I of an integer i for which the variable $\rho(i)$ is a positive tuple $(t, \vec{v}_i)$ and with which an inner-product of $\vec{v}_i$ of the positive tuple and $\vec{x}_t$ included in $\Gamma$ indicated by identification information t of the positive tuple becomes 0, and an integer i for which the variable $\rho(i)$ is a negative tuple $\neg (t, \vec{v}_i)$ and with which an inner-product of $\vec{v}_i$ of the negative tuple and $\vec{x}_t$ included in $\Gamma$ indicated by identification information t of the negative tuple does not become 0; and calculates a complementary coefficient $\alpha_i$ with which a total of $\alpha_i s_i$ for i included in the set I specified becomes $s_0$, and a pairing operation part which calculates a value $K = g_T^{\zeta \kappa}$ by conducting a pairing operation indicated in Formula 1 for the elements $c_0$ and $c_t$ included in the encrypted data c and the elements $k^*_0$ and $k^*_i$ included in the decryption key $sk_s$, based on the set I specified by the complementary coefficient calculation part and on the complementary coefficient $\alpha_i$ calculated by the complementary coefficient calculation part.

$$K := e(c_0, k^*_0) \cdot \prod_{i \in I \wedge \rho(i) = (t, \vec{v}_i)} e(c_t, k^*_i)^{\alpha_i} \cdot \prod_{i \in I \wedge \rho(i) = \neg(t, \vec{v}_i)} e(c_t, k^*_i)^{\alpha_i / (\vec{v}_i \cdot \vec{x}_i)}$$ [Formula 1]

Advantageous Effects of Invention

The cryptographic processing system according to the present invention implements a large number of cryptographic functions, and implements functional encryption by employing a span program and an inner-product predicate. Also, this cryptographic processing system is more secure than a conventional functional encryption scheme.

BRIEF DESCRIPTION OF DRAWINGS

[FIG. 3] is an explanatory drawing of $s_0$.
[FIG. 4] is an explanatory drawing of $\vec{s}^T$.

DESCRIPTION OF EMBODIMENTS

Figure 1:
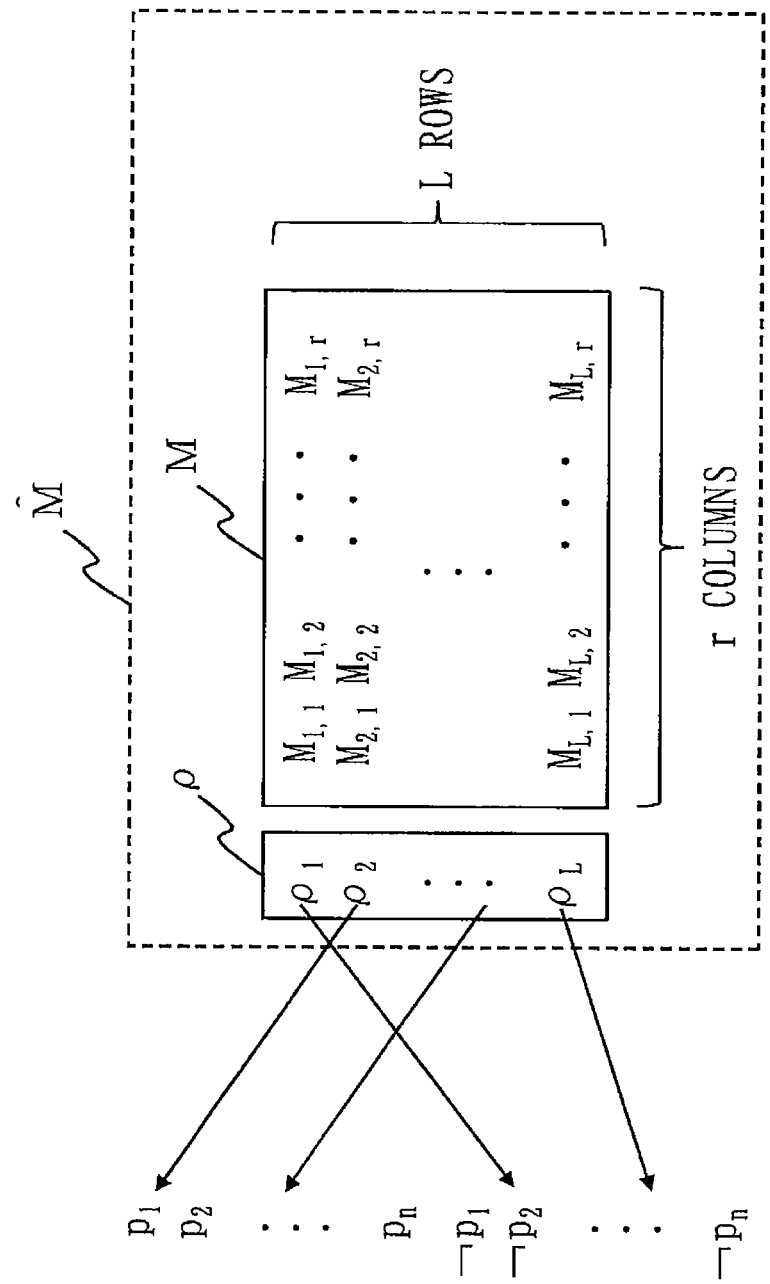
[FIG. 1] is an explanatory drawing of a matrix $M^{\wedge}$.

Embodiments of the present invention will be described hereinafter with reference to the accompanying drawings.

In the following description, the processing device is, for example, a CPU 911 (to be described later). The storage device is, for example, a ROM 913, a RAM 914, or a magnetic disk 920 (each will be described later). The communication device is, for example, a communication board 915 (to be described later). The input device is, for example, a keyboard 902 or the communication board 915 (to be described later). Namely, the processing device, the storage device, the communication device, and the input device are hardware.

The notation in the following description will be explained.

When A is a random variable or distribution, Formula 101 denotes that y is randomly selected from A according to the distribution of A. Namely, in Formula 101, y is a random number.

$$y \xleftarrow{R} A \quad \text{[Formula 101]}$$

When A is a set, Formula 102 denotes that y is uniformly selected from A. Namely, in Formula 102, y is a uniform random number.

$$y \xleftarrow{U} A \quad \text{[Formula 102]}$$

Formula 103 denotes that y is a set, defined or substituted by z.

$$y := z \quad \text{[Formula 103]}$$

When a is a fixed value, Formula 104 denotes an event that a machine (algorithm) A outputs a on input x.

$$A(x) \to a \quad \text{[Formula 104]}$$

For example, $$A(x) \to 1$$

Formula 105, namely, $F_q$, denotes a finite field of order q.

[Formula 105] $\mathbb{F}_q$

A vector symbol denotes a vector representation over the finite field $F_q$. Namely, Formula 106 is established.

$\vec{x}$ denotes $$(x_1, \ldots, x_n) \in \mathbb{F}_q^n \quad \text{[Formula 106]}$$

Formula 107 denotes the inner-product, indicated by Formula 109, of two vectors $\vec{x}$ and $\vec{y}$ indicated in Formula 108.

$$\vec{x} \cdot \vec{v} \quad \text{[Formula 107]}$$

$$\vec{x} = (x_1, \ldots, x_n),$$

$$\vec{v} = (v_1, \ldots, v_n) \quad \text{[Formula 108]}$$

$$\sum_{i=1}^{n} x_i v_i \quad \text{[Formula 109]}$$

Note that $X^T$ denotes the transpose of matrix M.

When $b_i$ (i=1, ..., n) is an element of a vector of a space V, namely, when Formula 110 is established, Formula 111 denotes a subspace generated by Formula 112.

$$b_i \in \mathbb{V} \ (i=1, \ldots, n) \quad \text{[Formula 110]}$$

$$\text{span}\langle b_1, \ldots, b_n\rangle \subseteq \mathbb{V} \ (\text{resp. span}\langle \vec{x}_1, \ldots, \vec{x}_n\rangle) \quad \text{[Formula 111]}$$

$$b_1, \ldots, b_n (\text{resp. } \vec{x}_1, \ldots, \vec{x}_n) \quad \text{[Formula 112]}$$

Note that for bases B and B* indicated in Formula 113, Formula 114 is established.

$$\mathbb{B} := (b_1, \ldots, b_N),$$

$$\mathbb{B}^* := (b_1^*, \ldots, b_N^*) \quad \text{[Formula 113]}$$

$$(x_1, \ldots, x_N)_{\mathbb{B}} := \sum_{i=1}^{N} x_i b_i,$$

$$(y_1, \ldots, y_N)_{\mathbb{B}^*} := \sum_{i=1}^{N} y_i b_i^* \quad \text{[Formula 114]}$$

In the following description, when "nt" is indicated to include a subscript or superscript, nt is $n_t$. Likewise, when "Vt" is indicated to include a subscript or superscript, Vt is $V_t$. Likewise, when "δi,j" is indicated to include a superscript, δi,j is $\delta_{i,j}$.

When "→" indicating a vector is attached to a subscript or superscript, "→" is attached as a superscript to the subscript or superscript.

When B0 or Bd+1 representing a basis is indicated to include a subscript, B0 or Bd+1 represents $B_0$ or $B_{d+1}$. Likewise, when B*0 or B*d+1 representing a basis is indicated to include a subscript, B*0 or B*d+1 represents $B^*_0$ or $B^*_{d+1}$.

In the following description, a cryptographic process includes a key generation process, an encryption process, and a decryption process, and a signature process includes a key generation process, a signature process, and a verification process.

Embodiment 1

This embodiment describes a basic concept for implementing the "functional encryption scheme" to be described in the following embodiments, and one structure of the functional encryption.

First, the functional encryption will be briefly explained.

Second, a space having a rich mathematical structure called "dual pairing vector spaces (DPVS)" which is a space for implementing the functional encryption will be described Third, a concept for implementing the functional encryption will be described. Here, "span program", "the inner-product of attribute vectors, and an access structure", and "secret distribution scheme (secret sharing scheme)" will be described.

Fourth, a "functional encryption scheme" according to this embodiment will be described. In this embodiment, a "key-policy functional encryption (KP-FE) scheme" will be described. Initially, the basic structure of the "key-policy functional encryption scheme" will be described. Subsequently, the basic structure of a "cryptographic processing system 10" which implements the "key-policy functional encryption scheme" will be described. Then, a "key-policy functional encryption scheme" and a "cryptographic processing system 10" according to this embodiment will be described in detail.

<1. Functional Encryption Scheme>

The functional encryption scheme is an encryption scheme that provides more sophisticated and flexible relations between an encryption key (ek) and a decryption key (dk).

According to the functional encryption scheme, an attribute x and an attribute y are set in an encryption key and a decryption key, respectively. A decryption key $dk_v := (dk, v)$ can decrypt a ciphertext encrypted with an encryption key $ek_x := (ek, x)$ only if $R(x, v)$ holds for relation R.

The functional encryption scheme has various applications in the areas of access control of databases, mail services, contents distribution, and the like (see Non-Patent Literatures 2, 7, 9, 16, 19, 23 to 26, and 28).

When R is an equality relation, that is, when $R(x, v)$ holds only if $x=v$, the functional encryption scheme is the ID-based encryption scheme.

As a more general class of functional encryption scheme than the ID-based encryption scheme, attribute-based encryption schemes have been proposed.

According to the attribute-based encryption schemes, each attribute which is set for an encryption key and decryption key is a tuple of attributes. For example, attributes which are set for an encryption key and decryption key are $X:=(x_1, \ldots, x_d)$ and $V:=(v_1, \ldots, v_d)$, respectively.

The component-wise equality relations for attribute components (e.g., $\{x_t = v_t\}_{t \in \{1, \ldots, d\}}$) are input to an access structure S, and $R(X, V)$ holds if and only if the input is accepted by the access structure S. Namely, the ciphertext encrypted with the encryption key can be decrypted with the decryption key.

If the access structure S is embedded into the decryption key $dk_v$, the attribute-based encryption (ABE) scheme is called key-policy ABE (KP-ABE). If the access structure S is embedded into a ciphertext, the attribute-based encryption (ABE) scheme is called ciphertext-policy ABE (CP-ABE).

Inner-product encryption (IPE) described in Non-Patent Literature 19 is also a class of functional encryption, where each attribute for the encryption key and decryption key is a vector over a field or ring. For example, $\vec{x} := (x_1, \ldots, x_n) \in F_q^n$ and $\vec{v} := (v_1, \ldots, v_n) \in F_q^n$ are set for the encryption key and decryption key. $R(\vec{x}, \vec{v})$ holds if and only if $\vec{x} \cdot \vec{v} = 0$.

<2. Dual Pairing Vector Spaces>

First, symmetric bilinear pairing groups will be described.

The symmetric bilinear pairing groups $(q, G, G^T, g, e)$ are a tuple of a prime q, a cyclic additive group G of order q and a cyclic multiplicative group $G^T$ of order q, $g \neq 0 \in G$, and a polynomial-time computable nondegenerate bilinear pairing $e: G \times G \to G_T$. The nondegenerate bilinear pairing signifies $e(sg, tg) = e(g, g)^{st}$, and $e(g, g) \neq 1$.

In the following description, let Formula 115 be an algorithm that takes input $1^\lambda$ and outputs a value of a parameter $param_G := (q, G, G_T, g, e)$ of bilinear pairing groups with a security parameter $\lambda$.

$$\mathcal{G} \qquad \text{[Formula 115]}$$

Dual pairing vector spaces will now be described.

Dual pairing vector spaces $(q, V, G_T, A, e)$ can be constituted by a direct product of symmetric bilinear pairing groups $(param_G := (q, G, G_T, g, e))$. The dual pairing vector spaces $(q, V, G_T, A, e)$ are a tuple of a prime q, an N-dimensional vector space V over $F_q$ indicated in Formula 116, a cyclic group $G_T$ of the order q, and a canonical basis $A := (a_1, \ldots, a_N)$ of the space V, and have the following operations (1) and (2) where $a_i$ is as indicated in Formula 117.

$$\mathbb{V} := \overbrace{\mathbb{G} \times \ldots \times \mathbb{G}}^{N} \qquad \text{[Formula 116]}$$

$$a_i := (\overbrace{0, \ldots, 0}^{i-1}, g, \overbrace{0, \ldots, 0}^{N-i}) \qquad \text{[Formula 117]}$$

Operation (1): Nondegenerate Bilinear Pairing

The pairing on the space V is defined by Formula 118.

$$e(x, y) := \Pi_{i=1}^N e(G_i, H_i) \in \mathbb{G}$$

where $(G_1, \ldots, G_N) := x \in \mathbb{V}$ $(H_1, \ldots, H_N) := y \in \mathbb{V}$ This is nondegenerate bilinear, i.e., $e(sx, ty) = e(s, y)^{st}$ and if $e(x, y) = 1$ for all $y \in V$, then $x = 0$. For all i and j, $e(a_i, a_j) = e(g, g)^{\delta_{i,j}}$ where $\delta_{i,j} = 1$ if $i = j$, and $\delta_{i,j} = 0$ if $i \neq j$. Also, $e(g, g) \neq 1 \in G_T$.

Operation (2): Distortion Maps

Linear transformation $\phi_{i,j}$ on the space V indicated in Formula 119 can achieve Formula 120.

$$\phi_{i,j}(a_j) = a_i, \qquad \text{[Formula 119]}$$

if $k \neq j$ then $\phi_{i,j}(a_k) = 0$ $$\phi_{i,j}(x) := (\overbrace{0, \ldots, 0}^{i-1}, g_j, \overbrace{0, \ldots, 0}^{N-i}) \qquad \text{[Formula 120]}$$

Note that $(g_1, \ldots g_N) := x$

Linear transformation $\phi_{i,j}$ will be called "distortion maps".

In the following description, let Formula 121 be an algorithm that takes as input, $1^\lambda$ ($\lambda \in$ natural number), N$\in$ natural number, and the value of the parameter $param_G := (q, G, G_T, g, e)$ of bilinear pairing groups, and outputs the value of a parameter $param_v := (q, V, G_T, A, e)$ of dual pairing vector spaces which have a security parameter $\lambda$ and which form an N-dimensional space V.

$$\mathcal{G} \qquad \text{[Formula 121]}$$

A case will be described where dual pairing vector spaces are constructed from the symmetric bilinear pairing groups described above. Dual pairing vector spaces can be constructed from asymmetric bilinear pairing groups as well. The following description can be easily applied to a case where dual pairing vector spaces are constructed from asymmetric bilinear pairing groups.

<3. Concept for Implementing Functional Encryption>
<3-1. Span Program>

FIG. 1 is an explanatory drawing of a matrix M^.

Let $\{p_1, \ldots, p_n\}$ be a set of variables. M^:=(M, ρ) is a labeled matrix where the matrix M is a (L rows×r columns) matrix over $F_q$, and ρ is a label of the row of the matrix M and is related to one of literals $\{p_1, \ldots, p_n, \neg p_1, \ldots, \neg p_n\}$. A label $\rho_i$ (i=1, . . . , L) of every rows of M is related to one of the literals, namely, $\rho: \{1, \ldots, L\} \to \{p_1, \ldots, p_n, \neg p_1, \ldots, \neg p_n\}$.

For every input sequence $\delta \in \{0, 1\}^n$, a submatrix $M_\delta$ of the matrix M is defined. The matrix $M_\delta$ is a submatrix consisting of those rows of the matrix M, whose labels ρ are related to a value "1" by the input sequence δ. Namely, the matrix $M_\delta$ is a submatrix consisting of the rows of the matrix M which are related to $p_i$ with which $\delta_i=1$ and the rows of the matrix M which are related to $\neg p_i$ with which $\delta_i=0$.

Figure 2:
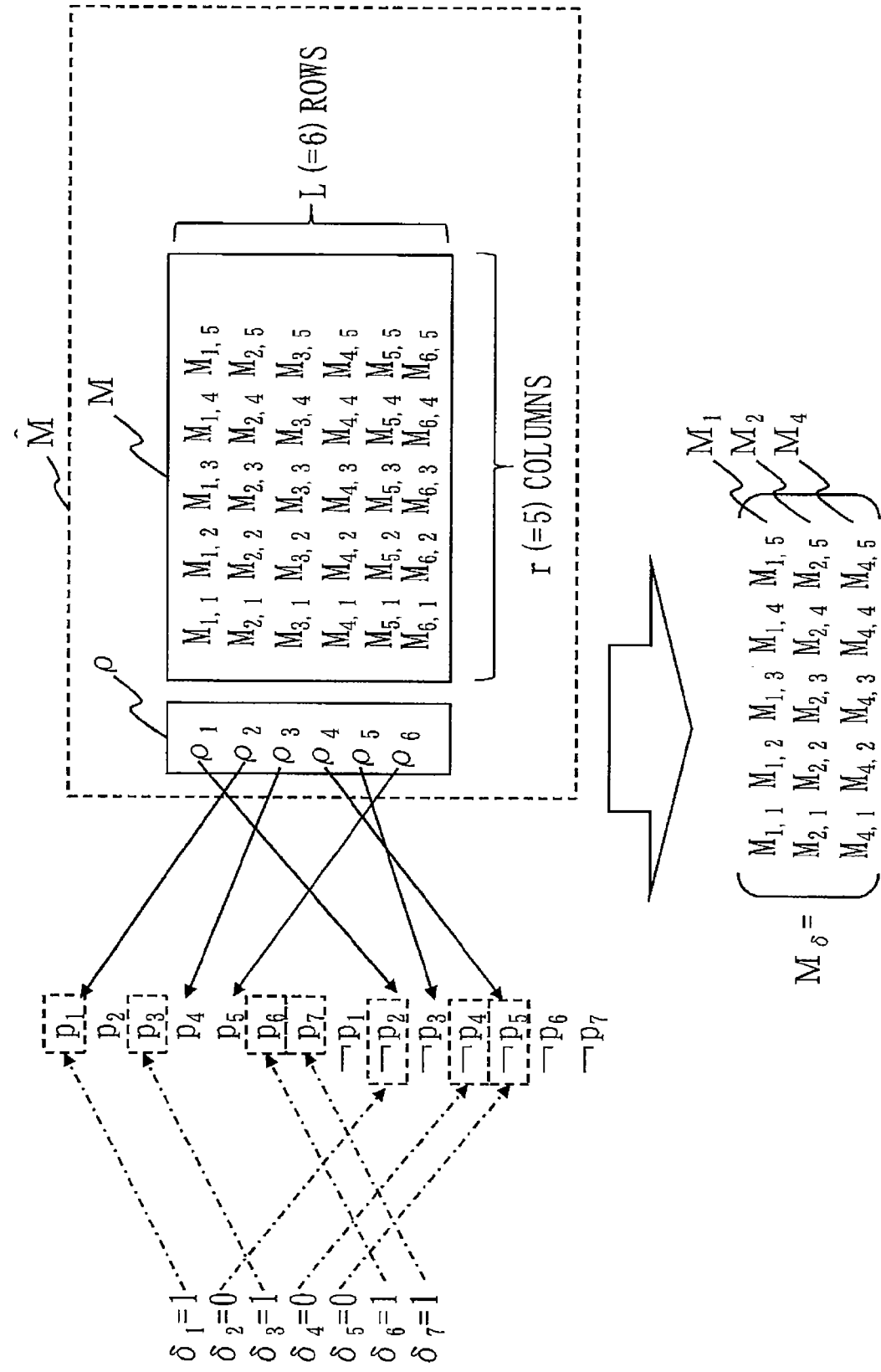
[FIG. 2] is an explanatory drawing of a matrix $M_\delta$.

FIG. 2 is an explanatory drawing of the matrix $M_\delta$. Note that in FIG. 2, n=7, L=6, and r=5. That is, the set of variables is $\{p_1, \ldots, p_7\}$, and the matrix M is a (6 rows×5 columns) matrix. In FIG. 2, assume that the labels ρ are related such that $\rho_1$ corresponds to $\neg p_2$, $\rho_2$ to $p_1$, $\rho_3$ to $p_4$, $\rho_4$ to $\neg p_5$, $\rho_5$ to $\neg_3$, and $\rho_6$ to $\neg p_5$.

Assume that in an input sequence $\delta \in \{0,1\}^7$, $\delta_1=1$, $\delta_2=0$, $\delta_3=1$, $\delta_4=0$, $\delta_5=0$, $\delta_6=1$, and $\delta_7=1$. In this case, a submatrix consisting of the rows of the matrix M which are related to literals ($p_1, p_3, p_6, p_7, \neg p_2, \neg p_4, \neg p_5$) surrounded by broken lines is the matrix $M_\delta$. That is, the submatrix consisting of the 1st row ($M_1$), 2nd row ($M_2$), and 4th row ($M_4$) of the matrix M is the matrix $M_\delta$.

In other words, when map $\gamma: \{1, \ldots, L\} \to \{0, 1\}$ is $[\rho(j)=p_i] \wedge [\delta_i=1]$ or $[\rho(j)=\neg p_i] \wedge [\delta_i=0]$, then $\gamma(j)=1$; otherwise $\gamma(j)=0$. In this case, $M_\delta:=(M_j)_{\gamma(j)=1}$. Note that $M_j$ is the j-th row of the matrix M.

That is, in FIG. 2, map $\gamma(j)=1$ (j=1, 2, 4), so map $\gamma(j)=0$ (j=3, 5, 6). Hence, $(M_j)_{\gamma(j)=1}$ is $M_1$, $M_2$, and $M_4$, and the matrix Mδ.

More specifically, whether or not the i-th row of the matrix M is included in the matrix $M_\delta$ is determined by whether the value of the map $\gamma(j)$ is "0" or "1".

The span program M^ accepts an input sequence δ if and only if $1^{\to} \in \text{span} < M_\delta >$, and rejects the input sequence δ otherwise. Namely, the span program M^ accepts an input sequence δ if and only if linear combination of the rows of the matrix $M_\delta$ which are obtained from the matrix ^ by the input sequence δ gives $1^{\to}$. $1^{\to}$ is a row vector which has a value "1" in each element.

For example, in FIG. 2, the span program M^ accepts an input sequence δ if and only if linear combination of the respective rows of the matrix $M_\delta$ consisting of the 1st, 2nd, and 4th rows of the matrix M gives $1^{\to}$. That is, if there exist $\alpha_1$, $\alpha_2$, and $\alpha_4$ with which $\alpha_1(M_1)+\alpha_2(M_2)+\alpha_4(M_4)=1^{\to}$, the span program M^ accepts an input sequence δ.

A span program is called monotone if the labels ρ are related to only positive literals $\{p_1, \ldots, p_N\}$. A span program is called non-monotone if the labels ρ are related to the literals $\{p_1, \ldots, p_n, \neg p_1, \ldots, \neg p_n\}$. Suppose that the span program is non-monotone. An access structure (non-monotone access structure) is constituted using the non-monotone span program. Briefly, an access structure controls access to encryption, namely, it controls whether a ciphertext is to be decrypted or not.

Because the span program is not monotone but non-monotone, the application of the functional encryption schemes constituted using the span program widens. This will be described later in detail.

<3-2. Inner-Products of Attribute Vectors and Access Structure>

Map $\gamma(j)$ described above will be calculated using the inner-products of attribute vectors. Namely, which row of the matrix M is to be included in the matrix $M_\delta$ will be determined using the inner-products of the attribute vectors.

$U_t$ (t=1, . . . , d and $U_t \subset \{0, 1\}^*$) is a sub-universe and an attribute set. Each $U_t$ includes identification information (t) of the sub-universe and $n_t$-dimensional vector ($v^{\to}$). Namely, $U_t$ is (t, $v^{\to}$) where $t \in \{1, \ldots, d\}$ and $v^{\to} \in F_q^{nt}$.

Let $U_t:=(t, v^{\to})$ be a variable ρ of a span program M^:=(M, ρ), that is, $p:=(t, v^{\to})$. Let a span program M^:=(M, ρ) having a variable $(p:=(t, v^{\to}), (t', v'^{\to}), \ldots)$ be an access structure S.

That is, the access structure S:=(M, ρ), and $\rho:=\{1, \ldots, L\} \to \{(t, v^{\to}), (t', v'^{\to}), \ldots, \neg(t, v^{\to}), \neg(t', v'^{\to}), \ldots\}$.

Let Γ be an attribute set, that is, $\Gamma:=\{(t, x^{\to}_t) | x^{\to}_t \in F_q^{nt}, 1 \leq t \leq d\}$.

When Γ is given to the access structure S, map $\gamma: \{1, \ldots, L\} \to \{0, 1\}$ for the span program M^:=(M, ρ) is defined as follows. For each integer i=1, . . . , L, set $\gamma(j)=1$ if $[\rho(i)=(t, v^{\to}_i)] \wedge [(t, x^{\to}_t) \in \Gamma] \wedge [v^{\to}_i \cdot x^{\to}_t=0]$ or $[\rho(i)=\neg(t, v^{\to}_i)] \wedge [(t, x^{\to}_t) \in \Gamma] \wedge [v^{\to}_i \cdot x^{\to}_t \neq 0]$. Set $\gamma(j)=0$ otherwise.

Namely, the map γ is calculated based on the inner-product of the attribute vectors $v^{\to}$ and $x^{\to}$. As described above, which row of the matrix M is to be included in the matrix $M_\delta$ is determined by the map γ. More specifically, which row of the matrix M is to be included in the matrix $M_\delta$ is determined by the inner-product of the attribute vectors $v^{\to}$ and $x^{\to}$. The access structure S:=(M, ρ) accepts Γ if and only if $1^{\to} \in \text{span} < (M_i)_{\gamma(i)=1} >$.

<3-3. Secret Sharing Scheme>

A secret sharing scheme for the access structure S:=(M, ρ) will be described.

The secret sharing scheme is letting secret information be shared to render it nonsense shared information. For example, secret information s is let to be shared among 10 lumps to generate 10 pieces of shared information. Each of the 10 pieces of shared information does not have information on the secret information s. Hence, even when certain one piece of shared information is obtained, no information can be obtained on the secret information s. On the other hand, if all of the 10 pieces of shared information are obtained, the secret information s can be recovered.

Another secret sharing scheme is also available according to which even when all of the 10 pieces of shared information cannot be obtained, if one or more, but not all, (for example, 8 pieces) of shared information can be obtained, then the secret information can be recovered. A case like this where the secret information s can be recovered using 8 out of 10 pieces of shared information will be called 8-out-of-10. That is, a case where the secret information s can be recovered using t out of n pieces of shared information will be called t-out-of-n. This t will be called a threshold.

Also, still another secret sharing scheme is available according to which when 10 pieces of shared information $d_1, \ldots, d_{10}$ are generated, the secret information s can be recovered if 8 pieces of shared information $d_1, \ldots, d_8$ are given, but cannot if 8 pieces of shared information $d_3, d_{10}$ are given. Namely, there is a secret sharing scheme with which whether or not the secret information s can be recovered is controlled not only by the number of pieces of shared information obtained but also depending on the combination of the shared information.

FIG. 3 is an explanatory drawing of $s_0$. FIG. 4 is an explanatory drawing of $\vec{s}^T$.

Let a matrix M be a (L rows×r columns) matrix. Let $\vec{f}$ a column vector indicated in Formula 122.

$$\vec{f}^T := (f_1, \ldots f_r)^T \xleftarrow{U} \mathbb{F}_q^r \qquad \text{[Formula 122]}$$

Let $s_0$ indicated in Formula 123 be secret information to be shared.

$$s_0 := \vec{1} \cdot \vec{f}^T := \Sigma_{k=1}^r f_k \qquad \text{[Formula 123]}$$

Let $\vec{s}^T$ indicated in Formula 124 be the vector of L pieces of shared information of $s_0$.

$$\vec{s}^T := (s_1, \ldots s_L)^T := M \cdot \vec{f}^T \qquad \text{[Formula 124]}$$

Let the shared information $s_i$ belong to $\rho(i)$.

If the access structure S:=(M, $\rho$) accepts $\Gamma$, that is, $\vec{1} \in \text{span}\langle(M_i)_{\gamma(i)=1}\rangle$ for $\gamma: \{1, \ldots, L\} \to \{0, 1\}$, then there exist constants $\{\alpha_i \in \mathbb{F}_q | i \in I\}$ such that $I \subseteq \{i \in \{1, \ldots, L\} | \gamma(i)=1\}$.

This is obvious from the explanation on FIG. 2 in that if there exist $\alpha_1$, $\alpha_2$, and $\alpha_4$ with which $\alpha_1(M_1)+\alpha_2(M_2)+\alpha_4(M_4)=\vec{1}$, the span program M^ accepts an input sequence $\delta$. Namely, if the span program M^ accepts an input sequence $\delta$ when there exist $\alpha_1$, $\alpha_2$, and $\alpha_4$ with which $\alpha_1(M_1)+\alpha_2(M_2)+\alpha_4(M_4)=\vec{1}$, then there exist $\alpha_1$, $\alpha_2$, and $\alpha_4$ with which $\alpha_1(M_1)+\alpha_2(M_2)+\alpha_4(M_4)=\vec{1}$.

Note Formula 125.

$$\Sigma_{i \in I} \alpha_i s_i := s_0 \qquad \text{[Formula 125]}$$

Note that the constants $\{\alpha_i\}$ can be computed in time polynomial in the size of the matrix M.

With the functional encryption scheme according to this and the following embodiments, the access structure is constructed by applying the inner-product predicate and the secret sharing scheme to the span program, as described above. Therefore, access control can be designed freely by designing the matrix M in the span program and the attribute information x and the attribute information v (predicate information) in the inner-product predicate. Namely, access control can be designed with a very high degree of freedom. Designing of the matrix M corresponds to designing conditions such as the threshold of the secret sharing scheme.

For example, the attribute-based encryption scheme described above corresponds to a case, in the access structure in the functional encryption scheme according to this and the following embodiments, where designing of the inner-product predicate is limited to a certain condition. That is, when compared to the access structure in the functional encryption scheme according to this and the following embodiments, the access structure in the attribute-based encryption scheme has a lower degree of freedom in access control design because it lacks the degree of freedom in designing the attribute information x and the attribute information v (predicate information) in the inner-product predicate. More specifically, the attribute-based encryption scheme corresponds to a case where attribute information $\{\vec{x}_t\}_{t \in \{1, \ldots, d\}}$ and $\{\vec{v}_t\}_{t \in \{1, \ldots, d\}}$ are limited to two-dimensional vectors for the equality relation, for example, $\vec{x}_t := (1, x_t)$ and $\vec{v}_t := (v_t, -1)$.

The inner-product predicate encryption scheme described above corresponds to a case, in the access structure in the functional encryption scheme according to this and the following embodiments, where designing of the matrix M in the span program is limited to a certain condition. That is, when compared to the access structure in the functional encryption scheme according to this and the following embodiments, the access structure in the inner-product predicate encryption scheme has a lower degree of freedom in access control design because it lacks the degree of freedom in designing the matrix M in the span program. More specifically, the inner-product predicate encryption scheme corresponds to a case where the secret sharing scheme is limited to 1-out-of-1 (or d-out-of-d).

In particular, the access structure in the functional encryption scheme according to this and the following embodiments constitutes a non-monotone access structure that uses a non-monotone span program. Thus, the degree of freedom in access control designing improves.

More specifically, since the non-monotone span program includes a negative literal ($\neg$ p), a negative condition can be set. For example, assume that First Company includes four departments of A, B, C, and D. Assume that access control is to be performed that only the users belonging to departments other than B department of First Company are capable of access (capable of decryption). In this case, if a negative condition cannot be set, a condition that "the user belongs to any one of A, C, and D departments of First Company" must be set. On the other hand, if a negative condition can be set, a condition that "the user is an employee of First Company and belongs to a department other than department B" can be set. Namely, since a negative condition can be set, natural condition setting is possible. Although the number of departments is small in this case, this scheme is very effective in a case where the number of departments is large.

<4. Basic Structure of Functional Encryption Scheme>
<4-1. Basic Structure of Key-Policy Functional Encryption Scheme>

The structure of a key-policy functional encryption scheme will be briefly described. Note that key-policy means that policy is embedded in the decryption key, that is, an access structure is embedded in the decryption key.

The key-policy functional scheme consists of four algorithms: Setup, KeyGen, Enc, and Dec.

(Setup)

A Setup algorithm is a randomized algorithm that takes as input a security parameter $\lambda$ and an attribute format $\vec{\mu} := (d; n_1, \ldots, n_d)$, and outputs public parameters pk and a master key sk.

(KeyGen)

A KeyGen algorithm is a randomized algorithm that takes as input an access structure S:=(M, $\rho$), the public parameters pk, and the master key sk, and outputs a decryption key $sk_s$.

(Enc)

An Enc algorithm is a randomized algorithm that takes as input a message m, an attribute set $\Gamma := \{(t, \vec{x}_t) | \vec{x}_t \in \mathbb{F}_q^{n_t}, 1 \leq t \leq d\}$, and the public parameters pk, and outputs encrypted data c.

(Dec)

A Dec algorithm is an algorithm that takes as input the encrypted data c encrypted under the attribute set $\Gamma$, the decryption key $sk_s$ for the access structure S, and the public parameters pk, and outputs either the message m or distinguished symbol $\perp$.

A key-policy functional encryption scheme should have the following property: for all access structures S, the attribute set $\Gamma$, the correctly generated public parameters pk, the master key sk, and the ciphertext c indicated in Formula 126, it holds that m=Dec(pk, $sk_s$, c) if the access structure S accepts the attribute set $\Gamma$. If the access structure S rejects the attribute set Γ, the probability of m=Dec(pk, sk$_s$, c) is negligible.

$$c \xleftarrow{R} Enc(pk, m, \Gamma)$$ [Formula 126]

<4-2. Cryptographic Processing System 10>

A cryptographic processing system 10 that executes the algorithms of the key-policy functional encryption scheme described above will be described.

Figure 5:
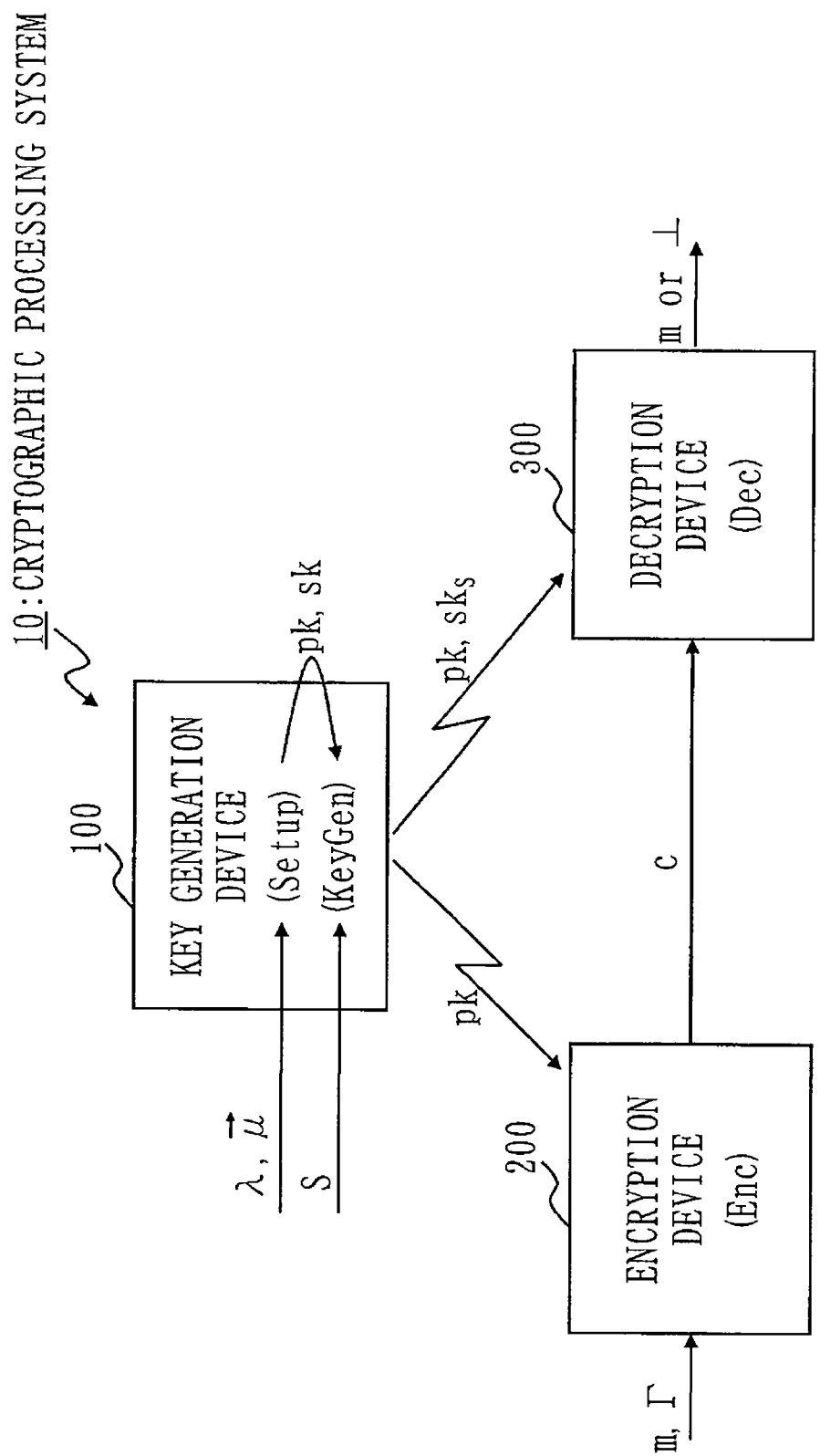
[FIG. 5] is a configuration diagram of a cryptographic processing system 10 which executes a key-policy functional encryption scheme.

FIG. 5 is a configuration diagram of the cryptographic processing system 10 which executes the key-policy functional encryption scheme.

The cryptographic processing system 10 is provided with a key generation device 100, an encryption device 200, and a decryption device 300.

The key generation device 100 executes the Setup algorithm by taking as input a security parameter λ and an attribute format $\mu^{\rightarrow}$:=(d; n$_1$, . . . , n$_d$), and generates public parameters pk and a master key sk. The key generation device 100 publicizes the generated public parameters pk. The key generation device 100 also executes the KeyGen algorithm by taking as input an access structure S, generates a decryption key sk$_s$, and distributes the decryption key sk$_s$ to the decryption device 300 in secrecy.

The encryption device 200 executes the Enc algorithm by taking as input a message m, an attribute set Γ, and the public parameters pk, and generates encrypted data c. The encryption device 200 transmits the generated encrypted data c to the decryption device 300.

The decryption device 300 executes the Dec algorithm by taking as input the public parameters pk, the decryption key sk$_s$, and the encrypted data c, and outputs a message m or distinguished symbol ⊥.

<4-3. Key-Policy Functional Encryption Scheme and Cryptographic

Processing System 10 in Detail>

The key-policy functional encryption scheme, and the function and operation of the cryptographic processing system 10 which executes the key-policy functional encryption scheme will be described with reference to FIGS. 6 to 10.

Figure 6:
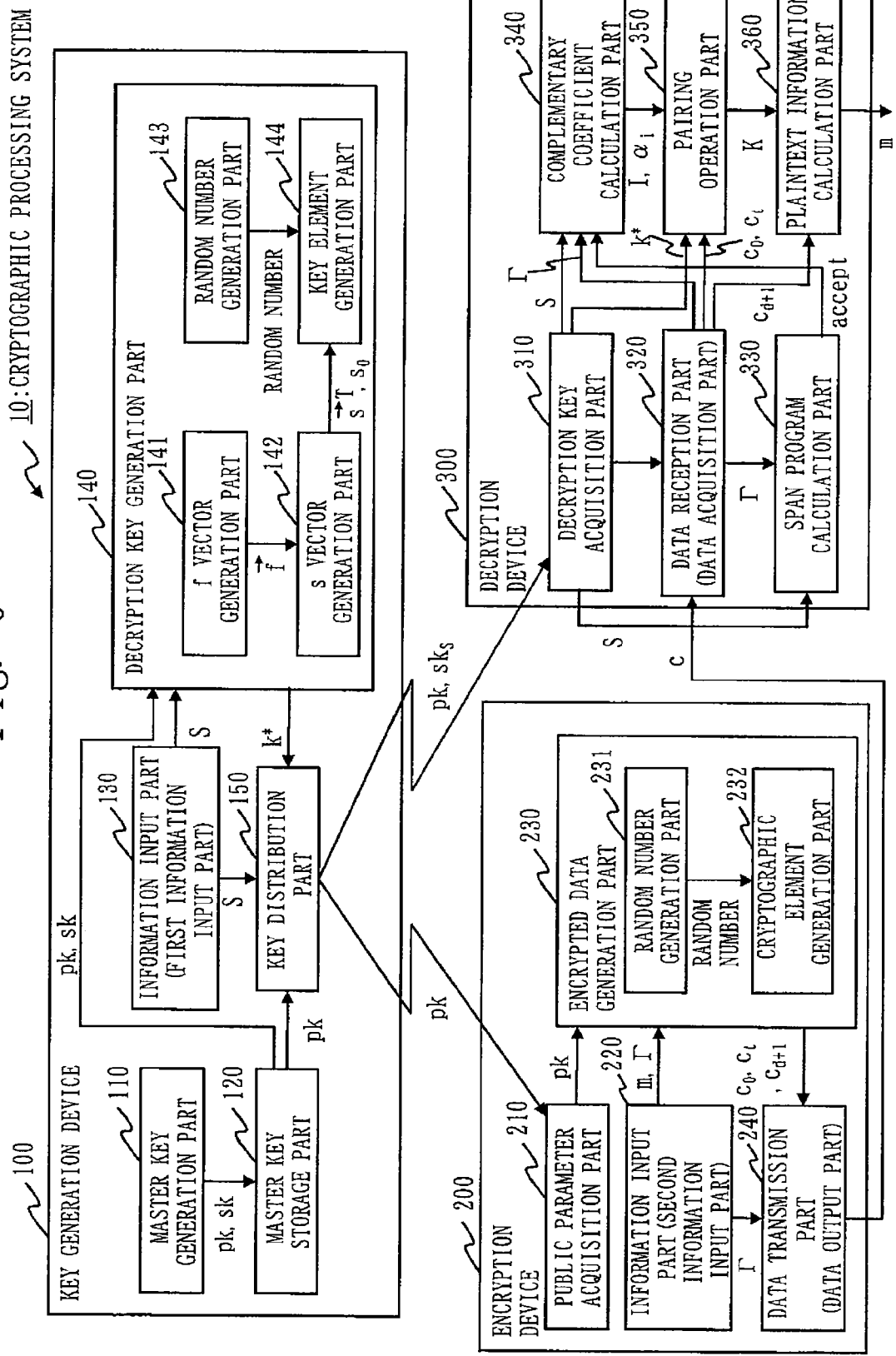
[FIG. 6] is a function block diagram showing the function of the cryptographic processing system 10 which executes the key-policy functional encryption scheme.

FIG. 6 is a function block diagram showing the function of the cryptographic processing system 10 which executes the key-policy functional encryption scheme. The cryptographic processing system 10 is provided with the key generation device 100, the encryption device 200, and the decryption device 300, as described above.

Figure 7:
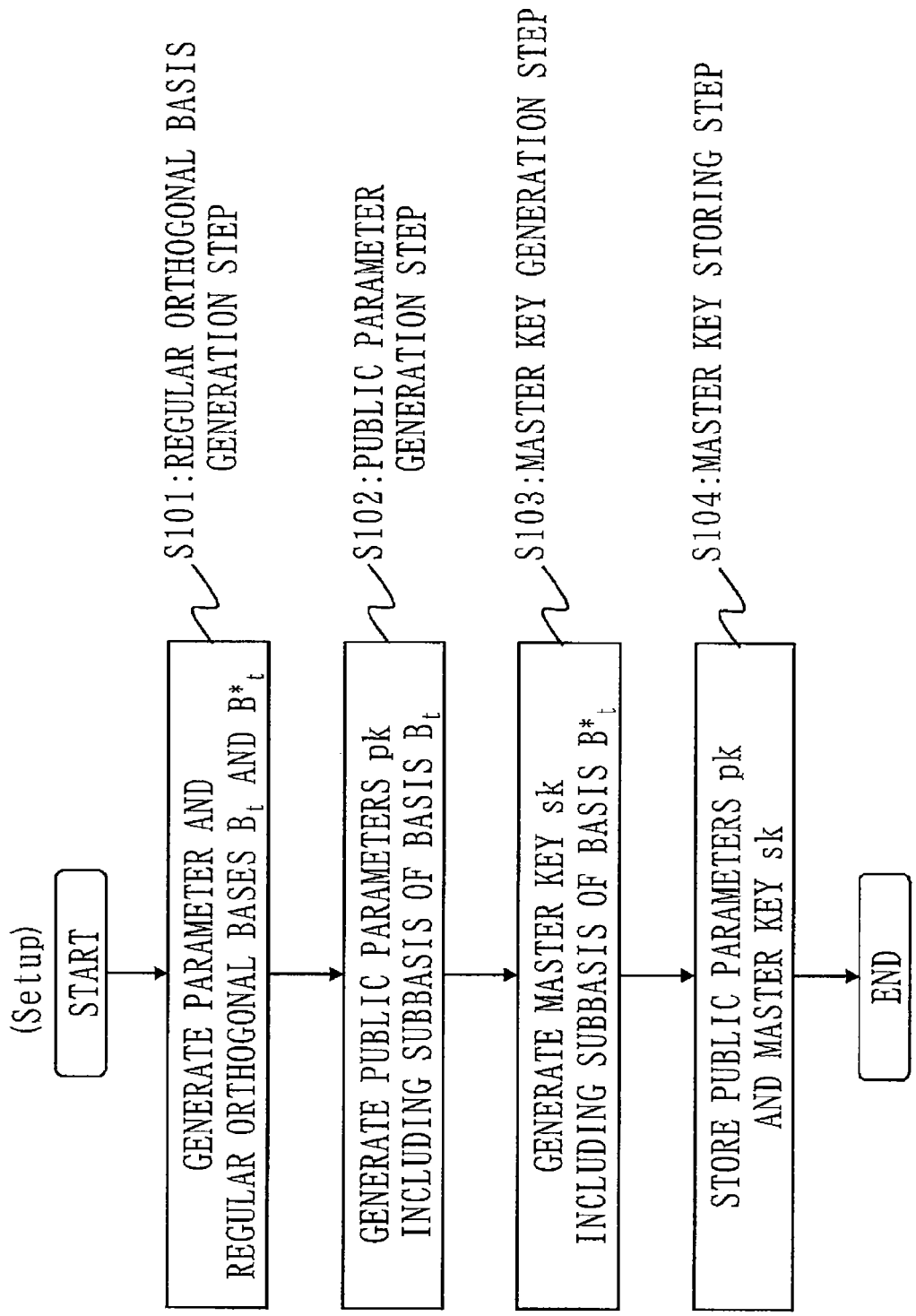
[FIG. 7] is a flowchart showing the process of Setup algorithm.
Figure 8:
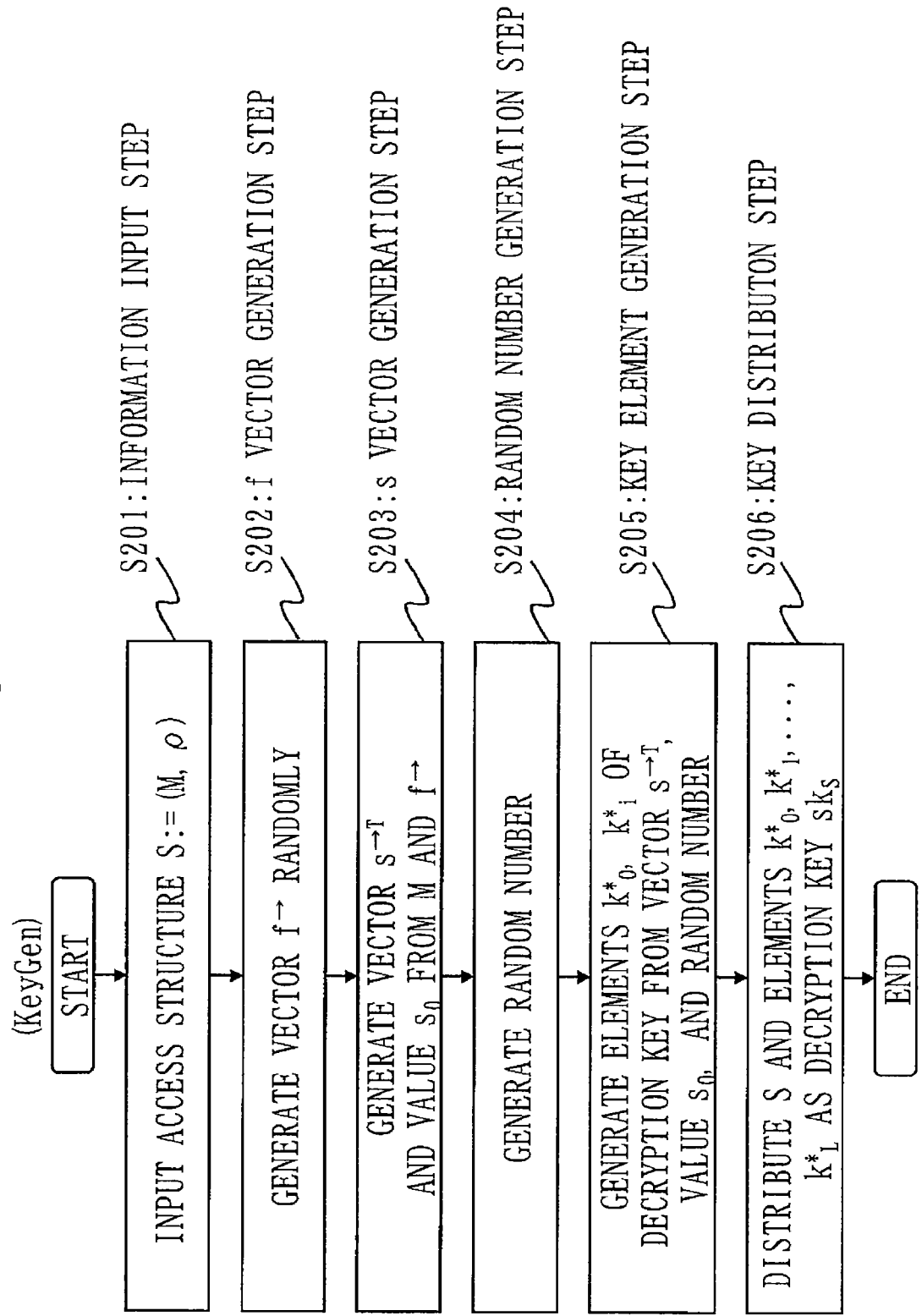
[FIG. 8] is a flowchart showing the process of KeyGen algorithm.
Figure 9:
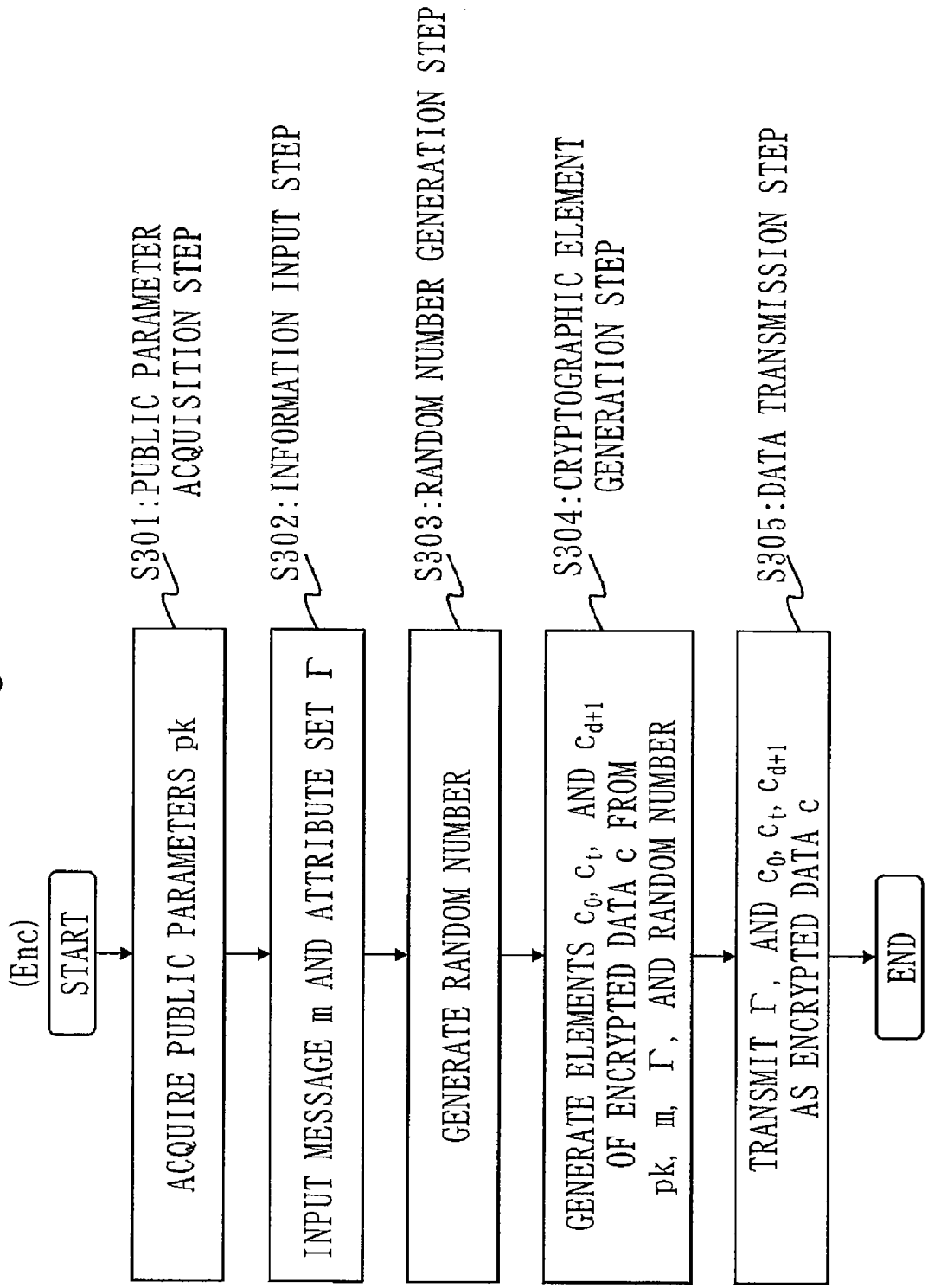
[FIG. 9] is a flowchart showing the process of Enc algorithm.
Figure 10:
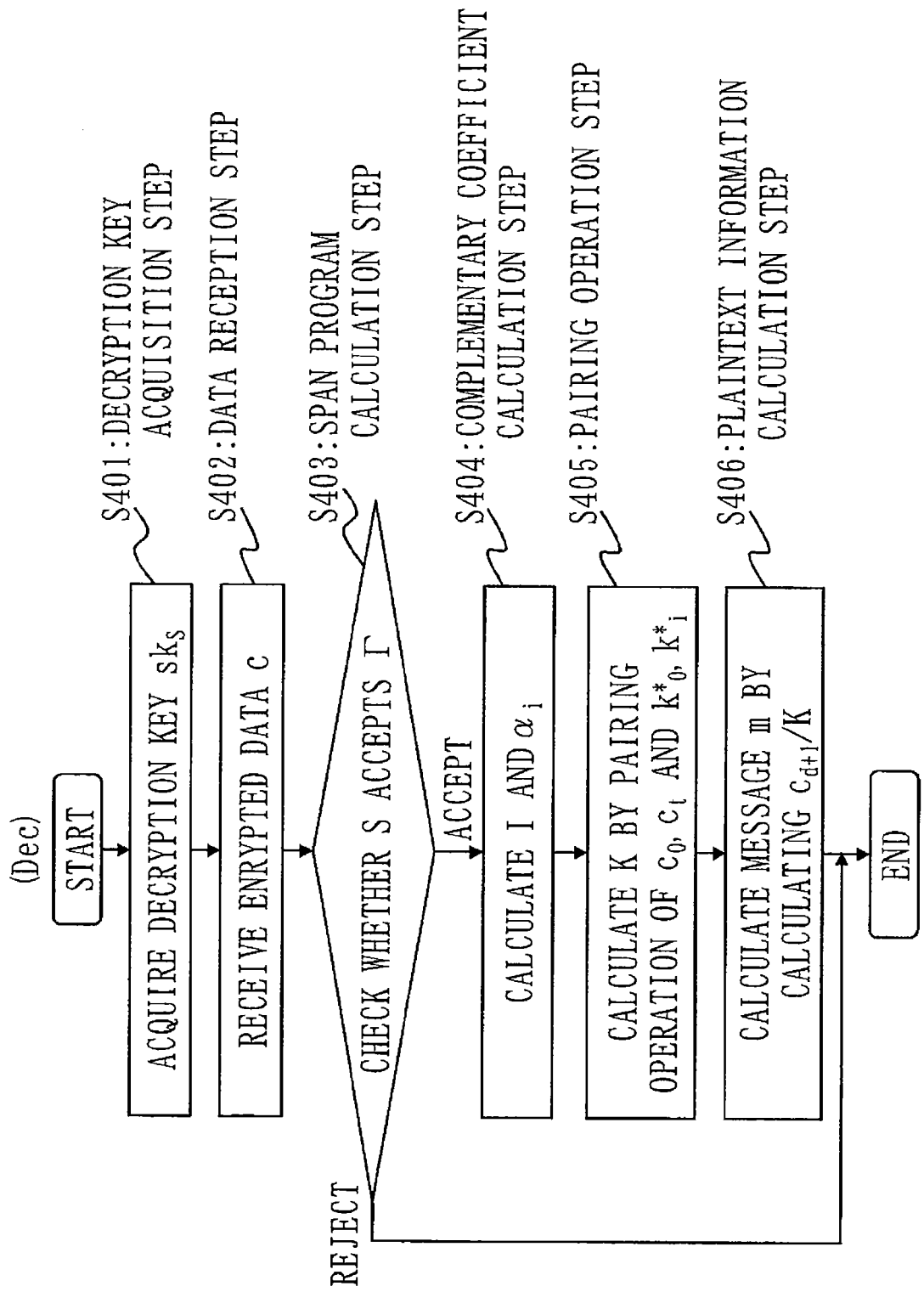
[FIG. 10] is a flowchart showing the process of Dec algorithm.

FIGS. 7 and 8 are flowcharts showing the operation of the key generation device 100. Note that FIG. 7 is a flowchart showing the process of the Setup algorithm, and that FIG. 8 is a flowchart showing the process of the KeyGen algorithm. FIG. 9 is a flowchart showing the operation of the encryption device 200 and the process of the Enc algorithm. FIG. 10 is a flowchart showing the operation of the decryption device 300 and the process of the Dec algorithm.

Assume that x$_{t,1}$:=1 in the following description.

The function and operation of the key generation device 100 will be described. The key generation device 100 is provided with a master key generation part 110, a master key storage part 120, an information input part 130 (first information input part), a decryption key generation part 140, and a key distribution part 150. The decryption key generation part 140 is provided with an f vector generation part 141, an s vector generation part 142, a random number generation part 143, and a key element generation part 144.

The process of the Setup algorithm will be described first with reference to FIG. 7.

(S101: Regular Orthogonal Basis Generation Step)

The master key generation part 110 calculates Formula 127 with the processing device to generate param$_{\mu^{\rightarrow}}$, and bases B$_t$ and B*$_t$ for each integer t=0, . . . , d.

[Formula 127]

$$\text{input } 1^\lambda, \vec{\mu} := (d; n_1 \ldots, n_d) \quad (1)$$

$$param_{\mathbb{G}} := (q, \mathbb{G}, \mathbb{G}_T, g, e) \xleftarrow{R} \mathcal{G}_{bpg}(1^\lambda) \quad (2)$$

$$\psi \xleftarrow{U} \mathbb{F}_q^\times, N_0 := 5, N_t := 4n_t \text{ for } t = 1, \ldots, d \quad (3)$$

The processes of (4) to (8) are executed for each
$t = 0, \ldots, d$.

$$param_{\mathbb{V}_t} := (q, \mathbb{V}_t, \mathbb{G}_T, \mathbb{A}_t, e) := \mathcal{G}_{dpvs}(1^\lambda, N_t, param_{\mathbb{G}}) \quad (4)$$

$$X_t := (\chi_{t,i,j})_{i,j} \xleftarrow{U} GL(N_t, \mathbb{F}_q) \quad (5)$$

$$(v_{t,i,j})_{i,j} := \psi \cdot (X_t^T)^{-1} \quad (6)$$

$$b_{t,i} := (\chi_{t,i,1}, \ldots, \chi_{t,i,N_t})_{\mathbb{A}_t} = \sum_{j=1}^{N_t} \chi_{t,i,j} a_{t,j}, \quad (7)$$

$$\mathbb{B}_t := (b_{t,1}, \ldots, b_{t,N_t})$$

$$b_{t,i}^* := (v_{t,i,1}, \ldots, v_{t,i,N_t})_{\mathbb{A}_t} = \sum_{j=1}^{N_t} v_{t,i,j} a_{t,j}, \quad (8)$$

$$\mathbb{B}_t^* := (b_{t,1}^*, \ldots, b_{t,N_t}^*)$$

$$g_T := e(g, g)^\psi \quad (9)$$

$$param_{\vec{\mu}} := (\{param_{\mathbb{V}_t}\}_{t=0,\ldots,d}, g_T)$$

Namely, the master key generation part 110 executes the following processes.

(1) With the processing device, the master key generation part 110 takes as input the security parameter λ(1$^\lambda$) and the attribute format $\mu^{\rightarrow}$:=(d; n$_1$, . . . , n$_d$), where d is an integer of 1 or more, and n$_t$ is an integer of 1 or more for each integer t=1, . . . , d.

(2) With the processing device, the master key generation part 110 executes algorithm G$_{bpg}$ by taking as input the security parameter λ(1$^\lambda$) inputted in (1), and generates the value of a parameter param$_G$:=(q, G, G$_T$, g, e) of the bilinear pairing group.

(3) With the processing device, the master key generation part 110 generates a random number ψ, and sets 5 in N$_0$, and 4n$_t$ in N$_t$ for each integer t=1, . . . , d.

Subsequently, the master key generation part 110 executes the processes of the following (4) to (8) for each integer t=0, . . . , d.

(4) With the processing device, the master key generation part 110 executes algorithm G$_{dpvs}$ by taking as input the security parameter λ(1$^\lambda$) inputted in (1), N$_t$ set in (3), and the value of param$_G$:=(q, G, G$_T$, g, e) generated in (2), and generates the value of parameter param$_{vt}$:=(q, V$_T$, G$_T$, A$_t$, e) of the dual pairing vector spaces.

(5) With the processing device, the master key generation part 110 takes as input N$_t$ set in (3), and F$_q$, and generates linear transformation X$_t$:=(χ$_{t,i,j}$)$_{i,j}$ randomly. Note that GL stands for General Linear. Namely, GL is a general linear group, a set of square matrices in which the determinant is not 0, and a group with respect to multiplication. Note that (χ$_{t,i,j}$)$_{i,j}$ signifies a matrix concerning the suffixes i and j of the matrix χ$_{t,i,j}$ where i, j=1, . . . , n$_t$.

(6) With the processing device and based on the random number ψ and linear transformation $X_t$, the master key generation part 110 generates $(v_{t,i,j})_{i,j} := \psi \cdot (X_t^T)^{-1}$. As $(\chi_{t,i,j})_{i,j}$ does, $(v_{t,i,j})_{i,j}$ signifies a matrix concerning the suffixes i and j of the matrix $v_{t,i,j}$ where i, j=1, . . . , $n_t$.

(7) With the processing device and based on the linear transformation $X_t$ generated in (5), the master key generation part 110 generates the basis $B_t$ from the canonical basis $A_t$ generated in (4).

(8) With the processing device and based on $(v_{t,i,j})_{i,j}$ generated in (6), the master key generation part 110 generates the basis $B^*_t$ from the canonical basis $A_t$ generated in (4).

(9) With the processing device, the master key generation part 110 sets $e(g, g)^\psi$ in $g_T$. The master key generation part 110 also sets $\{param_{\mathbb{V}_t}\}_{t=0,\ldots,d}$ generated in (4), and $g_T$, in $param_{\vec{\mu}}$. Note that $g_T = e(b_{t,i}, b^*_{t,i})$ for each integer t=0, . . . , d and each integer i=1, . . . , $N_t$.

In brief, in (S101), the master key generation part 110 executes the algorithm $\mathcal{G}_{ob}$ indicated in Formula 128, and generates $param_{\vec{\mu}}$, and the bases $B_t$ and $B^*_t$ for each integer t=0, . . . , d.

$$\mathcal{G}_{ob}(1^\lambda, \vec{\mu} := (d; n_1 \ldots, n_d)) : param_\mathbb{G} := \quad \text{[Formula 128]}$$

$$(q, \mathbb{G}, \mathbb{G}_T, g, e) \xleftarrow{R} \mathcal{G}_{bpg}(1^\lambda),$$

$$\psi \xleftarrow{U} \mathbb{F}_q^\times,$$

$$N_0 := 5, n_t := 4n_t \text{ for } t = 1, \ldots, d,$$

For $t = 0, \ldots, d, param_{\mathbb{V}_t} :=$ $$(q, \mathbb{V}_t, \mathbb{G}_T, \mathbb{A}_t, e) := \mathcal{G}_{dpvs}(1^\lambda, N_t, param_\mathbb{G}),$$

$$X_t := (\chi_{t,i,j})_{i,j} \xleftarrow{U} GL(N_t, \mathbb{F}_q), (v_{t,i,j})_{i,j} := \psi \cdot (X_t^T)^{-1},$$

$$b_{t,i} := (\chi_{t,i,1}, \ldots, \chi_{t,i,N_t})_{\mathbb{A}_t} = \sum_{j=1}^{N_t} \chi_{t,i,j} a_{t,j},$$

$$\mathbb{B}_t := (b_{t,1}, \ldots, b_{t,N_t}),$$

$$b^*_{t,i} := (v_{t,i,1}, \ldots, v_{t,i,N_t})_{\mathbb{A}_t} = \sum_{j=1}^{N_t} v_{t,i,j} a_{t,j},$$

$$\mathbb{B}^*_t := (b^*_{t,1}, \ldots, b^*_{t,N_t}),$$

$$g_T := e(g, g)^\psi, param_{\vec{\mu}} := (\{param_{\mathbb{V}_t}\}_{t=0,\ldots,d}, g_T)$$

$$\text{return } (param_{\vec{\mu}}, \{\mathbb{B}_t, \mathbb{B}^*_t\}_{t=0,\ldots,d}).$$

(S102: Public Parameter Generation Step)

With the processing device, the master key generation part 110 generates a subbasis $\hat{\mathbb{B}}_0$ of the basis $\mathbb{B}_0$ generated in (S101), and a subbasis $\hat{\mathbb{B}}_t$ for each integer t=1, . . . , d, as indicated in Formula 129.

$$\hat{\mathbb{B}}_0 := (b_{0,1}, b_{0,3}, b_{0,5}),$$

$$\hat{\mathbb{B}}_t := (b_{t,1}, \ldots, b_{t,n_t}, b_{t,3n_t+1}, \ldots, b_{t,4n_t}) \text{ for } t=1, \ldots, d \quad \text{[Formula 129]}$$

The master key generation part 110 treats the generated subbases $\hat{\mathbb{B}}_0$ and $\hat{\mathbb{B}}_t$, the security parameter λ($1^\lambda$) inputted in (S101), and $param_{\vec{\mu}}$ generated in (S101), as the public parameters pk.

(S103: Master Key Generation Step)

With the processing device, the master key generation part 110 generates a subbasis $\hat{\mathbb{B}}^*_0$ of the basis $\mathbb{B}^*_0$ generated in (S101), and a subbasis $\hat{\mathbb{B}}^*_t$ for each integer t=1, . . . , d, as indicated in Formula 130.

$$\hat{\mathbb{B}}^*_0 := (b^*_{0,1}, b^*_{0,3}, b^*_{0,4})$$

$$\hat{\mathbb{B}}^*_t := (b^*_{t,1}, \ldots, b^*_{t,n_t}, b^*_{t,2n_t+1}, \ldots, b^*_{t,3n_t}) \text{ for } t=1, \ldots, d, \quad \text{[Formula 130]}$$

The master key generation part 110 treats the generated subbases $\hat{\mathbb{B}}^*_0$ and $\hat{\mathbb{B}}^*_t$, as the master key sk.

(S104: Master Key Storing Step)

The master key storage part 120 stores the public parameters pk including the subbasis $\hat{\mathbb{B}}^*_t$ generated in (S102) for each integer t=0, . . . , d, in the storage device. The master key storage part 120 also stores the master key sk including the subbasis $\hat{\mathbb{B}}^*_t$ generated in (S103) for each integer t=0, . . . , d, in the storage device.

In brief, from (S101) through (S103), the master key generation part 110 generates the public parameters pk and the master key sk by executing the Setup algorithm indicated in Formula 131. Then, in (S104), the master key storage part 120 stores the generated public parameters pk and master key sk, in the storage device.

Note that the public parameters are publicized via, e.g., a network, so the encryption device 200 and decryption device 300 can acquire them.

$$\text{Setup}(1^\lambda, \vec{\mu} := (d; n_1, \ldots, n_d)) \quad \text{[Formula 131]}$$

$$(param_{\vec{\mu}}, \{\mathbb{B}_t, \mathbb{B}^*_t\}_{t=0,\ldots,d}) \xleftarrow{R} \mathcal{G}_{ob}(1^\lambda, \vec{\mu})$$

$$\hat{\mathbb{B}}_0 := (b_{0,1}, b_{0,3}, b_{0,5}),$$

$$\hat{\mathbb{B}}_t := (b_{t,1}, \ldots, b_{t,n_t}, b_{t,3n_t+1}, \ldots, b_{t,4n_t})$$

$$\text{for } t = 1, \ldots, d,$$

$$\hat{\mathbb{B}}^*_0 := (b^*_{0,1}, b^*_{0,3}, b^*_{0,4}),$$

$$\hat{\mathbb{B}}^*_t := (b^*_{t,1}, \ldots, b^*_{t,n_t}, b^*_{t,2n_t+1}, \ldots, b^*_{t,3n_t})$$

$$\text{for } t = 1, \ldots, d,$$

$$sk := \{\hat{\mathbb{B}}^*_t\}_{t=0,\ldots,d},$$

$$pk := (1^\lambda, param_{\vec{\mu}}, \{\hat{\mathbb{B}}_t\}_{t=0,\ldots,d}).$$

$$\text{return } sk, pk.$$

The process of the KeyGen algorithm will be described with reference to FIG. 8.

(S201: Information Input Step)

With the input device, the information input part 130 takes as input the access structure S:=(M, ρ) described above. The matrix M of the access structure S is set depending on the condition of the system the user wishes to realize. Also, for example, the attribute information of the user of the decryption key $sk_s$ is set in ρ of the access structure S.

(S202: f Vector Generation Step)

With the processing device, the f vector generation part 141 generates a vector $\vec{f}$ having r pieces of elements, randomly as indicated in Formula 132.

$$\vec{f} \xleftarrow{U} \mathbb{F}_q^r \quad \text{[Formula 132]}$$

(S203: s Vector Generation Step)

With the processing device, the s vector generation part 142 generates a vector $\vec{s}^T := (s_1, \ldots, s_L)^T$ based on the (L rows×r columns) matrix M included in the access structure S inputted in (S201) and the vector $\vec{f}$ generated in (S202), as indicated in Formula 133.

$$\vec{s}^T := (s_1, \ldots, s_L)^T := M \cdot \vec{f}^T \qquad \text{[Formula 133]}$$

With the processing device, the s vector generation part 142 generates a value $s_0$ based on the vector $\vec{f}$ generated in (S202), as indicated in Formula 134.

$$s_0 := \vec{1} \cdot \vec{f}^T \qquad \text{[Formula 134]}$$

(S204: Random Number Generation Step)

With the processing device, the random number generation part 143 generates a random number $\eta_0$, and a random number $\theta_i$ for each integer $i=1, \ldots, L$, as indicated in Formula 135.

$$\eta_0, \theta_i \xleftarrow{U} \mathbb{F}_q (i = 1, \ldots, L) \qquad \text{[Formula 135]}$$

(S205: Key Element Generation Step)

With the processing device, the key element generation part 144 generates an element $k^*_0$ of the decryption key $sk_s$, as indicated in Formula 136.

$$k_0^* := (-s_0, 0, 1, \eta_0, 0)_{\mathbb{B}_0^*} \qquad \text{[Formula 136]}$$

As described above, for the bases B and B* indicated in Formula 113, Formula 114 is established. Hence, Formula 136 means setting $-s_0$ as the coefficient for a basis vector $b^*_{0,1}$ of a basis $B^*_0$, 0 as the coefficient for a basis vector $b^*_{0,2}$, 1 as the coefficient for a basis vector $b^*_{0,3}$, $\eta_0$ as the coefficient for a basis vector $b^*_{0,4}$, and 0 as the coefficient for a basis vector $b^*_{0,5}$.

With the processing device, the key element generation part 144 also generates an element $k^*_i$ of the decryption key $sk_s$ for each integer $i=1, \ldots, L$, as indicated in Formula 137.

$$\text{if } \rho(i) = (t, \vec{v}_i := (v_{i,1}, \ldots, v_{i,n_t})) \in \mathbb{F}_q^{n_t}), \qquad \text{[Formula 137]}$$

$$\eta_{i,1}, \ldots, \eta_{i,n_t} \xleftarrow{U} \mathbb{F}_q$$

$$k_i^* := \left(\overbrace{s_i + \theta_i v_{i,1}, \theta_i v_{i,2}, \ldots, \theta_i v_{i,n_t}}^{n_t}, \overbrace{0^{n_t}}^{n_t}, \overbrace{\eta_{i,1}, \ldots, \eta_{i,n_t}}^{n_t}, \overbrace{0^{n_t}}^{n_t}\right)_{\mathbb{B}_t^*}$$

$$\text{if } \rho(i) = \neg (t, \vec{v}_i := (v_{i,1}, \ldots, v_{i,n_t})) \in \mathbb{F}_q^{n_t}),$$

$$\eta_{i,1}, \ldots, \eta_{i,n_t} \xleftarrow{U} \mathbb{F}_q,$$

$$k_i^* := \left(\overbrace{s_i(v_{i,1}, \ldots, v_{i,n_t})}^{n_t}, \overbrace{0^{n_t}}^{n_t}, \overbrace{\eta_{i,1}, \ldots, \eta_{i,n_t}}^{n_t}, \overbrace{0^{n_t}}^{n_t}\right)_{\mathbb{B}_t^*}$$

More specifically, as Formula 136 does, Formula 137 means, when $\rho(i)$ is a positive tuple $(t, \vec{v}_i)$, setting $s_i + \theta_i v_{i,1}$ as the coefficient for a basis vector $b^*_{t,1}$, $\theta_i v_{1,2}, \ldots, \theta_i v_{i,n_t}$ as the coefficients for basis vectors $b^*_{t,2}, \ldots, b^*_{t,n_t}$, 0 as the coefficients for basis vectors $b^*_{t,n_t+1}, \ldots, b^*_{t,2n_t}$, $\eta_{i,1}, \ldots, \eta_{i,n_t}$ as the coefficients for basis vectors $b^*_{t,2n_t+1}, \ldots, b^*_{t,3n_t}$, and 0 as the coefficients for basis vectors $b^*_{t,3n_t+1}, \ldots, b^*_{t,4n_t}$ of the basis $B^*_t$.

Formula 137 also means, when $\rho(i)$ is a negative tuple $\neg (t, \vec{v}_i)$, setting $s_i v_{i,1}, \ldots, s_i v_{i,n_t}$ as the coefficients for the basis vectors $b^*_{t,1}, \ldots, b^*_{t,n_t}$, 0 as the coefficients for the basis vectors $b^*_{t,n_t+1}, \ldots, b^*_{t,2n_t}$, $\eta_{i,1}, \ldots, \eta_{i,n_t}$ as the coefficients for the basis vectors $b^*_{t,2n_t+1}, \ldots, b^*_{t,3n_t}$, and 0 as the coefficients for the basis vectors $b^*_{t,3n_t+1}, \ldots, b^*_{t,4n_t}$ of the basis $B^*_t$.

(S206: Key Distribution Step)

For example, with the communication device, the key distribution part 150 distributes the decryption key $sk_s$ constituted by, as elements, the access structure S inputted in (S201) and $k^*_0, k^*_1, \ldots, k^*_L$ generated in (S205), to the decryption device 300 in secrecy via the network. As a matter of course, the decryption key $sk_s$ may be distributed to the decryption device 300 by another method.

More specifically, from (S201) through (S205), the information input part 130 and decryption key generation part 140 generate the decryption key $sk_s$ by executing the KeyGen algorithm indicated in Formula 138. Then, in (S206), the key distribution part 150 distributes the generated decryption key $sk_s$ to the decryption device 300.

$$\text{KeyGen}(pk, sk, \mathbb{S} := (M, \rho)) \qquad \text{[Formula 138]}$$

$$\vec{f} \xleftarrow{U} \mathbb{F}_q^r, \vec{s}^T := (s_1, \ldots, s_L)^T := M \cdot \vec{f}^T,$$

$$s_0 := \vec{1} \cdot \vec{f}^T,$$

$$\eta_0, \theta_i \xleftarrow{U} \mathbb{F}_q (i = 1, \ldots, L),$$

$$k_0^* := (-s_0, 0, 1, \eta_0, 0)_{\mathbb{B}_0^*},$$

for $1 \leq i \leq L$ $$\text{if } \rho(i) = (t, \vec{v}_i := (v_{i,1}, \ldots, v_{i,n_t})) \in \mathbb{F}_q^{n_t}),$$

$$\eta_{i,1}, \ldots, \eta_{i,n_t} \xleftarrow{U} \mathbb{F}_q,$$

$$k_i^* :=$$

$$\left(\overbrace{s_i + \theta_i v_{i,1}, \theta_i v_{i,2}, \ldots, \theta_i v_{i,n_t}}^{n_t}, \overbrace{0^{n_t}}^{n_t}, \overbrace{\eta_{i,1}, \ldots, \eta_{i,n_t}}^{n_t}, \overbrace{0^{n_t}}^{n_t}\right)_{\mathbb{B}_t^*}$$

$$\text{if } \rho(i) = \neg (t, \vec{v}_i := (v_{i,1}, \ldots, v_{i,n_t})) \in \mathbb{F}_q^{n_t}),$$

$$\eta_{i,1}, \ldots, \eta_{i,n_t} \xleftarrow{U} \mathbb{F}_q,$$

$$k_i^* := \left(\overbrace{s_i(v_{i,1}, \ldots, v_{i,n_t})}^{n_t}, \overbrace{0^{n_t}}^{n_t}, \overbrace{\eta_{i,1}, \ldots, \eta_{i,n_t}}^{n_t}, \overbrace{0^{n_t}}^{n_t}\right)_{\mathbb{B}_t^*}$$

$$sk_\mathbb{S} := (\mathbb{S}, k_0^*, k_1^*, \ldots, k_L^*).$$

return $sk_\mathbb{S}$.

The function and operation of the encryption device 200 will be described. The encryption device 200 is provided with a public parameter acquisition part 210, an information input part 220 (second information input part), an encrypted data generation part 230, and a data transmission part 240 (data output part). The encrypted data generation part 230 is provided with a random number generation part 231 and a cryptographic element generation part 232.

The process of the Enc algorithm will be described with reference to FIG. 9.

(S301: Public Parameter Acquisition Step)

For example, with the communication device, the public parameter acquisition part 210 acquires the public parameters pk generated by the key generation device 100, via the network.

(S302: Information Input Step)

With the input device, the information input part 220 takes as input the message m to be transmitted to the decryption device 300. With the input device, the information input part 220 also takes as input the attribute set $\Gamma := \{(t, \vec{x}_t := (x_{t,1}, \ldots, x_{t,n_t} \in \mathbb{F}_q^{n_t})) | 1 \leq t \leq d\}$. Note that t need not be all of the integers t falling within the range of $1 \leq t \leq d$, but may be one or more of integers t falling within the range of $1 \leq t \leq d$. Also, for example, attribute information of a decryptable user is set in the attribute set $\Gamma$.

(S303: Random Number Generation Step)

With the processing device, the random number generation part 231 generates random numbers $\delta, \phi_0, \phi_{t,1}, \ldots, \phi_{t,n_t}$, and $\zeta$, as indicated in Formula 139.

$$\delta, \phi_0, \phi_{t,1}, \ldots, \phi_{t,n_t}, \zeta \xleftarrow{U} \mathbb{F}_q \text{ such that } (t, \vec{x}_t) \in \Gamma \quad \text{[Formula 139]}$$

(S304: Cryptographic Element c Generation Step)

With the processing device, the cryptographic element generation part 232 generates an element $c_0$ of the encrypted data c as indicated in Formula 140.

$$c_0 := (\delta, 0, \zeta, 0, \phi_0)_{\mathbb{B}_0} \quad \text{[Formula 140]}$$

With the processing device, the cryptographic element generation part 232 also generates an element $c_t$ of the encrypted data c for each integer t of $(t, \vec{v}_1)$ included in $\Gamma$, as indicated in Formula 141.

$$c_t := \left( \overbrace{\delta(x_{t,1}, \ldots, x_{t,n_t})}^{n_t}, \overbrace{0^{n_t}}^{n_t}, \overbrace{0^{n_t}}^{n_t}, \overbrace{\phi_{t,1}, \ldots, \phi_{t,n_t}}^{n_t} \right)_{\mathbb{B}_t} \quad \text{[Formula 141]}$$

With the processing device, the cryptographic element generation part 232 also generates an element $c_{d+1}$ of the encrypted data c, as indicated in Formula 142.

$$c_{d+1} := g_T^\zeta m \quad \text{[Formula 142]}$$

(S305: Data Transmission Step)

For example, with the communication device, the data transmission part 240 transmits the encrypted data c, constituted by the attribute set $\Gamma$ inputted in (S302) and $c_0$, $c_t$, and $c_{d+1}$ generated in (S304), as elements to the decryption device 300 via the network. As a matter of course, the encrypted data c may be transmitted to the decryption device 300 by another method.

More specifically, from (S301) through (S304), the public parameter acquisition part 210, the information input part 220, and the encrypted data generation part 230 generate the encrypted data c by executing the Enc algorithm indicated in Formula 143. In (S305), the data transmission part 240 transmits the generated encrypted data c to the decryption device 300.

$$Enc(pk, m, \Gamma := \{(t, \vec{x}_t := (x_{t,1}, \ldots, x_{t,n_t}) \in \mathbb{F}_q^{n_t}) | 1 \le t \le d\} \quad \text{[Formula 143]}$$

$$(x_{t,1} := 1)$$

$$\delta, \phi_0, \phi_{t,1}, \ldots, \phi_{t,n_t},$$

$$\zeta \xleftarrow{U} \mathbb{F}_q \text{ such that } (t, \vec{x}_t) \in \Gamma,$$

$$c_0 := (\delta, 0, \zeta, 0, \phi_0)_{\mathbb{B}_0},$$

$$c_t := \left( \overbrace{\delta(x_{t,1}, \ldots, x_{t,n_t})}^{n_t}, \overbrace{0^{n_t}}^{n_t}, \overbrace{0^{n_t}}^{n_t}, \overbrace{\phi_{t,1}, \ldots, \phi_{t,n_t}}^{n_t} \right)_{\mathbb{B}_t}$$

for $(t, \vec{x}_t) \in \Gamma$, $$c_{d+1} := g_T^\zeta m, c := (\Gamma, c_0, \{c_t\}_{(t,\vec{x}_t)\in\Gamma}, c_{d+1}).$$

return $c$.

The function and operation of the decryption device 300 will be described. The decryption device 300 is provided with a decryption key acquisition part 310, a data reception part 320 (data acquisition part), a span program calculation part 330, a complementary coefficient calculation part 340, a pairing operation part 350, and a plaintext information calculation part 360.

The process of the Dec algorithm will be described with reference to FIG. 10.

(S401: Decryption key Acquisition Step)

For example, with the communication device, the decryption key acquisition part 310 acquires the decryption key $sk_s := (S, k^*_0, k^*_1, \ldots, k^*_L)$ distributed from the key generation device 100, via the network. The decryption key acquisition part 310 also acquires the public parameters pk generated by the key generation device 100.

(S402: Data Reception Step)

For example, with the communication device, the data reception part 320 receives the encrypted data c transmitted by the encryption device 200, via the network.

(S403: Span Program Calculation Step)

With the processing device, the span program calculation part 330 checks whether or not the access structure S included in the decryption key $sk_s$ acquired in (S401) accepts $\Gamma$ included in the encrypted data c received in (S402). The method of checking whether or not the access structure S accepts $\Gamma$ is the same as that described in "3. Concept for Implementing Functional Encryption".

The span program calculation part 330 advances the process to (S404) if the access structure S accepts $\Gamma$ (accept in S403). If the access structure S rejects $\Gamma$ (reject in S403), the span program calculation part 330 judges that the encrypted data c cannot be decrypted with the decryption key $sk_s$, and ends the process.

(S404: Complementary Coefficient Calculation Step)

With the processing device, the complementary coefficient calculation part 340 calculates I and a constant (complementary coefficient) $\{\alpha_i\}_{i \in I}$, with which Formula 144 is established.

$$s_0 = \sum_{i \in I} \alpha_i s_i, \text{ and} \quad \text{[Formula 144]}$$

$$I \subseteq \{i \in \{1, \ldots, L\} | [\rho(i) =$$

$$(t, \vec{v}_i) \wedge (t, \vec{x}_t) \in \Gamma \wedge \vec{v}_i \cdot \vec{x}_t = 0] \vee [\rho(i) =$$

$$\neg (t, \vec{v}_i) \wedge (t, \vec{x}_t) \in \Gamma \wedge \vec{v}_i \cdot \vec{x}_t \ne 0]\}.$$

(S405: Pairing Operation Step)

The pairing operation part 350 generates a session key $K = g_T^\zeta$ by calculating Formula 145 with the processing device.

$$K := e(c_0, k_0^*) \cdot \quad \text{[Formula 145]}$$

$$\prod_{i \in I \wedge \rho(i)=(t,\vec{v}_i)} e(c_t, k_i^*)^{\alpha_i} \cdot \prod_{i \in I \wedge \rho(i)=\neg(t,\vec{v}_i)} e(c_t, k_i^*)^{\alpha_i / (\vec{v}_i \cdot \vec{x}_t)}$$

By calculating Formula 145, the key $K = g_T^\zeta$ is obtained, as indicated in Formula 146.

$$e(c_0, k_0^*) \cdot \quad \text{[Formula 146]}$$

$$\prod_{i \in I \wedge \rho(i)=(t,\vec{v}_i)} e(c_t, k_i^*)^{\alpha_i} \cdot \prod_{i \in I \wedge \rho(i)=\neg(t,\vec{v}_i)} e(c_t, k_i^*)^{\alpha_i / (\vec{v}_i \cdot \vec{x}_t)} =$$

-continued $$g_T^{-\delta s_0 + \zeta} \prod_{i \in I \wedge \rho(i) = (t, \vec{v}_i)} g_T^{\delta \alpha_i s_i} \prod_{i \in I \wedge \rho(i) = \neg(t, \vec{v}_i)} g_T^{\delta \alpha_i s_i (\vec{v}_i \cdot \vec{x}_t)/(\vec{v}_i \cdot \vec{x}_t)} =$$

$$g_T^{\delta(-s_0 + \Sigma_{i \in I} \alpha_i s_i) + \zeta} = g_T^{\zeta}.$$

(S406: Plaintext Information Calculation Step)

The plaintext information calculation part 360 generates a message m' (=m) by calculating m'=$c_{d+1}$/K with the processing device. Note that $c_{d+1}$ is $g_T^{\zeta}$ as indicated in Formula 142. Since K is $g_T^{\zeta}$, the message in can be obtained by calculating m'=$c_{d+1}$/K.

More specifically, from (S401) through (S406), the decryption device 300 generates the message m' (=m) by executing the Dec algorithm indicated in Formula 147.

$$Dec(pk, sk_{\mathbb{S}} := (\mathbb{S}, k_0^*, k_1^*, \ldots, k_L^*), \quad \text{[Formula 147]}$$
$$c := (\Gamma, c_0, \{c_t\}_{(t, \vec{x}_t) \in \Gamma}, c_{d+1}))$$

If $\mathbb{S} := (M, \rho)$ accepts $\Gamma := \{(t, \vec{x}_t)\}$,
then compute $I$ and $\{\alpha_i\}_{i \in I}$ such that
$$s_0 = \sum_{i \in I} \alpha_i s_i, \text{ and}$$

$$I \subseteq \{i \in \{1, \ldots, L\} \mid [\rho(i) = (t, \vec{v}_i) \wedge (t, \vec{x}_t) \in \Gamma \wedge \vec{v}_i \cdot \vec{x}_t = 0] \vee [\rho(i) = \neg(t, \vec{v}_i) \wedge (t, \vec{x}_t) \in \Gamma \wedge \vec{v}_i \cdot \vec{x}_t \neq 0]\}.$$

$$K := e(c_0, k_0^*) \cdot \prod_{i \in I \wedge \rho(i) = (t, \vec{v}_i)} e(c_t, k_i^*)^{\alpha_i} \cdot$$

$$\prod_{i \in I \wedge \rho(i) = \neg(t, \vec{v}_i)} e(c_t, k_i^*)^{\alpha_i / (\vec{v}_i \cdot \vec{x}_t)}$$

$$m' = c_{d+1} / K.$$
return $m'$.

As described above, the cryptographic processing system 10 implements the encryption scheme (functional encryption scheme) using the access structure S constructed using the span program, inner-product predicate, and secret sharing. Therefore, the cryptographic processing system 10 implements an encryption scheme that can design access control with a very high degree of freedom.

The encryption scheme implemented by the cryptographic processing system 10 is very secure. As described above, the functional encryption scheme includes, as its one class (the most limited class), ID-based encryption. Even when compared to an existing, practical ID-based encryption, the encryption scheme implemented by the cryptographic processing system 10 is more secure in a certain sense of meaning.

In the above description, in (3) of (S101), 5 is set in $N_0$, and $4n_t$ (=$n_t$+$n_t$+$n_t$+$n_t$) is set in $N_t$. Hence, the bases $A_t$, $B_t$, and $B^*_t$ are all ($4n_1$+5) dimensional.

Alternatively, $n_t$+$n_t$+$n_t$+$n_t$ may be replaced by $n_t$+$u_t$+$w_t$+$z_t$. More specifically, the first $n_t$ may remain $n_t$, the second $n_t$ may be changed to $u_t$, the third $n_t$ may be changed to $w_t$, and the fourth $n_t$ may be changed to $z_t$. That is, $n_t$+$u_t$+$w_t$+$z_t$ may be set in $N_t$. Note that $n_t$, $u_t$, $w_t$, and $z_t$ can be different values where $n_t$ is an integer of 1 or more, as described above, and each of $u_t$, $w_t$, and $z_t$ is an integer of 0 or more.

In this case, the Setup algorithm indicated in Formula 131 is rewritten as indicated in Formula 148. Namely, the suffixes of the basis vectors of the bases $\hat{B}_t$ and $\hat{B}^*_t$ are changed.

$$\text{Setup}(1^\lambda, \vec{\mu} := (d; n_1, \ldots, n_d)) \quad \text{[Formula 148]}$$

$$(param_{\vec{\mu}}, \{\mathbb{B}_t, \mathbb{B}_t^*\}_{t=0,\ldots,d}) \xleftarrow{R} \mathcal{G}_{ob}(1^\lambda, \vec{\mu})$$

$$\hat{\mathbb{B}}_0 := (b_{0,1}, b_{0,3}, b_{0,5}),$$

$$\hat{\mathbb{B}}_t := (b_{t,1}, \ldots, b_{t,n_t}, b_{t,n_t+u_t+w_t+1}, \ldots, b_{t,n_t+u_t+w_t+z_t})$$

for $t = 1, \ldots, d$, $$\hat{\mathbb{B}}_0^* := (b_{0,1}^*, b_{0,3}^*, b_{0,4}^*),$$

$$\hat{\mathbb{B}}_t^* := (b_{t,1}^*, \ldots, b_{t,n_t}^*, b_{t,n_t+u_t+1}^*, \ldots, b_{t,n_t+u_t+w_t}^*)$$

for $t = 1, \ldots, d$, $$sk := \{\hat{\mathbb{B}}_t^*\}_{t=0,\ldots,d},$$

$$pk := (1^\lambda, param_{\vec{\mu}}, \{\hat{\mathbb{B}}_t\}_{t=0,\ldots,d}).$$

return $sk$, $pk$.

Also, the KeyGen algorithm indicated in Formula 138 is rewritten as indicated in Formula 149.

$$\text{KeyGen}(pk, sk, \mathbb{S} := (M, \rho)) \quad \text{[Formula 149]}$$

$$\vec{f} \xleftarrow{U} \mathbb{F}_q^r, \vec{s}^T := (s_1, \ldots, s_L)^T := M \cdot \vec{f}^T,$$

$$s_0 := \vec{1} \cdot \vec{f}^T,$$

$$\eta_0, \theta_i \xleftarrow{U} \mathbb{F}_q (i = 1, \ldots, L),$$

$$k_0^* := (-s_0, 0, 1, \eta_0, 0)_{\mathbb{B}_0^*},$$

for $1 \leq i \leq L$ if $\rho(i) = (t, \vec{v}_i := (v_{i,1}, \ldots, v_{i,n_t}) \in \mathbb{F}_q^{n_t})$, $$\eta_{i,1}, \ldots, \eta_{i,w_t} \xleftarrow{U} \mathbb{F}_q,$$

$$k_i^* := \left( \underbrace{s_i + \theta_i v_{i,1}, \theta_i v_{i,2}, \ldots, \theta_i v_{i,n_t}}_{n_t}, \underbrace{0^{u_t}}_{u_t}, \underbrace{\eta_{i,1}, \ldots, \eta_{i,w_t}}_{w_t}, \underbrace{0^{z_t}}_{z_t} \right)_{\mathbb{B}_t^*}$$

if $\rho(i) = \neg(t, \vec{v}_i := (v_{i,1}, \ldots, v_{i,n_t}) \in \mathbb{F}_q^{n_t})$, $$\eta_{i,1}, \ldots, \eta_{i,w_t} \xleftarrow{U} \mathbb{F}_q,$$

$$k_i^* := \left( \underbrace{s_i(v_{i,1}, \ldots, v_{i,n_t})}_{n_t}, \underbrace{0^{u_t}}_{u_t}, \underbrace{\eta_{i,1}, \ldots, \eta_{i,w_t}}_{w_t}, \underbrace{0^{z_t}}_{z_t} \right)_{\mathbb{B}_t^*}$$

$$sk_{\mathbb{S}} := (\mathbb{S}, k_0^*, k_1^*, \ldots, k_L^*).$$

return $sk_{\mathbb{S}}$.

Also, the Enc algorithm indicated in Formula 143 is rewritten as indicated in Formula 150.

$$\text{Enc}(pk, m, \Gamma := \{(t, \vec{x}_t := (x_{t,1}, \ldots, x_{t,n_t}) \in \mathbb{F}_q^{n_t}) \mid 1 \leq t \leq d\} \quad \text{[Formula 150]}$$

$$(x_{t,1} := 1)$$

$$\delta, \phi_0, \phi_{t,1}, \ldots, \phi_{t,z_t},$$

$$\zeta \xleftarrow{U} \mathbb{F}_q \text{ such that } (t, \vec{x}_t) \in \Gamma,$$

$$c_0 := (\delta, 0, \zeta, 0, \phi_0)_{\mathbb{B}_0},$$

$$c_t := \left( \underbrace{\delta(x_{t,1}, \ldots, x_{t,n_t})}_{n_t}, \underbrace{0^{u_t}}_{u_t}, \underbrace{0^{w_t}}_{w_t}, \underbrace{\phi_{t,1}, \ldots, \phi_{t,z_t}}_{z_t} \right)_{\mathbb{B}_t}$$

-continued for $(t, \vec{x}_t) \in \Gamma$, $c_{d+1} := g_T^\zeta m, c := (\Gamma, c_0, \{c_t\}_{(t,\vec{x}_t) \in \Gamma}, c_{d+1})$.

return $c$.

Note that the Dec algorithm indicated in Formula 147 remains unchanged.

Also, $N_0$ need not be 5 but may be an integer of 2 or more. When $N_0$ is 2, the bases $B_0$ and $B^*_0$ become two-dimensional. In this case, let $k^*_0 := (-s_0, 1)_{B^*_0}$ in the KeyGen algorithm and $c_0 := (\delta, \zeta)_{B0}$ in the Enc algorithm.

In the above description, $k^*_0 := (-s_0, 0, 1, \eta_0, 0)_{B^*_0}$ is set in the KeyGen algorithm. Alternatively, by employing a predetermined value $\kappa$, $k^*_0 := (-s_0, 0, \kappa, \eta_0, 0)_{B^*_0}$ may be set. In this case, since $K := g_T^{\zeta\kappa}$ is calculated in the Dec algorithm, $c_{d+1} := g_T^{\zeta\kappa} m$ may be set in the Enc algorithm.

In the above description, the value of $v_{i,nt}$ is not particularly limited. However, a limitation of $v_{i,nt} := 1$ may be placed from the viewpoint of security proof.

From the viewpoint of security proof $\rho(i)$ for each integer $i=1, \ldots, L$ may be limited to a positive tuple $(t, \vec{v})$ or negative tuple $\neg(t, \vec{v})$ for different identification information $t$.

In other words, let a function $\rho^\sim$ be map of $\{1, \ldots, L\} \to \{1, \ldots, d\}$ with which $\rho^\sim(i)=t$ is established when $\rho(i)=(t, \vec{v})$ or $\rho(i)=\neg(t, \vec{v})$. In this case, $\rho^\sim$ may be limited to injection. Note that $\rho(i)$ is $\rho(i)$ in the access structure $S := (M, \rho(i))$ described above.

Embodiment 2

This embodiment describes a "ciphertext-policy functional encryption (CP-FE) scheme". The ciphertext-policy functional encryption described in this embodiment is constituted based on the concept described in Embodiment 1.

In this embodiment, initially, the basic structure of the "ciphertext-policy functional encryption scheme" will be described. Subsequently, the basic structure of a "cryptographic processing system 10" which implements the "ciphertext-policy functional encryption scheme" will be described. Then, a "ciphertext-policy functional encryption scheme" and a "cryptographic processing system 10" according to this embodiment will be described in detail.

<Basic Structure of Ciphertext-Policy Functional Encryption Scheme>

The structure of the ciphertext-policy functional encryption scheme will be briefly described. Note that ciphertext-policy means that policy is embedded in the ciphertext, that is, an access structure is embedded in the ciphertext.

The ciphertext-policy functional scheme consists of four algorithms: Setup, KeyGen, Enc, and Dec, in the same manner as the key-policy functional encryption scheme.

(Setup)

A Setup algorithm is a randomized algorithm that takes as input a security parameter $\lambda$ and an attribute format $\mu^\to := (d; n_1, \ldots, n_d)$, and outputs public parameters pk and a master key sk.

(KeyGen)

A KeyGen algorithm is a randomized algorithm that takes as input an attribute set $\Gamma := \{(t, \vec{x}_t) | \vec{x}_t \in F_q^{nt}, 1 \le t \le d\}$, the public parameters pk, and the master key sk, and outputs a decryption key $sk_\Gamma$.

(Enc)

An Enc algorithm is a randomized algorithm that takes as input a message m, an access structure $S := (M, \rho)$, and the public parameters pk, and outputs decrypted data c.

(Dec)

A Dec algorithm is an algorithm that takes as input the encrypted data c encrypted under the access structure S, the decryption key $sk_\Gamma$ for the attribute set $\Gamma$, and the public parameters pk, and outputs either the message m or distinguished symbol $\perp$.

The ciphertext-policy functional encryption scheme should have the following property: for all access structures S, the attribute set $\Gamma$, the correctly generated public parameters pk, the master key sk, and the ciphertext c indicated in Formula 151, it holds that $m=Dec(pk, sk_\Gamma, c)$ if the access structure S accepts the attribute set $\Gamma$. If the access structure S rejects the attribute set $\Gamma$, the probability of $m=Dec(pk, sk_{64}, c)$ is negligible.

$$c \xleftarrow{R} Enc(pk, m, \mathbb{S})$$ [Formula 151]

<Cryptographic Processing System 10>

The cryptographic processing system 10 that executes the algorithms of the ciphertext-policy functional encryption scheme described above will be described.

Figure 11:
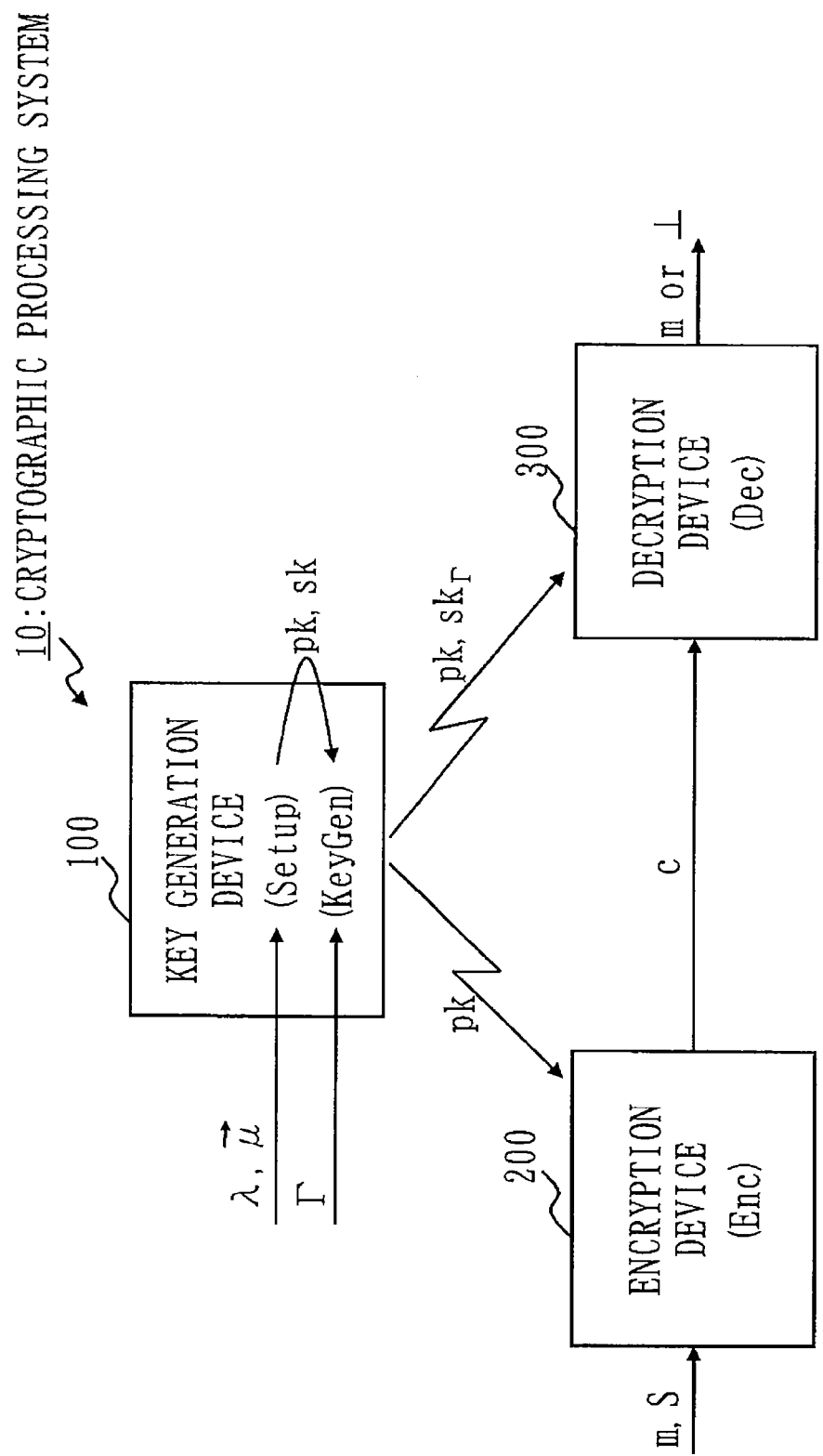
[FIG. 11] is a configuration diagram of a cryptographic processing system 10 which executes the algorithm of a ciphertext-policy functional encryption scheme.

FIG. 11 is a configuration diagram of the cryptographic processing system 10.

The cryptographic processing system 10 is provided with a key generation device 100, an encryption device 200, and a decryption device 300.

The key generation device 100 executes the Setup algorithm by taking as input a security parameter $\lambda$ and the attribute format $\mu^\to := (d; n_1, \ldots, n_d)$, and generates the public parameters pk and the master key sk. The key generation device 100 publicizes the generated public parameters pk. The key generation device 100 also executes the KeyGen algorithm by taking as input the attribute set $\Gamma$, generates a decryption key $sk_\Gamma$, and distributes the decryption key $sk_\Gamma$ to the decryption device 300 in secrecy.

The encryption device 200 executes the Enc algorithm by taking as input a message m, an access structure S, and the public parameters pk, and generates encrypted data c. The encryption device 200 transmits the generated encrypted data c to the decryption device 300.

The decryption device 300 executes the Dec algorithm by taking as input the public parameters pk, the decryption key $sk_\Gamma$, and the encrypted data c, and outputs the message m or distinguished symbol $\perp$.

<Ciphertext-Policy Functional Encryption Scheme and Cryptographic Processing System 10 in Detail>

The ciphertext-policy functional encryption scheme, and the function and operation of the cryptographic processing system 10 which executes the ciphertext-policy functional encryption scheme will be described with reference to FIGS. 12 to 15.

Figure 12:
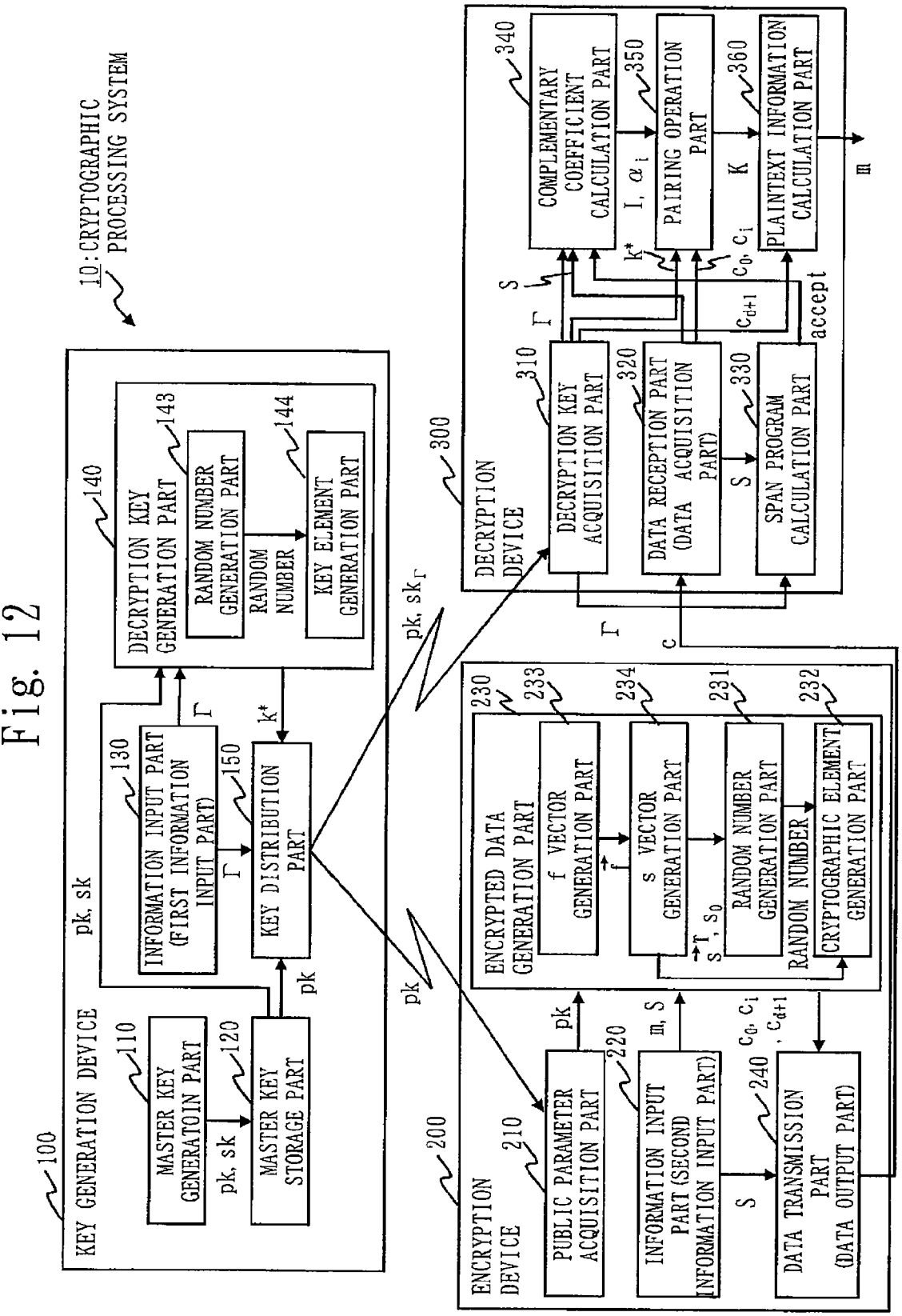
[FIG. 12] is a function block diagram showing the function of the cryptographic processing system 10 which executes the ciphertext-policy functional encryption scheme.

FIG. 12 is a function block diagram showing the function of the cryptographic processing system 10 which executes the ciphertext-policy functional encryption scheme. The cryptographic processing system 10 is provided with the key generation device 100, the encryption device 200, and the decryption device 300, as described above.

Figure 13:
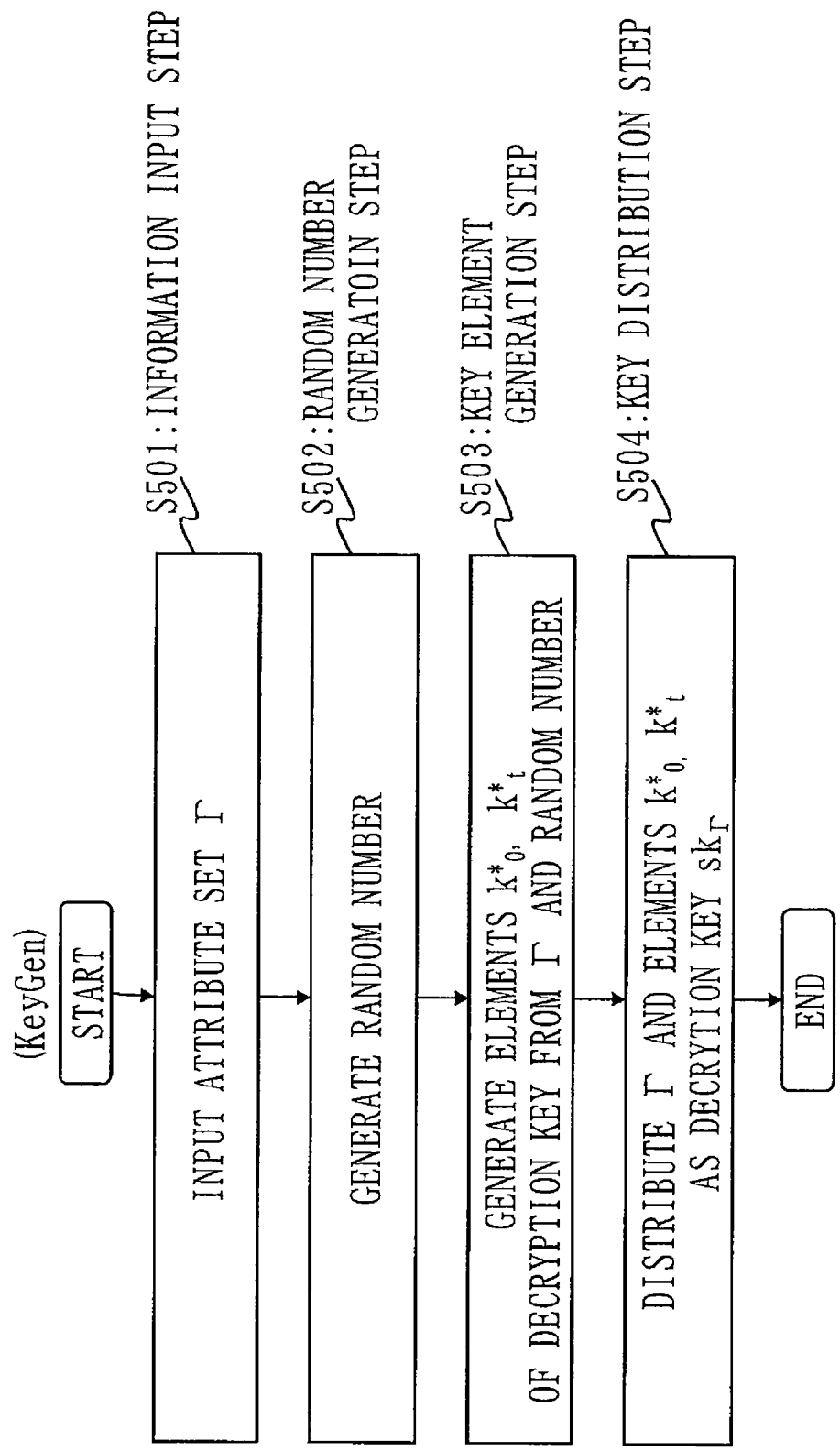
[FIG. 13] is a flowchart showing the process of the KeyGen algorithm.
Figure 14:
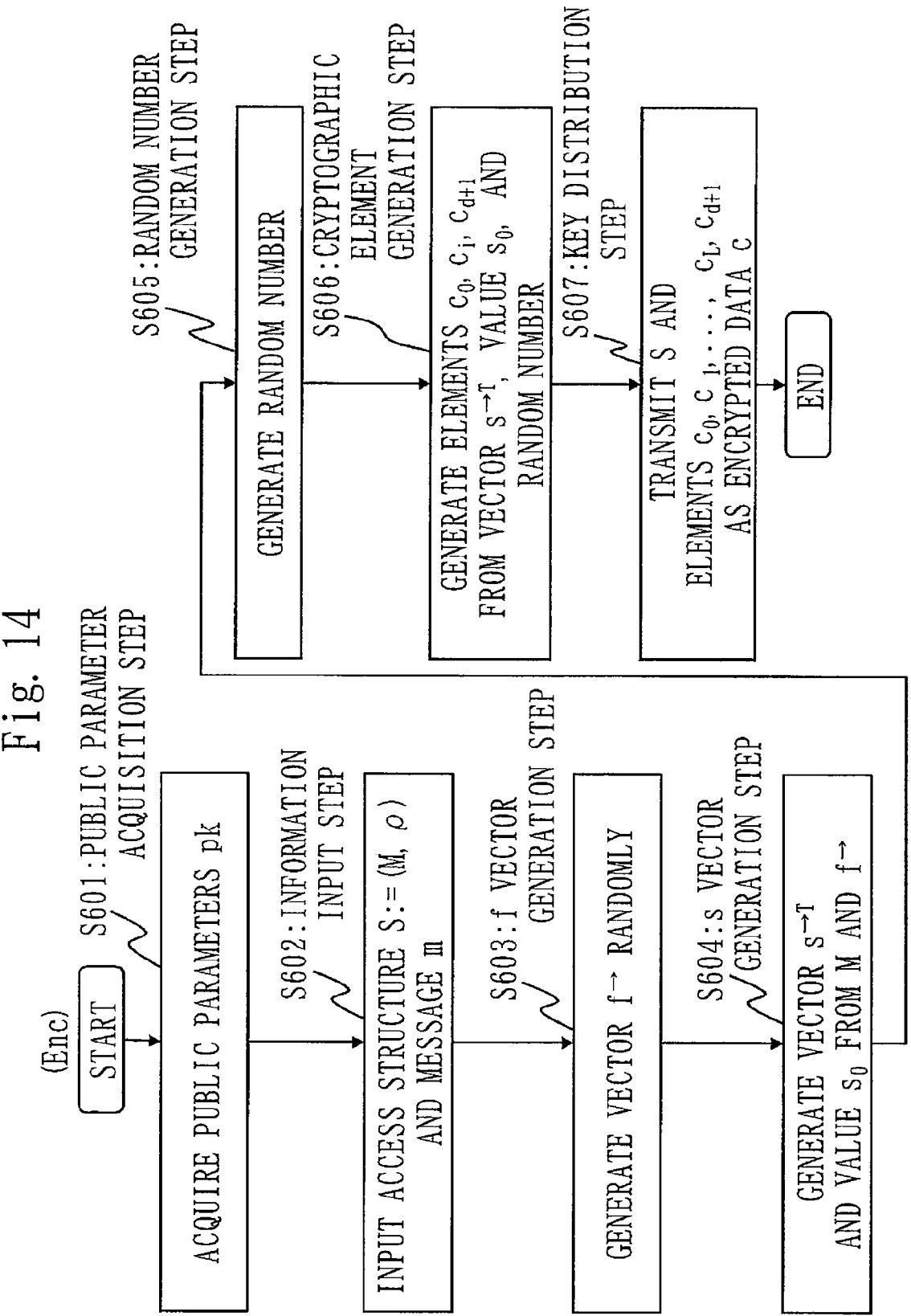
[FIG. 14] is a flowchart showing the process of the Enc algorithm.
Figure 15:
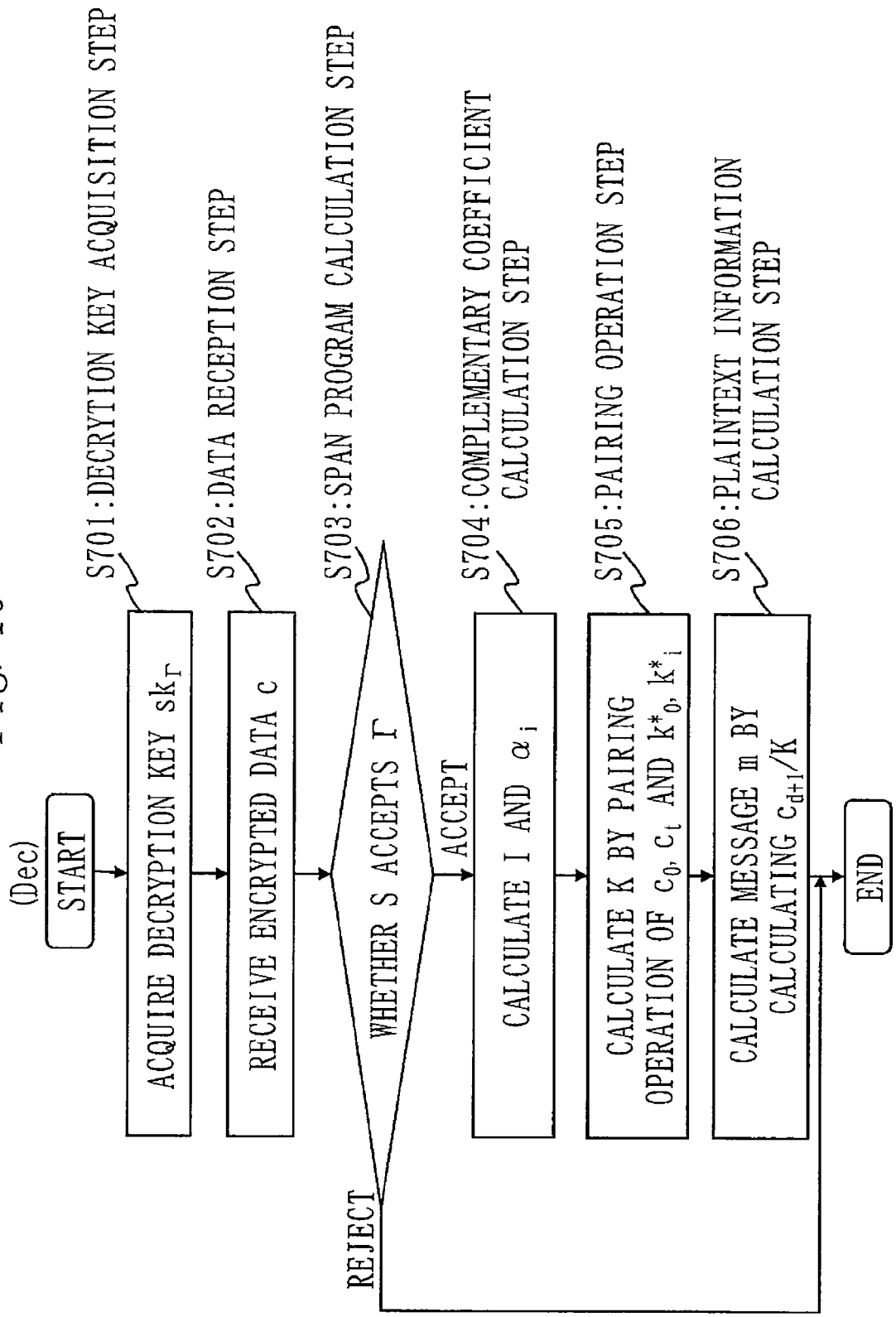
[FIG. 15] is a flowchart showing the process of the Dec algorithm.

FIG. 13 is a flowchart showing the operation of the key generation device 100 and the process of the Gen algorithm. The Setup algorithm is the same as that of the key-policy functional encryption scheme, and accordingly its detailed description will be omitted. FIG. 14 is a flowchart the operation of the encryption device 200 and the process of the Enc algorithm. FIG. 15 is a flowchart showing the operation of the decryption device 300 and the process of the Dec algorithm.

Assume that $x_{t,1}:=1$ in the following description.

The function and operation of the key generation device 100 will be described. The key generation device 100 is provided with a master key generation part 110, a master key storage part 120, an information input part 130 (first information input part), a decryption key generation part 140, and a key distribution part 150. The decryption key generation part 140 is provided with a random number generation part 143 and a key element generation part 144.

As described above, the Setup algorithm is similar to that of the key-policy functional encryption scheme, and is as indicated in Formula 131.

The process of the KeyGen algorithm will be described with reference to FIG. 13.

(S501: Information Input Step)

With an input device, the information input part 130 takes as input the attribute set $\Gamma:=\{(t, \vec{x}_t:=(x_{t,1}, \ldots, x_{t,n_t} \in \mathbb{F}_q^{n_t})) \mid 1 \leq t < d\}$. Note that, for example, the attribute information of the user of the decryption key $sk_\Gamma$ is set in the attribute set $\Gamma$.

(S502: Random Number Generation Step)

With a processing device, the random number generation part 143 generates random numbers $\delta, \phi_0, \phi_{t,1}, \ldots,$ and $\phi_{t,n_t}$, as indicated in Formula 152.

$$\delta, \phi_0, \phi_{t,1}, \ldots, \phi_{t,n_t} \xleftarrow{U} \mathbb{F}_q \text{ such that } (t, \vec{x}_t) \in \Gamma \quad \text{[Formula 152]}$$

(S503: Key Element Generation Step)

With the processing device, the key element generation part 144 generates an element $k^*_0$ of the decryption key $sk_\Gamma$, as indicated in Formula 153.

$$k_0^*:=(\delta, 0, 1, \phi_0, 0)_{\mathbb{B}_0^*} \quad \text{[Formula 153]}$$

With the processing device, the key element generation part 144 also generates an element $k^*_t$ of the decryption key $sk_\Gamma$ for each integer t of $(t, \vec{x}_t)$ included in $\Gamma$, as indicated in Formula 154.

$$k_t^* := (\overbrace{\delta(x_{t,1}, \ldots, x_{t,n_t})}^{n_t}, \overbrace{0^{n_t}}^{n_t}, \overbrace{\phi_{t,1}, \ldots, \phi_{t,n_t}}^{n_t}, \overbrace{0^{n_t}}^{n_t})_{\mathbb{B}_t^*} \quad \text{[Formula 153]}$$

(S504: Key Distribution Step)

For example, with a communication device, the key distribution part 150 distributes the decryption key $sk_\Gamma$ constituted by the attribute set $\Gamma$ inputted in (S501) and $k^*_0$ and $k^*_t$ generated in (S503) as elements, to the decryption device 300 in secrecy via the network. As a matter of course, the decryption key $sk_\Gamma$ may be distributed to the decryption device 300 by another method.

More specifically, from (S501) through (S503), the information input part 130 and decryption key generation part 140 generate the decryption key $sk_\Gamma$ by executing the KeyGen algorithm indicated in Formula 155. Then, in (S504), the decryption key $sk_\Gamma$ generated by the key distribution part 150 is distributed to the decryption device 300.

$KeyGen(pk, sk, \Gamma :=$ [Formula 155]

$\{(t, \vec{x}_t := (x_{t,1}, \ldots, x_{t,n_t}) \in \mathbb{F}_q^{n_t}) \mid 1 \leq t \leq d\}(x_{t,n_t} := 1)$ $\delta, \phi_0, \phi_{t,1}, \ldots, \phi_{t,n_t} \xleftarrow{U} \mathbb{F}_q$ such that $(t, \vec{x}_t) \in \Gamma$, $k_0^* := (\delta, 0, 1, \phi_0, 0)_{\mathbb{B}_0^*}$, $k_t^* := (\overbrace{\delta(x_{t,1}, \ldots, x_{t,n_t})}^{n_t}, \overbrace{0^{n_t}}^{n_t},$ $\overbrace{\phi_{t,1}, \ldots, \phi_{t,n_t}}^{n_t}, \overbrace{0^{n_t}}^{n_t})_{\mathbb{B}_t^*}$ for $(t, \vec{x}_t) \in \Gamma$, $sk_\Gamma := (\Gamma, k_0^*, \{k_t^*\}_{(t, \vec{x}_t) \in \Gamma})$ return $sk_\Gamma$.

The function and operation of the encryption device 200 will be described. The encryption device 200 is provided with a public parameter acquisition part 210, an information input part 220 (second information input part), an encrypted data generation part 230, and a data transmission part 240 (data output part). The encrypted data generation part 230 is provided with a random number generation part 231, a cryptographic element generation part 232, an f vector generation part 233, and an s vector generation part 234.

The process of the Enc algorithm will be described with reference to FIG. 14.

(S601: Public Parameter Acquisition Step)

For example, with the communication device, the public parameter acquisition part 210 acquires the public parameters pk generated by the key generation device 100, via the network.

(S602: Information Input Step)

With the input device, the information input part 220 takes as input the access structure $S:=(M, \rho)$. The access structure S is set depending on the condition of the system the user wishes to realize. Also, for example, the attribute information of the user who can decrypt the data is set in $\rho$ of the access structure S.

With the input device, the information input part 220 also takes as input the message m to be transmitted to the decryption device 300.

(S603: f Vector Generation Step)

With the processing device, the f vector generation part 233 generates a vector $\vec{f}$ having r pieces of elements, randomly as indicated in Formula 156.

$$\vec{f} \xleftarrow{U} \mathbb{F}_q^r \quad \text{[Formula 156]}$$

(S604: s Vector Generation Step)

With the processing device, the s vector generation part 234 generates a vector $\vec{s}^T:=(s_1, \ldots, s_L)^T$ based on the (L rows×r columns) matrix M included in the access structure S inputted in (S602) and the vector $\vec{f}$ generated in (S603), as indicated in Formula 157.

$$\vec{s}^T := (s_1, \ldots, s_L)^T := M \cdot \vec{f}^T \quad \text{[Formula 157]}$$

With the processing device, the s vector generation part 234 also generates a value $s_0$ based on the vector $\vec{f}$ generated in (S603), as indicated in Formula 158.

$$s_0 := \vec{1} \cdot \vec{f}^T \quad \text{[Formula 158]}$$

(S605: Random Number Generation Step)

With the processing device, the random number generation part 231 generates a random number $\eta_0$, a random number $\theta_i$ for each integer i=1, ..., L, and a random number $\zeta$, as indicated in Formula 159.

$$\eta_0, \theta_i, \zeta \xleftarrow{U} \mathbb{F}_q (i = 1, \ldots, L) \quad \text{[Formula 159]}$$

(S606: Cryptographic Element Generation Step)

With the processing device, the cryptographic element generation part 232 generates an element $c_0$ of the encrypted data c, as indicated in Formula 160.

$$c_0 := (-s_0, 0, \zeta, 0, \eta_0)_{\mathbb{B}_0^*} \quad \text{[Formula 160]}$$

With the processing device, the cryptographic element generation part 232 also generates an element $c_i$ of the encrypted data c for each integer i=1, ..., L, as indicated in Formula 161.

[Formula 161]

if $\rho(i) = (t, \vec{v}_i := (v_{i,1}, \ldots, v_{i,n_t}) \in \mathbb{F}_q^{n_t})$, $$\eta_{i,1}, \ldots, \eta_{i,n_t} \xleftarrow{U} \mathbb{F}_q,$$

$c_i :=$ $$\overline{(s_i + \theta_i v_{i,1}, \theta_i v_{i,2}, \ldots, \theta_i v_{i,n_t}, \overset{n_t}{0^{n_t}}, \overset{n_t}{0^{n_t}}, \overset{n_t}{\eta_{i,1}, \ldots, \eta_{i,n_t}})_{\mathbb{B}_t}},$$

if $\rho(i) = \neg (t, \vec{v}_i := (v_{i,1}, \ldots, v_{i,n_t}) \in \mathbb{F}_q^{n_t})$, $$\eta_{i,1}, \ldots, \eta_{i,n_t} \xleftarrow{U} \mathbb{F}_q,$$

$$c_i := \overline{(s_i(v_{i,1}, \ldots, v_{i,n_t}), \overset{n_t}{0^{n_t}}, \overset{n_t}{0^{n_t}}, \overset{n_t}{\eta_{i,1}, \ldots, \eta_{i,n_t}})_{\mathbb{B}_t}},$$

With the processing device, the cryptographic element generation part 232 also generates an element $c_{d+1}$ of the encrypted data c, as indicated in Formula 162.

$$c_{d+1} := g_T^\zeta m \quad \text{[Formula 162]}$$

(S607: Data Transmission Step)

For example, with the communication device, the data transmission part 240 transmits the encrypted data c, constituted by the access structure S inputted in (S602) and $c_0$, $c_1$, ..., $c_L$, and $c_{d+1}$ generated in (S606), as elements to the decryption device 300 via the network. As a matter of course, the encrypted data c may be transmitted to the decryption device 300 by another method.

More specifically, from (S601) through (S606), the public parameter acquisition part 210, the information input part 220, and the encrypted data generation part 230 generate the encrypted data c by executing the Enc algorithm indicated in Formula 163. In (S607), the data transmission part 240 transmits the generated encrypted data c to the decryption device 300.

[Formula 163]

$Enc(pk, m, \mathbb{S} := (M, \rho))$ $\vec{f} \xleftarrow{R} \mathbb{F}_q^r,$ $\vec{s}^T := (s_1, \ldots, s_L)^T := M \cdot \vec{f}^T, s_0 := \vec{1} \cdot \vec{f}^T,$ $\eta_0, \theta_i, \zeta \xleftarrow{U} \mathbb{F}_q (i = 1, \ldots, L),$ $c_0 := (-s_0, 0, \zeta, 0, \eta_0)_{\mathbb{B}_0},$ for $1 \leq i \leq L$ if $\rho(i) = (t, \vec{v}_i := (v_{i,1}, \ldots, v_{i,n_t}) \in \mathbb{F}_q^{n_t})$, $\eta_{i,1}, \ldots, \eta_{i,n_t} \xleftarrow{U} \mathbb{F}_q,$ -continued $$c_i := \overline{(s_i + \theta_i v_{i,1}, \theta_i v_{i,2}, \ldots, \theta_i v_{i,n_t},}$$

$$\overset{n_t}{0^{n_t}}, \overset{n_t}{0^{n_t}}, \overset{n_t}{\eta_{i,1}, \ldots, \eta_{i,n_t}})_{\mathbb{B}_t},$$

if $\rho(i) = \neg (t, \vec{v}_i := (v_{i,1}, \ldots, v_{i,n_t}) \in \mathbb{F}_q^{n_t})$, $\eta_{i,1}, \ldots, \eta_{i,n_t} \xleftarrow{U} \mathbb{F}_q,$ $$c_i := \overline{(s_i(v_{i,1}, \ldots, v_{i,n_t}), \overset{n_t}{0^{n_t}},}$$

$$\overset{n_t}{0^{n_t}}, \overset{n_t}{\eta_{i,1}, \ldots, \eta_{i,n_t}})_{\mathbb{B}_t},$$

$c_{d+1} := g_T^\zeta m, c := (\mathbb{S}, c_0, c_1, \ldots, c_L, c_{d+1}).$ return $c$.

The function and operation of the decryption device 300 will be described. The decryption device 300 is provided with a decryption key acquisition part 310, a data reception part 320 (data acquisition part), a span program calculation part 330, a complementary coefficient calculation part 340, a pairing operation part 350, and a plaintext information calculation part 360.

The process of the Dec algorithm will be described with reference to FIG. 15.

(S701: Decryption key Acquisition Step)

For example, with the communication device, the decryption key acquisition part 310 acquires the decryption key $sk_\Gamma$ distributed from the key generation device 100, via the network. The decryption key acquisition part 310 also acquires the public parameters pk generated by the key generation device 100.

(S702: Data Reception Step)

For example, with the communication device, the data reception part 320 receives the encrypted data c transmitted by the encryption device 200, via the network.

(S703: Span Program Calculation Step)

With the processing device, the span program calculation part 330 checks whether or not the access structure S included in the encrypted data c acquired in (S702) accepts $\Gamma$ included in the decryption key $sk_\Gamma$ received in (S701). The method of checking whether or not the access structure S accepts $\Gamma$ is the same as that described in "3. Concept for Implementing Functional Encryption".

The span program calculation part 330 advances the process to (S704) if the access structure S accepts $\Gamma$ (accept in S703). If the access structure S rejects $\Gamma$ (reject in S403), the span program calculation part 330 judges that the encrypted data c cannot be decrypted with the decryption key $sk_\Gamma$, and ends the process.

(S704) through (S706) are the same as (S404) through (406) shown in FIG. 9 of Embodiment 1.

More specifically, from (S701) through (S706), the decryption key acquisition part 310, the data reception part 320, the span program calculation part 330, the complementary coefficient calculation part 340, the pairing operation part 350, and the plaintext information calculation part 360 generate a message m' (=m) by executing the Dec algorithm indicated in Formula 164.

$$Dec\left(pk, sk_\Gamma := \left(\Gamma, k_0^*, \{k_t^*\}_{(t, \vec{x}_t) \in \Gamma}\right), \quad \text{[Formula 164]}\right.$$

$$c := (\mathbb{S}, c_0, c_1, \ldots, c_L, c_{d+1})\bigg)$$

-continued if $\mathbb{S}:=(M,\rho)$ accepts $\Gamma:=\{(t,\vec{x}_t)\}$, then compute $I$ and $\{\alpha_i\}_{i\in I}$ such that $$s_0 = \sum_{i\in I}\alpha_i s_i, \text{ and}$$

$$I \subseteq \{i\in\{1,\ldots,L\}\mid [$$

$$\rho(i)=(t,\vec{v}_i)\wedge(t,\vec{x}_t)\in\Gamma\wedge\vec{v}_i\cdot\vec{x}_i=0]\vee$$

$$[\rho(i)=\neg(t,\vec{v}_i)\wedge(t,\vec{x}_t)\in\Gamma\wedge\vec{v}_i\cdot\vec{x}_i\neq 0]\}.$$

$$K := e(c_0, k_0^*) \cdot \prod_{i\in I\wedge\rho(i)=(t,\vec{v}_i)} e(c_i, k_t^*)^{\alpha_i} \cdot$$

$$\prod_{i\in I\wedge\rho(i)=\neg(t,\vec{v}_i)} e(c_i, k_t^*)^{\alpha_i/(\vec{v}_i\cdot\vec{x}_i)}$$

$m' = c_{d+1}/K$.

return $m'$.

The cryptographic processing system 10 according to Embodiment 2 implements an encryption scheme that can design access control with a very high degree of freedom, in the same manner as the cryptographic processing system 10 according to Embodiment 1. Also, the cryptographic processing system 10 according to Embodiment 2 is very secure, as the cryptographic processing system 10 according to Embodiment 1 is.

As in Embodiment 1, $N_t = n_t + n_t + n_t + n_t$ may be replaced by $n_t + u_t + w_t + z_t$. More specifically, the first $n_t$ may remain $n_t$, the second $n_t$ may be changed to $u_t$, the third $n_t$ may be changed to $w_t$, and the fourth $n_t$ may be changed to $z_t$. That is, $n_t + u_t + w_t + z_t$ may be set in $N_t$. Note that $n_t$, $u_t$, $w_t$, and $z_t$ can be different values where $n_t$ is an integer of 1 or more, as described above, and each of $u_t$, $w_t$, and $z_t$ is an integer of 0 or more.

In this case, the Setup algorithm is rewritten as indicated in Formula 148, in the same manner as in Embodiment 1.

Also, the KeyGen algorithm indicated in Formula 155 is rewritten as indicated in Formula 165.

[Formula 165]

$KeyGen(pk, sk,$ $$\Gamma := \{(t,\vec{x}_t := (x_{t,1},\ldots,x_{t,n_t})\in\mathbb{F}_q^{n_t})\mid 1\leq t\leq d\}(x_{t,n_t}:=1)$$

$\delta, \phi_0, \phi_{t,1}, \ldots, \phi_{t,w_t} \xleftarrow{U} \mathbb{F}_q$ such that $(t,\vec{x}_t)\in\Gamma$, $k_0^* := (\delta, 0, 1, \phi_0, 0)_{B_0^*}$, $$k_t^* := (\overbrace{\delta(x_{t,1},\ldots,x_{t,n_t})}^{n_t},\overbrace{0^{u_t}}^{u_t},\overbrace{\phi_{t,1},\ldots,\phi_{t,w_t}}^{w_t},\overbrace{0^{z_t}}^{z_t})_{B_t^*} \text{ for } (t,\vec{x}_t)\in\Gamma,$$

$sk_\Gamma := (\Gamma, k_0^*, \{k_t^*\}_{(t,\vec{x}_t)\in\Gamma})$ return $sk_\Gamma$.

Also, the Enc algorithm indicated in Formula 163 is rewritten as indicated in Formula 166.

$Enc(pk, m, \mathbb{S} := (M,\rho))$ [Formula 166]

$\vec{f} \xleftarrow{R} \mathbb{F}_q^r, \vec{s}^T := (s_1,\ldots,s_L)^T := M\cdot\vec{f}^T, s_0 := \vec{1}\cdot\vec{f}^T,$ $\eta_0, \theta_i, \zeta \xleftarrow{U} \mathbb{F}_q(i=1,\ldots,L),$ -continued $c_0 := (-s_0, 0, \zeta, 0, \eta_0)_{B_0}$, for $1\leq i\leq L$ if $\rho(i) = (t,\vec{v}_i := (v_{i,1},\ldots,v_{i,n_t})\in\mathbb{F}_q^{n_t})$, $\eta_{i,1},\ldots,\eta_{i,z_t} \xleftarrow{U} \mathbb{F}_q$, $c_i :=$ $$(\overbrace{s_i+\theta_i v_{i,1}, \theta_i v_{i,2}, \ldots, \theta_i v_{i,n_t}}^{n_t},\overbrace{0^{u_t}}^{u_t},\overbrace{0^{w_t}}^{w_t},\overbrace{\eta_{i,1},\ldots,\eta_{i,z_t}}^{n_t})_{B_t},$$

if $\rho(i) = \neg(t,\vec{v}_i := (v_{i,1},\ldots,v_{i,n_t})\in\mathbb{F}_q^{n_t})$, $\eta_{i,1},\ldots,\eta_{i,z_t} \xleftarrow{U} \mathbb{F}_q$, $$c_i := (\overbrace{s_i(v_{i,1},\ldots,v_{i,n_t})}^{n_t},\overbrace{0^{u_t}}^{u_t},\overbrace{0^{w_t}}^{w_t},\overbrace{\eta_{i,1},\ldots,\eta_{i,z_t}}^{z_t})_{B_t},$$

$c_{d+1} := g_T^\zeta m, c := (\mathbb{S}, c_0, c_1, \ldots, c_L, c_{d+1})$.

return $c$.

Note that the Dec algorithm indicated in Formula 164 remains unchanged.

Also, $N_0$ need not be 5 but may be an integer of 2 or more. When $N_0$ is 2, the bases $B_0$ and $B_0^*$ become two-dimensional. In this case, $k_0^* := (\delta, 1)_{B_0^*}$ may be set in the KeyGen algorithm, and $c_0 := (-s_0, \zeta)_{B_0}$ may be set in the Enc algorithm.

In the above description, $k_0^* := (\delta, 0, 1, \phi_0, 0)_{B_0^*}$ is set in the KeyGen algorithm. Alternatively, by employing a predetermined value $\kappa$, $k_0^* := (\delta, 0, \kappa, \phi_0, 0)_{B_0^*}$ may be set. In this case, since $K := g_T^{\zeta\kappa}$ is calculated in the Dec algorithm, $c_{d+1} := g_T^{\zeta\kappa} m$ may be set in the Enc algorithm.

In the above description, the value of $v_{i,n_t} := 1$ is not particularly limited. However, the value of $v_{i,n_t}$ may be limited to satisfy $v_{i,n_t} := 1$ from the viewpoint of proving the security.

From the viewpoint of proving the security, $\rho(i)$ for each integer $i=1,\ldots,L$ may be limited to a positive tuple $(t, \vec{v})$ or negative tuple $\neg(t, \vec{v})$ for different identification information $t$.

In other words, let a function $\rho^\sim$ be map of $\{1,\ldots,L\}\to\{1,\ldots,d\}$ with which $\rho^\sim(i)=t$ when $\rho(i)=(t,\vec{v})$ or $\rho(i)=\neg(t,\vec{v})$ is established. In this case, $\rho^\sim$ may be limited to injection. Note that $\rho(i)$ is $\rho(i)$ in the access structure $\mathbb{S} := (M, \rho(i))$ described above.

Embodiment 1 has described the key-policy functional encryption with which the access structure S is contained in the decryption key $sk_s$ and the attribute set $\Gamma$ is contained in the encrypted data c. Also, Embodiment 2 has described the ciphertext-policy functional encryption with which the access structure S is contained in the encrypted data c and the attribute set $\Gamma$ is contained in the decryption key $sk_\Gamma$.

Alternatively, two access structures $S_1$ and $S_2$ may be prepared. Namely, one access structure $S_1$ may be contained in the decryption key, and the other access structure $S_2$ may be contained in the encrypted data c. At the same time, an attribute set $\Gamma_2$ corresponding to the access structure $S_2$ may be contained in the decryption key, and an attribute set $\Gamma_1$ corresponding to the access structure $S_1$ may be contained in the decrypted data c. The encrypted data c may be decryptable with the decryption key if and only if the access structure $S_1$ accepts the attribute set $\Gamma_1$ and the access structure $S_2$ accepts the attribute set $\Gamma_2$.

Namely, an encryption scheme may be employed in which the key-policy functional encryption and the ciphertext-policy functional encryption are combined.

Embodiment 3

In this embodiment, a signature scheme to which the "ciphertext-policy functional encryption scheme" described in Embodiment 2 is applied will be described.

In this embodiment, initially, the basic structure of the "signature scheme based on the ciphertext-policy functional encryption scheme" will be described. Subsequently, the basic structure of a "signature processing system 20" which implements this "signature scheme" will be described. Then, a "signature scheme" and a "signature processing system 20" according to this embodiment will be described in detail.

<Basic Structure of Signature Scheme Based on Ciphertext-Policy Functional Encryption Scheme>

The signature scheme based on the ciphertext-policy functional encryption scheme consists of four algorithms: Setup, KeyGen, Sig, and Ver.

(Setup)

A Setup algorithm is a randomized algorithm that takes as input a security parameter $\lambda$ and an attribute format $\vec{\mu} := (d; n_1, \ldots, n_d)$, and outputs public parameters pk and a master key sk.

(KeyGen)

A KeyGen algorithm is a randomized algorithm that takes as input an attribute set $\Gamma := \{(t, \vec{x}_t) | \vec{x}_t \in \mathbb{F}_q^{n_t}, 1 \leq t \leq d\}$, the public parameters pk, and the master key sk, and outputs a signature key $sk_\Gamma$.

(Sig)

A Sig algorithm is a randomized algorithm that takes as input a message m, the signature key $sk_\Gamma$, an access structure $\mathbb{S} := (M, \rho)$, and the public parameters pk, and outputs signature data sig.

(Ver)

A Ver algorithm is an algorithm that takes as input the message in, the access structure $\mathbb{S} := (M, \rho)$, the signature data sig, and the public parameters pk, and outputs a value "1" representing success of verification of the signature, or a value "0" representing failure of verification of the signature fails.

<Signature Processing System 20>

The signature processing system 20 that executes the algorithms of the signature process described above will be described.

Figure 16:
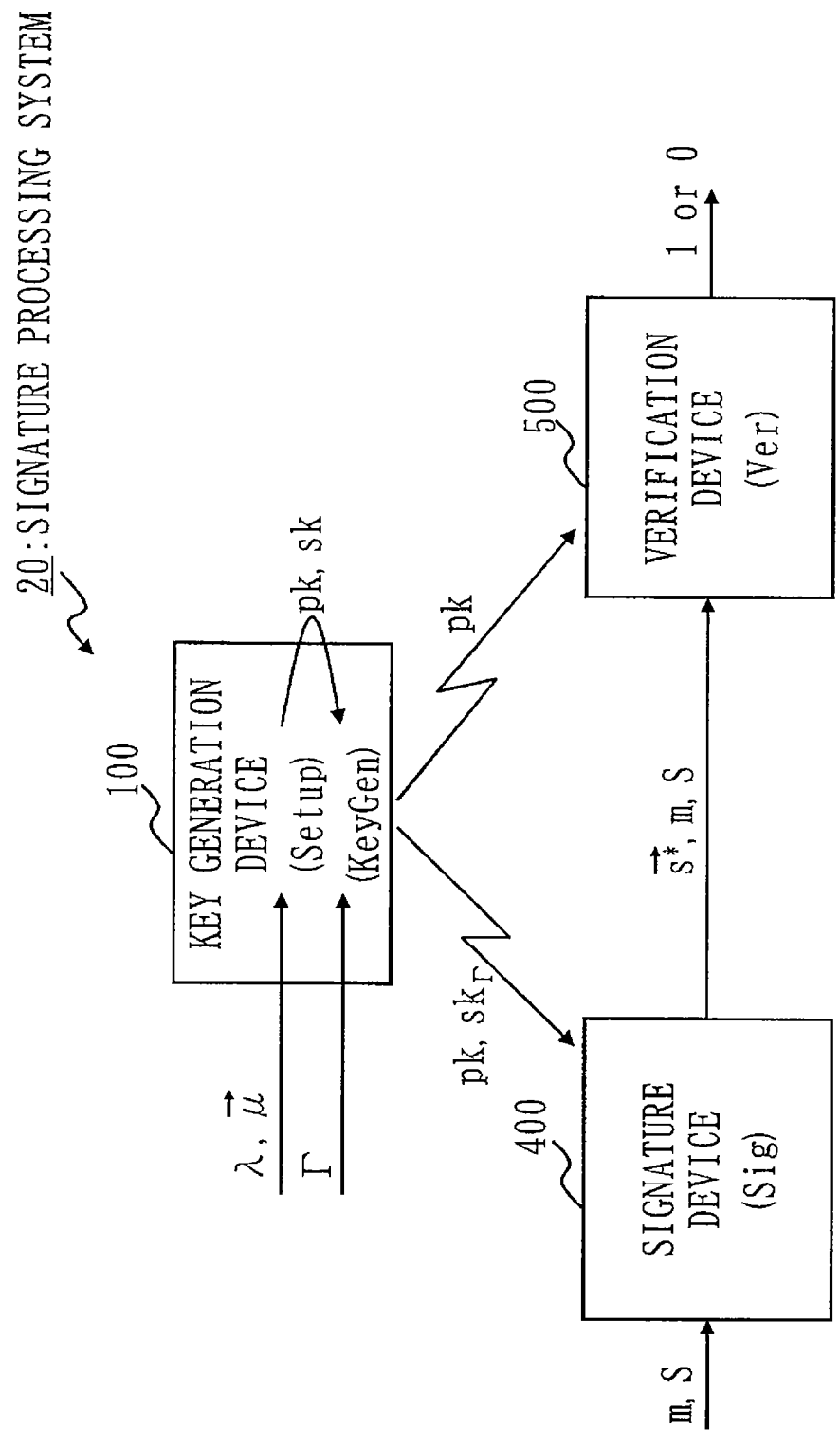
[FIG. 16] is a configuration diagram of a signature processing system 20.

FIG. 16 is a configuration diagram of the signature processing system 20.

The signature processing system 20 is provided with a key generation device 100, a signature device 400, and a verification device 500.

The key generation device 100 executes the Setup algorithm by taking as input a security parameter $\lambda$ and an attribute format $\vec{\mu} := (d; n_1, \ldots, n_d)$ and generates public parameters pk and a master key sk. The key generation device 100 publicizes the generated public parameters pk. The key generation device 100 also executes the KeyGen algorithm by taking as input an attribute set $\Gamma$, generates a signature key $sk_\Gamma$, and distributes the signature key $sk_\Gamma$ to the signature device 400 in secrecy.

The signature device 400 executes the Sig algorithm by taking as input a message m, an access structure S, the public parameters pk, and the signature key $sk_\Gamma$, and generates a signature vector $\vec{s}^*$. The signature device 400 transmits the generated signature vector $\vec{s}^*$, the message m, and the access structure S to the verification device 500.

The verification device 500 executes the Ver algorithm by taking as input the signature vector $\vec{s}^{**}$, the message m, the access structure S, and the public parameters pk, and outputs a value "1" or "0".

<Signature Scheme and Signature Processing System 20 in Detail>

The signature scheme, and the function and operation of the signature processing system 20 will be described with reference to FIGS. 17 to 21.

Figure 17:
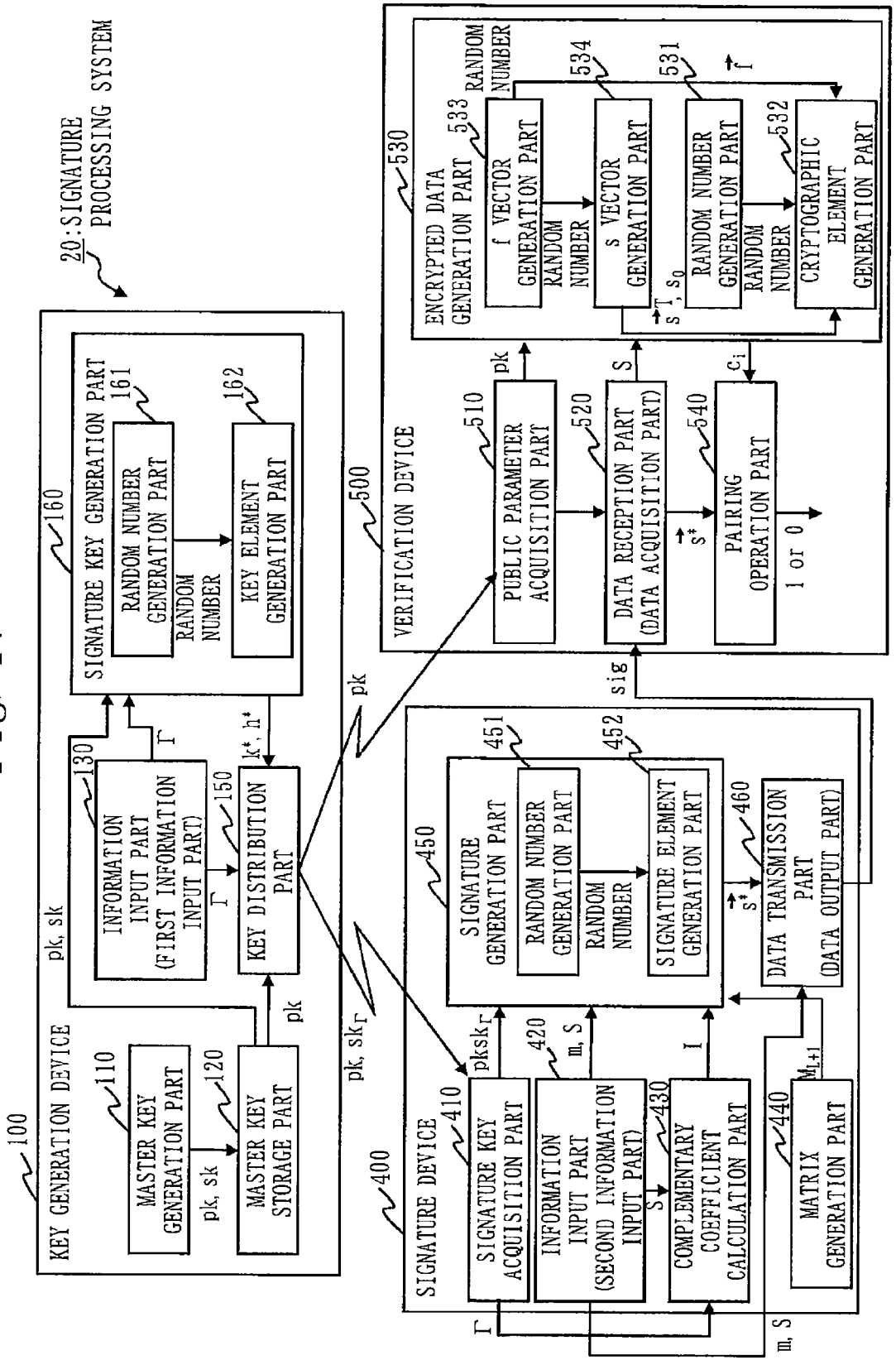
[FIG. 17] is a function block diagram showing the function of the signature processing system 20.

FIG. 17 is a function block diagram showing the function of the signature processing system 20. The signature processing system 20 is provided with the key generation device 100, the signature device 400, and the verification device 500, as described above.

Figure 18:
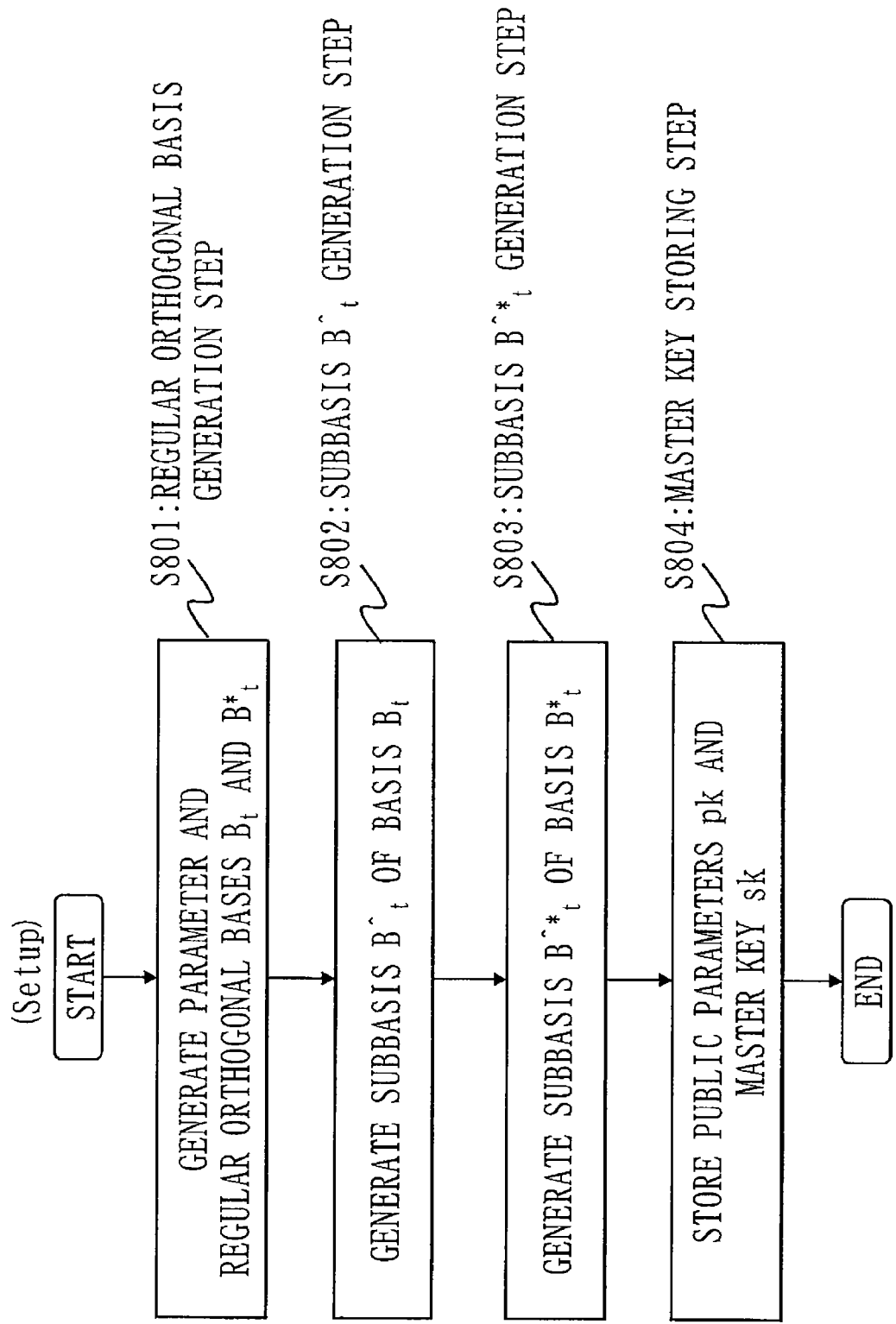
[FIG. 18] is a flowchart showing the process of the Setup algorithm.
Figure 19:
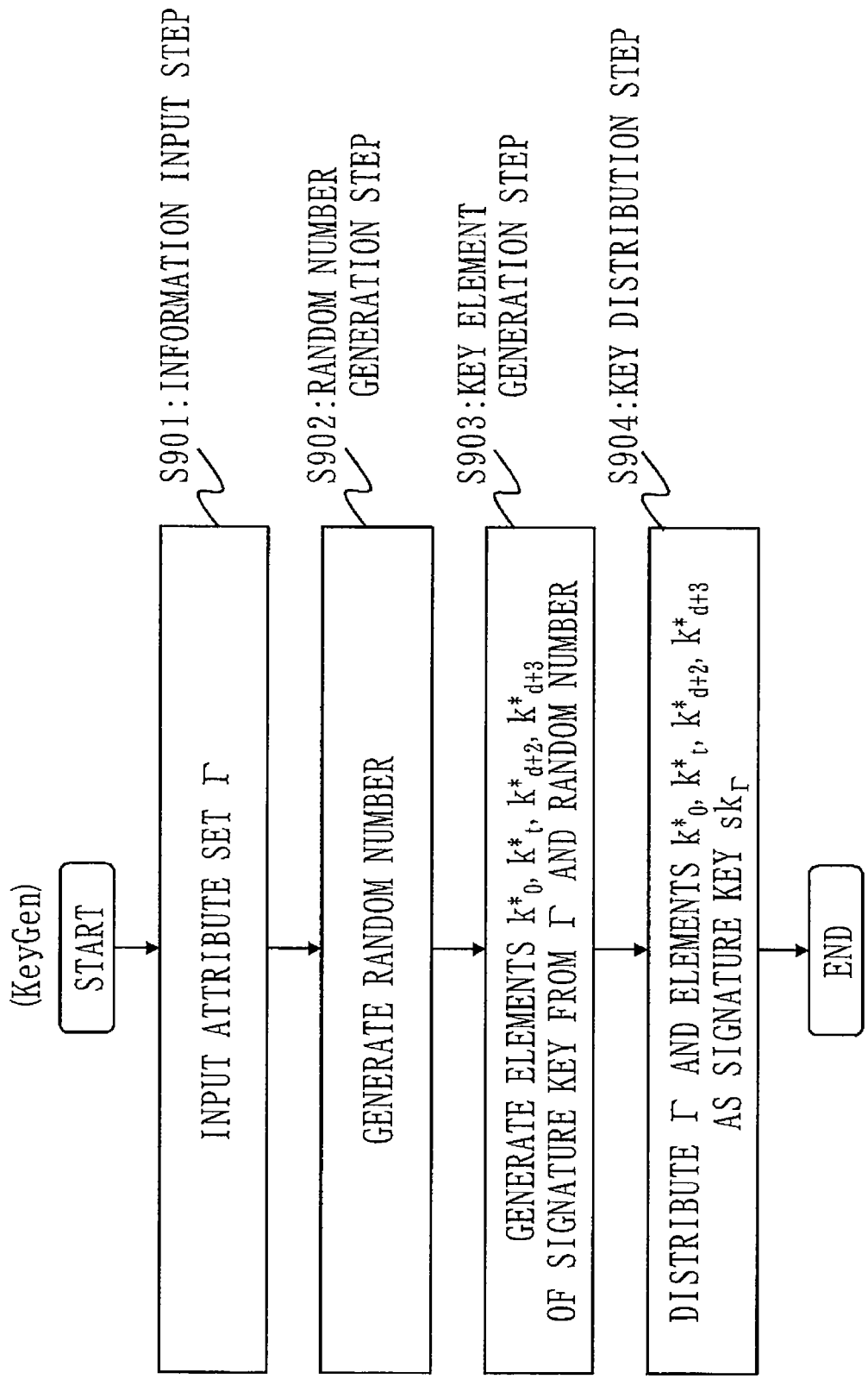
[FIG. 19] is a flowchart showing the process of the KeyGen algorithm.
Figure 20:
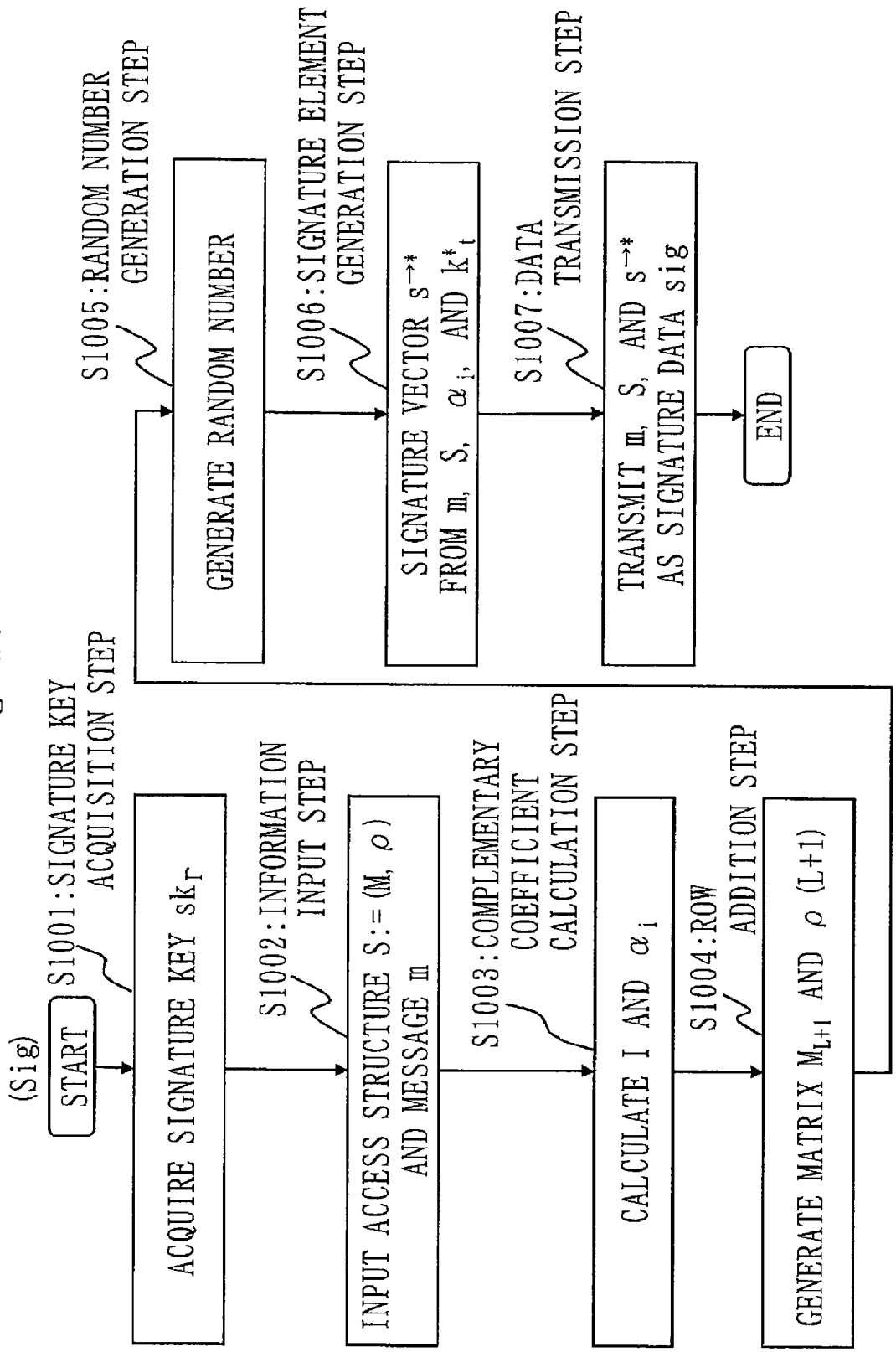
[FIG. 20] is a flowchart showing the process of Sig algorithm.
Figure 21:
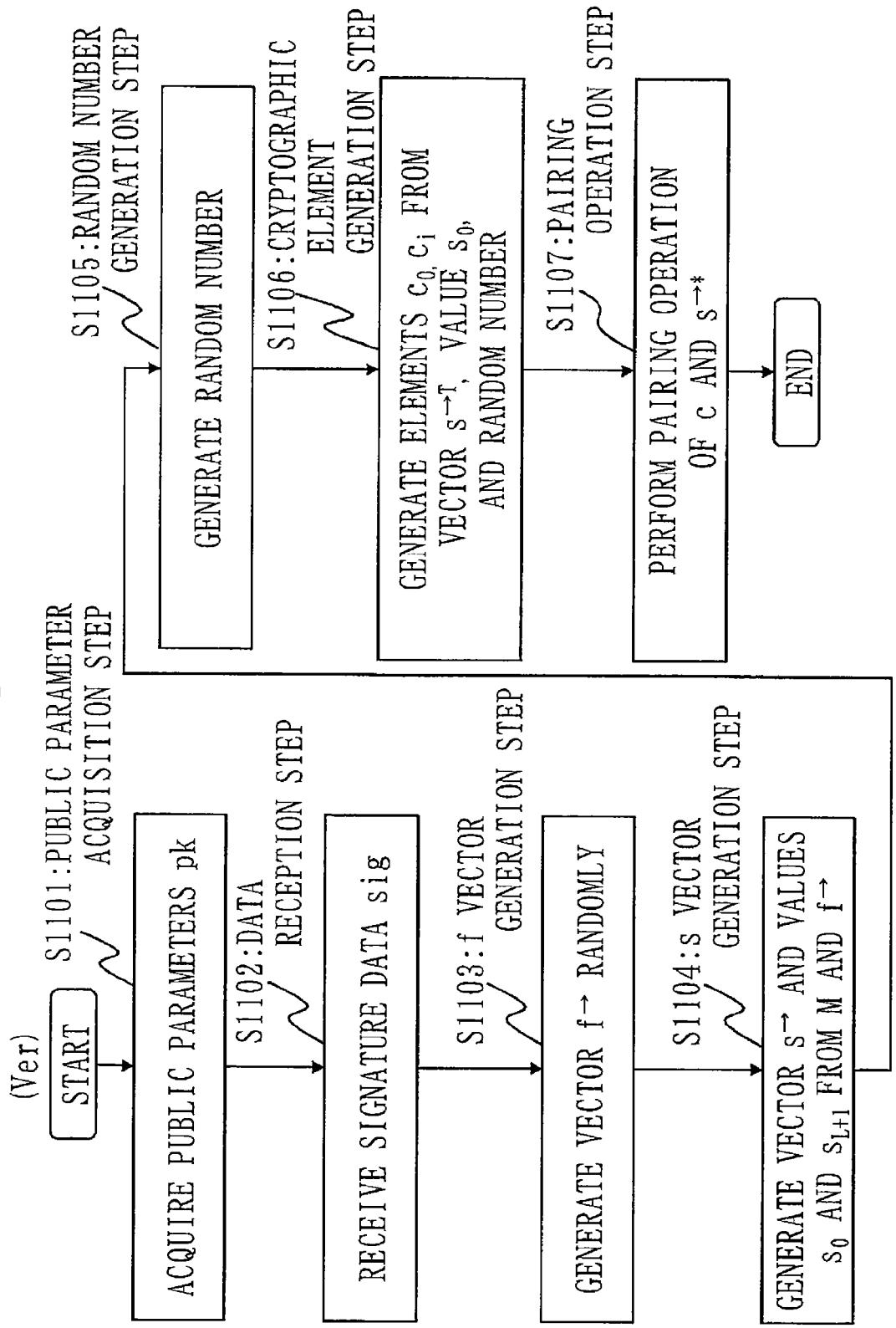
[FIG. 21] is a flowchart showing the process of Ver algorithm.

FIGS. 18 and 19 are flowcharts showing the operation of the key generation device 100. FIG. 18 is a flowchart showing the process of the Setup algorithm, and FIG. 19 is a flowchart showing the process of the KeyGen algorithm. FIG. 20 is a flowchart showing the operation of the signature device 400 and the process of the Sig algorithm. FIG. 21 is a flowchart showing the operation of the verification device 500 and the process of the Ver algorithm.

Assume that $x_{t,1} := 1$ in the following description.

The function and operation of the key generation device 100 will be described. The key generation device 100 is provided with a master key generation part 110, a master key storage part 120, an information input part 130 (first information input part), a signature key generation part 160, and a key distribution part 150. The signature key generation part 160 is provided with a random number generation part 161, a key element generation part 162, and a confidential element generation part 163.

The process of the Setup algorithm will be described first with reference to FIG. 18.

(S801: Regular Orthogonal Basis Generation Step)

The master key generation part 110 calculates Formula 167 with a processing device to generate $param_{\vec{\mu}}$, and bases $\mathbb{B}_t$ and $\mathbb{B}^*_t$ for each integer $t = 0, \ldots, d+2$.

[Formula 167]

$$\text{input } 1^\lambda, \vec{\mu} := (d; n_1 \ldots, n_d) \quad (1)$$

$$param_\mathbb{G} := (q, \mathbb{G}, \mathbb{G}_T, g, e) \xleftarrow{R} \mathcal{G}_{bpg}(1^\lambda) \quad (2)$$

$$\psi \xleftarrow{U} \mathbb{F}_q^\times, n_0 := n_{d+1} := 1, n_{d+2} := 2, \quad (3)$$

$$N_t := 4n_t \text{ for } t = 0, \ldots, d+2$$

The processes of (4) to (8) are executed for each $t = 0, \ldots, d+2$.

$$param_{\mathbb{V}_t} := \quad (4)$$
$$(q, \mathbb{V}_t, \mathbb{G}_T, \mathbb{A}_t, e) := \mathcal{G}_{dpvs}(1^\lambda, N_t, param_\mathbb{G})$$

$$X_t := (\chi_{t,i,j})_{i,j} \xleftarrow{U} GL(N_t, \mathbb{F}_q) \quad (5)$$

$$(v_{t,i,j})_{i,j} := \psi \cdot (X_t^T)^{-1} \quad (6)$$

$$b_{t,i} := (\chi_{t,i,1}, \ldots, \chi_{t,i,N_t})_{\mathbb{A}_t} = \sum_{j=1}^{N_t} \chi_{t,i,j} a_{t,j}, \quad (7)$$

$$\mathbb{B}_t := (b_{t,1}, \ldots, b_{t,N_t})$$

$$b^*_{t,i} := (v_{t,i,1}, \ldots, v_{t,i,N_t})_{\mathbb{A}_t} = \sum_{j=1}^{N_t} v_{t,i,j} a_{t,j}, \quad (8)$$

$$\mathbb{B}^*_t := (b^*_{t,1}, \ldots, b^*_{t,N_t})$$

$$g_T := e(g, g)^\psi \quad (9)$$

$$param_{\vec{\mu}} := \left(\{param_{\mathbb{V}_t}\}_{t=0,\ldots,d+2}, g_T\right)$$

An explanation will be made on Formula 167 but only for portions that are different from those in Formula 127 shown in (S101) of Embodiment 1. First, for Formula 167, in (3), 1 is set in $n_0$ and $n_{d+1}$, and 2 is set in $n_{d+2}$. For integer $t=0, \ldots, d+2$, $4n_t$ is set in $N_t$. The processes of (4) to (8) are repeated for each integer $t=0, \ldots, d+2$.

More specifically, in (S801), the master key generation part 110 executes the algorithm $G_{ob}$ indicated in Formula 168, to generate $param_{\vec{\mu}}$, and the bases $B_t$ and $B^*_t$ for each integer $t=0, \ldots, d+2$.

$\mathcal{G}_{ob}(1^\lambda, \vec{\mu} := (d; n_1 \ldots, n_d)) : param_{\mathbb{G}} :=$ [Formula 168]

$\quad (q, \mathbb{G}, \mathbb{G}_T, g, e) \xleftarrow{R} \mathcal{G}_{bpg}(1^\lambda),$ $\psi \xleftarrow{U} \mathbb{F}_q^\times,$ $n_0 := n_{d+1} := 1, n_{d+2} := 2,$ $\quad N_t := 4n_t \text{ for } t = 0, \ldots, d+2,$ For $t = 0, \ldots, d+2,$ $param_{\mathbb{V}_t} :=$ $\quad (q, \mathbb{V}_t, \mathbb{G}_T, \mathbb{A}_t, e) := \mathcal{G}_{dpvs}(1^\lambda, N_t, param_{\mathbb{G}}),$ $X_t := (\chi_{t,i,j})_{i,j} \xleftarrow{U} GL(N_t, \mathbb{F}_q),$ $\quad (v_{t,i,j})_{i,j} := \psi \cdot (X_t^T)^{-1},$ $b_{t,i} := (\chi_{t,i,1}, \ldots, \chi_{t,i,N_t})_{\mathbb{A}_t} = \sum_{j=1}^{N} \chi_{t,i,j} a_{t,j},$ $\mathbb{B}_t := (b_{t,1}, \ldots, b_{t,N_t}),$ $b^*_{t,i} := (v_{t,i,1}, \ldots, v_{t,i,N_t})_{\mathbb{A}_t} = \sum_{j=1}^{N_t} v_{t,i,j} a_{t,j},$ $\mathbb{B}^*_t := (b^*_{t,1}, \ldots, b^*_{t,N_t}),$ $g_T := e(g, g)^\psi,$ $param_{\vec{\mu}} := (\{param_{\mathbb{V}_t}\}_{t=0,\ldots,d+2}, g_T)$ return $(param_{\vec{\mu}}, \{\mathbb{B}_t, \mathbb{B}^*_t\}_{t=0,\ldots,d+2}).$ (S802: Subbasis $\hat{B}_t$ Generation Step)

With the processing device, the master key generation part 110 generates a subbasis $\hat{B}_0$ for each integer $t=1, \ldots, d+2$, as indicated in Formula 169.

$\hat{\mathbb{B}}_t := (b_{t,1}, \ldots, b_{t,n_t}, b_{t,3n_t+1}, \ldots, b_{t,4n_t})$ [Formula 169]

(S803: Subbasis $\hat{B}^*_t$ Generation Step)

With the processing device, the master key generation part 110 generates a subbasis $\hat{B}^*_t$ for each integer $t=1, \ldots, d+2$, as indicated in Formula 170.

$\hat{\mathbb{B}}^*_t := (b^*_{t,1}, \ldots, b^*_{t,n_t}, b^*_{t,2n_t+1}, \ldots, b^*_{t,3n_t})$ [Formula 170]

(S804: Master Key Storing Step)

The master key generation part 110 treats the subbasis $\hat{B}_t$ for each integer $t=0, \ldots, d+2$, the subbasis $\hat{B}^*_0$ for each integer $t=1, \ldots, d+2$, the basis vector $b^*_{0,3}$, the security parameter $\lambda(1^\lambda)$ inputted in (S101), and $param_{\vec{\mu}}$ generated in (S101), as the public parameters pk.

The master key generation part 110 treats the basis vector $b^*_{0,1}$ as the master key sk.

The master key storage part 120 stores the public parameters pk and the master key sk, in the storage device.

More specifically, from (S801) through (S803), the master key generation part 110 generates the public parameters pk and the master key sk by executing the Setup algorithm indicated in Formula 171. Then, in (S804), the master key storage part 120 stores the generated public parameters pk and master key sk, in the storage device.

Note that the public parameters are publicized via, e.g., a network, so the signature device 400 and verification device 500 can acquire them.

$\text{Setup}(1^\lambda, \vec{\mu} := (d; n_1, \ldots, n_d))$ [Formula 171]

$\quad (param_{\vec{\mu}}, \{\mathbb{B}_t, \mathbb{B}^*_t\}_{t=0,\ldots,d+2}) \xleftarrow{R} \mathcal{G}_{ob}(1^\lambda, \vec{\mu})$ $\quad n_0 := n_{d+1} : 1, n_{d+2} := 2,$ $\hat{\mathbb{B}}_t := (b_{t,1}, \ldots, b_{t,n_t}, b_{t,3n_t+1}, \ldots, b_{t,4n_t}) \text{ for } t = 0,$ $\quad \ldots, d+2,$ $\hat{\mathbb{B}}^*_t := (b^*_{t,1}, \ldots, b^*_{t,n_t}, b^*_{t,2n_t+1}, \ldots, b^*_{t,3n_t}) \text{ for } t = 1,$ $\quad \ldots, d+2,$ $sk := b^*_{0,1},$ $pk :=$ $\quad (1^\lambda, param_{\vec{\mu}}, \{\hat{\mathbb{B}}_t\}_{t=0,\ldots,d+2}, \{\hat{\mathbb{B}}^*_t\}_{t=1,\ldots,d+2}, b^*_{0,3}).$ return $sk, pk.$ The process of the KeyGen algorithm will be described with reference to FIG. 19.

(S901: Information Input Step)

With an input device, the information input part 130 takes as input an attribute set $\Gamma := \{(t, \vec{x}_t := (x_{t,1}, \ldots, x_{t,n_t} \in \mathbb{F}_q^{n_t})) | 1 \leq t \leq d\}$. For example, the attribute information of the user of the signature key $sk_\Gamma$ is set in the attribute set $\Gamma$.

(S902: Random Number Generation Step)

With the processing device, the random number generation part 161 generates a random number $\delta$ and random numbers $\phi_0, \phi_{t,\iota}, \phi_{d+2,\iota}$, and $\phi_{d+3,\iota}$ for each integer $t=1, \ldots, d$ and each integer $\iota=1, \ldots, n_t$, as indicated in Formula 172.

$\delta, \phi_0, \phi_{t,\iota}, \phi_{d+2,\iota}, \phi_{d+3,\iota} \xleftarrow{U} \mathbb{F}_q$ [Formula 172]

for $t = 1, \ldots, d, \iota = 1, \ldots, n_t$ (S903: Key Element Generation Step)

With the processing device, the key element generation part 162 generates an element $k^*_0$ of the signature key $sk_\Gamma$, as indicated in Formula 173.

$k_0^* := (\delta, 0, \phi_0, 0) \mathbb{B}_0^*$ [Formula 173]

With the processing device, the key element generation part 162 also generates an element $k^*_t$ of the signature key $sk_\Gamma$ for each integer $t$ of $(t, \vec{x}_t)$ included in $\Gamma$, as indicated in Formula 174.

$k_t^* := \overbrace{(\delta(x_{t,1}, \ldots, x_{t,n}),}^{n_t} \overbrace{0^{n_t},}^{n_t} \overbrace{\phi_{t,1}, \ldots, \phi_{t,n_t},}^{n_t} \overbrace{0^{n_t})}^{n_t}_{\mathbb{B}_t^*}$ [Formula 174]

Also, with the processing device, the key element generation part 162 generates elements $k^*_{d+2}$ and $k^*_{d+3}$ of the signature key $sk_\Gamma$, as indicated in Formula 175.

$k_{d+2}^* := (\delta(1, 0), 0, 0, \phi_{d+2,1}, \phi_{d+2,2}, 0, 0) \mathbb{B}_{d+2}^*$ $k_{d+3}^* := (\delta(0,1), 0, 0, \phi_{d+3,1}, \phi_{d+3,2}, 0, 0) \mathbb{B}_{d+2}^*$ [Formula 175]

(S904: Key Distribution Step)

For example, with the communication device, the key distribution part 150 distributes the signature key $sk_\Gamma$ constituted by, as elements, the attribute set $\Gamma$ inputted in (S901) and $k^*_0$, $k^*_t$, $k^*_{d+2}$, and $k^*_{d+3}$ generated in (S903), to the signature device 400 in secrecy via the network. As a matter of course, the signature key $sk_\Gamma$ may be distributed to the signature device 400 by another method.

More specifically, from (S901) through (S903), the information input part 130 and signature key generation part 160 generate the signature key $sk_\Gamma$ by executing the KeyGen algorithm indicated in Formula 176. Then, in (S904), the key distribution part 150 distributes the generated signature key $sk_\Gamma$ to the signature device 400.

$$KeyGen(pk, sk, \Gamma := \{(t, \vec{x}_t := (x_{t,1}, \ldots, x_{t,n_t}) \in \mathbb{F}_q^{n_t}) | 1 \leq t \leq d\})(x_{t,1} := 1)$$ [Formula 176]

$$\delta, \phi_0, \phi_{t,\iota}, \phi_{d+2,\iota}, \phi_{d+3,\iota} \xleftarrow{U} \mathbb{F}_q$$

for $t = 1, \ldots, d, \iota = 1, \ldots, n_t,$ $$k_0^* := (\delta, 0, \phi_0, 0)_{\mathbb{B}_0^*},$$

$$k_t^* := (\overbrace{\delta(x_{t,1}, \ldots, x_{t,n_t})}^{n_t}, \overbrace{0^{n_t}}^{n_t}, \overbrace{\phi_{t,1}, \ldots, \phi_{t,n_t}}^{n_t}, \overbrace{0^{n_t}}^{n_t})_{\mathbb{B}_t^*}$$

for $(t, \vec{x}_t) \in \Gamma,$ $$k_{d+2}^* := (\delta(1, 0), 0, 0, \phi_{d+2,1}, \phi_{d+2,2}, 0, 0)_{\mathbb{B}_{d+2}^*},$$

$$k_{d+3}^* := (\delta(0, 1), 0, 0, \phi_{d+3,1}, \phi_{d+3,2}, 0, 0)_{\mathbb{B}_{d+2}^*},$$

$$T := \{0, d+2, d+3\} \cup \{t | 1 \leq t \leq d, (t, \vec{x}_t) \in \Gamma\},$$

$$sk_\Gamma := (\Gamma, \{k_t^*\}_{t \in T})$$

return $sk_\Gamma.$

The function and operation of the signature device 400 will be described. The signature device 400 is provided with a signature key acquisition part 410, an information input part 420 (second information input part), a complementary coefficient calculation part 430, a matrix generation part 440, a signature generation part 450, and a data transmission part 460 (data output part). The signature generation part 450 is provided with a random number generation part 451 and a signature element generation part 452.

The process of the Sig algorithm will be described with reference to FIG. 20.

(S1001: Signature Key Acquisition Step)

For example, with the communication device, the signature key acquisition part 410 acquires the signature key $sk_\Gamma := (\Gamma, k^*_0, k^*_t, k^*_{d+2}, k^*_{d+3})$ distributed by the key generation device 100, via the network. The signature key acquisition part 410 also acquires the public parameters pk generated by the key generation device 100.

(S1002: Information Input Step)

With the input device, the information input part 420 takes as input the access structure $S := (M, \rho)$. Note that as the access structure S to be inputted, the attribute set $\Gamma$ included in the signature key $sk_\Gamma$ inputted in (S1001) is accepted.

With the processing device, the information input part 420 takes as input the message m to which the signature is to be attached.

(S1003: Complementary Coefficient Calculation Step)

With the processing device, the complementary coefficient calculation part 430 calculates I and a constant (complementary coefficient) $\{\alpha_i\}_{i \in I}$, with which Formula 177 is established.

$$\Sigma_{i \in I} \alpha_i M_i = \vec{1}, \text{ and}$$

$$I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_i = 0]$$
$$\vee [\rho(i) = \neg(t, \vec{v}_i) \wedge (t, \vec{x}_t) \in \Gamma \wedge \vec{v}_i \cdot \vec{z} \neq 0]\}$$ [Formula 177]

Note that $M_i$ denotes the i-th row of a matrix M.

(S1004: Row Addition Step)

With the processing device, the matrix generation part 440 generates a vector $M_{L+1}$ to be added to the matrix M, and a label $\rho(L+1)$ of the vector $M_{L+1}$, as indicated in Formula 178.

$$M_{L+1} := \vec{1} \in \mathbb{F}$$

$$\rho(L+1) := \neg(d+1, \vec{v}_{L+1})$$ [Formula 178]

Let $\vec{v}_{L+1} := (1).$ (S1005: Random Number Generation Step)

With the processing device, the random number generation part 451 generates a random number $\xi$, as indicated in Formula 179.

$$\xi \xleftarrow{U} \mathbb{F}_q$$ [Formula 179]

(S1006: Signature Element Generation Step)

With the processing device, the signature element generation part 452 generates $s^*_0$ which is an element of the signature vector $\vec{s}^*$, as indicated in Formula 180.

$$s_0^* := \xi k_0^* + r_0^*$$ [Formula 180]

Note that $$r_0^* \xleftarrow{U} span\langle b_{0,3}^* \rangle$$

With the processing device, the signature element generation part 452 also generates $s^*_i$ which is an element of the signature vector $\vec{s}^*$, for each integer $i = 1, \ldots, L+1$, as indicated in Formula 180.

$$s_i^* := \gamma_i \cdot \xi k_t^* + \beta_i \cdot \left( \sum_{\iota=1}^{n_t} y_{i,\iota} \cdot b_{t,\iota}^* \right) + r_i^*$$ [Formula 181]

Note that $r_i^*$ is defined as follows.

$$r_i^* \xleftarrow{U} span\langle b_{t,2n_t+1}^*, \ldots, b_{t,3n_t}^* \rangle$$

Also, $\gamma_i$ and $\vec{y}_i := (y_{i,1}, \ldots, y_{i,n_t})$ are defined as follows.

if $i \in I \wedge \rho(i) = (t, \vec{v}_i), \gamma_i := \alpha_i,$ $\vec{y}_i \xleftarrow{U} \{\vec{y}_i | \vec{y}_i \cdot \vec{v}_i = 0 \wedge y_{i,1} = 1\},$ if $i \in I \wedge \rho(i) = \neg(t, \vec{v}_i),$ $\gamma_i := \alpha_i / (\vec{v}_i \cdot \vec{x}_t), \vec{y}_i \xleftarrow{U} \{\vec{y}_i | \vec{y}_i \cdot \vec{v}_i = 1\},$ if $i \notin I \wedge \rho(i) = (t, \vec{v}_i),$ $\gamma_i := 0, \vec{y}_i \xleftarrow{U} \{\vec{y}_i | \vec{y}_i \cdot \vec{v}_i = 0 \wedge y_{i,1} = 1\},$ if $i \notin I \wedge \rho(i) = \neg(t, \vec{v}_i),$ $\gamma_i := 0, \vec{y}_i \xleftarrow{U} \{\vec{y}_i | \vec{y}_i \cdot \vec{v}_i = 1\}$ -continued Also, $\beta_i$ is defined as follows.

$$\{\beta_i\} \xleftarrow{U} \left\{\{\beta_i\} \middle| \sum_{i=1}^{L+1} \beta_i M_i = \vec{0}\right\}$$

With the processing device, the signature element generation part 452 also generates $s^*_{L+2}$ which is an element of the signature vector $\vec{s}^*$, as indicated in Formula 182.

$$s^*_{L+2} := \xi(k^*_{d+2} + m \cdot k^*_{d+3}) + r^*_{L+2} \qquad \text{[Formula 182]}$$

Note that $$r^*_{L+2} \xleftarrow{U} \text{span}\langle b^*_{d+2,5}, b^*_{d+2,6}\rangle$$

(S1007: Data Transmission Step)

For example, with the communication device, the data transmission part 460 transmits signature data sig, including the message m and the access structure S:=(M, ρ) which are inputted in (S1002) and $\vec{s}^*$ generated in (S1006), to the verification device 500 via the network. As a matter of course, the signature data sig may be transmitted to the verification device 500 by another method.

More specifically, from (S1001) through (S1006), the signature key acquisition part 410, the information input part 420, the complementary coefficient calculation part 430, the matrix generation part 440, and the signature generation part 450 generate the signature data sig by executing the Sig algorithm indicated in Formula 183. In (S1007), the data transmission part 460 transmits the generated signature data to the verification device 500.

$$Sig(pk, sk_\Gamma, m, \mathbb{S} := (M, \rho)) \qquad \text{[Formula 183]}$$

If $\mathbb{S} := (M, \rho)$ accepts $\Gamma := \{(t, \vec{x}_t)\}$, then compute $I$ and $\{\alpha_i\}_{i \in I}$ such that $$\sum_{i \in I} \alpha_i M_i = \vec{1}, \text{ and}$$

$I \subseteq$ $\{i \in \{1, \ldots, L\} | [\rho(i) = (t, \vec{v}_i) \wedge (t, \vec{x}_t) \in \Gamma \wedge \vec{v}_i \cdot \vec{x}_t = 0] \vee$ $[\rho(i) = \neg (t, \vec{v}_i) \wedge (t, \vec{x}_t) \in \Gamma \wedge \vec{v}_i \cdot \vec{x}_t \neq 0]\}$, $M_{L+1} := \vec{1} \in \mathbb{F}^r_q, \vec{v}_{L+1} := (1), \rho(L+1) := \neg (d+1, \vec{v}_{L+1})$ $$\xi \xleftarrow{U} \mathbb{F}_q, \{\beta_i\} \xleftarrow{U} \left\{(\beta_1, \ldots, \beta_{L+1}) \middle| \sum_{i=1}^{L+1} \beta_i M_i = \vec{0}\right\},$$

$s^*_0 := \xi k^*_0 + r^*_0$, where $r^*_0 \xleftarrow{U} \text{span}\langle b^*_{0,3}\rangle$, for $1 \leq i \leq L+1$, $s^*_i :=$ $$\gamma_i \cdot \xi k^*_t + \beta_i \cdot \left(\sum_{i=1}^{n_t} y_{i,t} \cdot b^*_{t,t}\right) + r^*_i,$$

where $r^*_i \xleftarrow{U} \text{span}\langle b^*_{t,2n_t+1}, \ldots, b^*_{t,3n_t}\rangle$, and $\gamma_i, \vec{y}_i := (y_{i,1}, \ldots, y_{i,n_t})$ are defined as if $i \in I \wedge \rho(i) = (t, \vec{v}_i)$, $\gamma_i := \alpha_i, \vec{y}_i \xleftarrow{U} \{\vec{y}_i | \vec{y}_i \cdot \vec{v}_i = 0 \wedge y_{i,1} = 1\}$, -continued if $i \in I \wedge \rho(i) = \neg (t, \vec{v}_i), \gamma_i := \alpha_i / (\vec{v}_i \cdot \vec{x}_t)$, $\vec{y}_i \xleftarrow{U} \{\vec{y}_i | \vec{y}_i \cdot \vec{v}_i = 1\}$, if $i \notin I \wedge \rho(i) = (t, \vec{v}_i), \gamma_i := 0$, $\vec{y}_i \xleftarrow{U} \{\vec{y}_i | \vec{y}_i \cdot \vec{v}_i = 0 \wedge y_{i,1} = 1\}$, if $i \notin I \wedge \rho(i) = \neg (t, \vec{v}_i), \gamma_i := 0$, $\vec{y}_i \xleftarrow{U} \{\vec{y}_i | \vec{y}_i \cdot \vec{v}_i = 1\}$, $s^*_{L+2} := \xi(k^*_{d+2} + m \cdot k^*_{d+3}) + r^*_{L+2}$, where $r^*_{L+2} \xleftarrow{U} \text{span}\langle b^*_{d+2,5}, b^*_{d+2,6}\rangle$ $\vec{s}^* := (s^*_0, \ldots, s^*_{L+2}), sig := \{m, \mathbb{S}, \vec{s}^*\}$ return sig.

The function and operation of the verification device 500 will be described. The verification device 500 is provided with a public parameter acquisition part 510, a data reception part 520 (data acquisition part), an encrypted data generation part 530, and a pairing operation part 540. The encrypted data generation part 530 is provided with a random number generation part 531, a cryptographic element generation part 532, an f vector generation part 533, and an s vector generation part 534.

The process of the Ver algorithm will be described with reference to FIG. 21.

(S1101: Public Parameter Acquisition Step)

For example, with the communication device, the public parameter acquisition part 510 acquires the public parameters pk generated by the key generation device 100, via the network.

(S1102: Data Reception Step)

For example, with the communication step, the data reception part 520 receives the signature data sig transmitted by the signature device 400, via the network.

(S1103: f Vector Generation Step)

With the processing device, the f vector generation part 533 randomly generates a vector $\vec{f}$ having r pieces of elements, as indicated in Formula 184.

$$\vec{f} \xleftarrow{R} \mathbb{F}^r_q \qquad \text{[Formula 184]}$$

(S1104: s Vector Generation Step)

With the processing device, the s vector generation part 534 generates a vector $\vec{s}^T := (s_1, \ldots, s_L)^T$ based on the (L rows×r columns) matrix M included in the access structure S received in (S1102) and the vector $\vec{f}$ generated in (S1103), as indicated in Formula 185.

$$\vec{s}^T := (s_1, \ldots, s_L)^T := M \cdot \vec{f}^T \qquad \text{[Formula 185]}$$

With the processing device, the s vector generation part 534 also generates values $s_0$ and $s_{L+1}$ based on the vector $\vec{f}$ generated in (S1103), as indicated in Formula 186.

$$s_0 := s_{L+1} := \vec{1} \cdot \vec{f}^T \qquad \text{[Formula 186]}$$

(S1105: Random Number Generation Step)

With the processing device, the random number generation part 531 generates random numbers $\eta_0, \eta_{L+2,1}, \eta_{L+2},2, \theta_i$, and $s_{L+2}$ for each integer i=1, ..., L+2, as indicated in Formula 187.

$$\eta_0, \eta_{L+2,1}, \eta_{L+2,2}, \theta_i, s_{L+2} \xleftarrow{U} \mathbb{F}_q \qquad \text{[Formula 187]}$$

(S1106: Cryptographic Element Generation Step)

With the processing device, the cryptographic element generation part 532 generates an element $c_0$ of the encrypted data c, as indicated in Formula 188.

$$c_0 := (-s_0 - s_{L+2}, 0, 0, \eta_0)_{\mathbb{B}} \qquad \text{[Formula 188]}$$

With the processing device, the cryptographic element generation part 532 also generates an element $c_i$ of the encrypted data c for each integer i=1, ..., L+1, as indicated in Formula 189.

$$\begin{aligned}&\text{if } \rho(i) = (t, \vec{v}_i := (v_{i,1}, \ldots, v_{i,n_t}) \in \mathbb{F}_q^{n_t}), &\text{[Formula 189]}\\ &\eta_{i,1}, \ldots, \eta_{i,n_t} \xleftarrow{U} \mathbb{F}_q,\\ &c_i := (\overbrace{s_i + \theta_i v_{i,1}, \theta_i v_{i,2}, \ldots, \theta_i v_{i,n_t}}^{n_t}, \overbrace{0^{n_t}}^{n_t},\\ &\qquad \overbrace{0^{n_t}}^{n_t}, \overbrace{\eta_{i,1}, \ldots, \eta_{i,n_t}}^{n_t})_{\mathbb{B}_t},\\ &\text{if } \rho(i) = \neg (t, \vec{v}_i := (v_{i,1}, \ldots, v_{i,n_t}) \in \mathbb{F}_q^{n_t}),\\ &\eta_{i,1}, \ldots, \eta_{i,n_t} \xleftarrow{U} \mathbb{F}_q,\\ &c_i := (\overbrace{s_i(v_{i,1}, \ldots, v_{i,n_t})}^{n_t}, \overbrace{0^{n_t}}^{n_t}, \overbrace{0^{n_t}}^{n_t}, \overbrace{\eta_{i,1}, \ldots, \eta_{i,n_t}}^{n_t})_{\mathbb{B}_t},\end{aligned}$$

With the processing device, the cryptographic element generation part 532 also generates an element $c_{L+2}$ of the encrypted data c, as indicated in Formula 190.

$$c_{L+2} := (s_{L+2} - \theta_{L+2} m, \theta_{L+2}, 0, 0, 0, 0, \eta_{L+2,1}, \eta_{L+2,2})_{\mathbb{B}} \qquad \text{[Formula 190]}$$

(S1107: Pairing Operation Step)

With the processing device, the pairing operation part 540 calculates Formula 191.

$$\prod_{i=0}^{L+2} e(c_i, s_i^*) \qquad \text{[Formula 191]}$$

Let $\rho(L+1) := \neg (d+1, \vec{v}_{L+1} := (1))$.

The pairing operation part 540 outputs a value "1" if the calculation result of Formula 191 is a value "1"; and a value "0" otherwise. If the calculation result of Formula 191 is a value "1", this indicates that the signature is verified; otherwise, the signature is not verified.

If the signature data sig is correct data, a value "1" is obtained by calculating Formula 191, as indicated by Formula 192.

$$\begin{aligned}\prod_{i=0}^{L+2} e(c_i, s_i^*) &= e(c_0, s_0^*) \cdot \prod_{i \in I} e(c_i, k_i^*)^{\xi \gamma_i} \cdot &\text{[Formula 192]}\\ &\quad \prod_{i=1}^{L+1} e\left(c_i, \prod_{t=1}^{n_t} (b_{t,t}^*)^{y_{i,t}}\right)^{\beta_i} \cdot\\ &\quad e(c_{L+2}, s_{L+2}^*)\end{aligned}$$

-continued $$\begin{aligned}&= g_T^{\xi \delta(-s_0 - s_{L+2})} \cdot \prod_{i \in I} g_T^{\xi \delta \alpha_i s_i} \cdot\\ &\quad \prod_{i=1}^{L+1} g_T^{\beta_i s_i} \cdot g_T^{\xi \delta s_{L+2}}\\ &= g_T^{\xi \delta(-s_0 - s_{L+2})} \cdot g_T^{\xi \delta s_0} \cdot g_T^{\xi \delta s_{L+2}} = 1\end{aligned}$$

More specifically, from (S1101) through (S1107), the public parameter acquisition part 510, the data reception part 520, the encrypted data generation part 530, and the pairing operation part 540 verify the signature data sig by executing the Ver algorithm indicated in Formula 193.

$$\begin{aligned}&Ver(pk, m, \mathbb{S} := (M, \rho), \vec{s}^*) &\text{[Formula 193]}\\ &\vec{f} \xleftarrow{R} \mathbb{F}_q^r, \vec{s}^T := (s_1, \ldots, s_L)^T := M \cdot \vec{f}^T,\\ &s_0 := s_{L+1} := \vec{1} \cdot \vec{f}^T,\\ &\eta_0, \eta_{L+2,1}, \eta_{L+2,2}, \theta_i, s_{L+2} \xleftarrow{U} \mathbb{F}_q (i = 1, \ldots, L+2),\\ &\rho(L+1) := \neg (d+1, \vec{v}_{L+1} := (1))\\ &c_0 := (-s_0 - s_{L+2}, 0, 0, \eta_0)_{\mathbb{B}_0},\\ &\text{for } 1 \le i \le L+1\\ &\text{if } \rho(i) = (t, \vec{v}_i := (v_{i,1}, \ldots, v_{i,n_t}) \in \mathbb{F}_q^{n_t}),\\ &\eta_{i,1}, \ldots, \eta_{i,n_t} \xleftarrow{U} \mathbb{F}_q,\\ &c_i := (\overbrace{s_i + \theta_i v_{i,1}, \theta_i v_{i,2}, \ldots, \theta_i v_{i,n_t}}^{n_t}, \overbrace{0^{n_t}}^{n_t},\\ &\qquad \overbrace{0^{n_t}}^{n_t}, \overbrace{\eta_{i,1}, \ldots, \eta_{i,n_t}}^{n_t})_{\mathbb{B}_t},\\ &\text{if } \rho(i) = \neg (t, \vec{v}_i := (v_{i,1}, \ldots, v_{i,n_t}) \in \mathbb{F}_q^{n_t}),\\ &\eta_{i,1}, \ldots, \eta_{i,n_t} \xleftarrow{U} \mathbb{F}_q,\\ &c_i := (\overbrace{s_i(v_{i,1}, \ldots, v_{i,n_t})}^{n_t}, \overbrace{0^{n_t}}^{n_t},\\ &\qquad \overbrace{0^{n_t}}^{n_t}, \overbrace{\eta_{i,1}, \ldots, \eta_{i,n_t}}^{n_t})_{\mathbb{B}_t},\\ &c_{L+2} :=\\ &\quad (s_{L+2} - \theta_{L+2} m, \theta_{L+2}, 0, 0, 0, 0, \eta_{L+2,1}, \eta_{L+2,2})_{\mathbb{B}_{d+2}},\\ &\text{return } 1 \text{ if } \prod_{i=0}^{L+2} e(c_i, s_i^*) = 1, \text{ return } 0 \text{ otherwise.}\end{aligned}$$

As described above, the signature processing system 20 implements the signature scheme using the access structure S constructed using the span program, inner-product predicate, and secret sharing.

In the Sig algorithm, the element of the signature vector $\vec{s}^*$ is generated using the random numbers $\xi$ and r, so that the variables $\delta$ and $\phi$ of the elements k of the signature key $sk_\Gamma$ which is information on the generator of the element of the signature vector $\vec{s}^*$ are randomized. If the variables $\delta$ and $\phi$ of the elements k of the signature key $sk_\Gamma$ are randomized, these variables can be prevented from being read from $\vec{s}^*$ which is an element of the signature data. Namely, based on which signature key $sk_\Gamma$ the signature data is generated, can be prevented from being read. That is, the link ability can be increased.

In the above description, in (S801), $4n_t (= n_t + n_t + n_t + n_t)$ is set in $N_t$.

Alternatively, $n_t+n_t+n_t+n_t$ may be replaced by $n_t+u_t+w_t+4$. More specifically, the first $n_t$ may remain $n_t$, the second $n_t$ may be changed to $u_t$, the third $n_t$ may be changed to $w_t$, and the fourth $n_t$ may be changed to $z_t$. That is, $n_t+u_t+w_t+z_t$ may be set in $N_t$. Note that $n_t$, $u_t$, and $z_t$ can be different values where $n_t$ is an integer of 1 or more, as described above, and each of $u_t$, $w_t$, and $z_t$ is an integer of 0 or more.

In this case, the Setup algorithm indicated in Formula 171 is rewritten as indicated in Formula 194. Namely, the suffixes of the basis vectors of the bases $B^\wedge{}_t$ and $B^{\wedge*}{}_t$ are changed.

[Formula 194]
$$\text{Setup}(1^\lambda, \vec{\mu} := (d; n_1, \ldots, n_d))$$
$$(param_{\vec{\mu}}, \{\mathbb{B}_t, \mathbb{B}_t^*\}_{t=0,\ldots,d+2}) \xleftarrow{R} \mathcal{G}_{ob}(1^\lambda, \vec{\mu})$$
$$\hat{\mathbb{B}}_t := (b_{t,1}, \ldots, b_{t,n_t}, b_{t,n_t+u_t+w_t+1}, \ldots, b_{t,n_t+u_t+w_t+z_t})$$
$$\text{for } t = 1, \ldots, d+2,$$
$$\hat{\mathbb{B}}_t^* := (b_{t,1}^*, \ldots, b_{t,n_t}^*, b_{t,n_t+u_t+1}^*, \ldots, b_{t,n_t+u_t+w_t}^*)$$
$$\text{for } t = 1, \ldots, d+2,$$
$$\hat{\mathbb{B}}_{d+1} := (b_{d+1,1}, b_{d+1,2}, b_{d+1,4}),$$
$$\hat{\mathbb{B}}_{d+1}^* := (b_{d+1,1}^*, b_{d+1,2}^*, b_{d+1,3}^*),$$
$$sk := b_{0,1}^*,$$
$$pk := (1^\lambda, param_{\vec{\mu}}, \{\hat{\mathbb{B}}_t\}_{t=0,\ldots,d+2}, \{\hat{\mathbb{B}}_t^*\}_{t=1,\ldots,d+2}, b_{0,3}^*).$$
return $sk, pk$.

Also, the KeyGen algorithm indicated in Formula 176 is rewritten as indicated in Formula 195.

[Formula 195]
$$\text{KeyGen}(pk, sk, \Gamma :=$$
$$\{(t, \vec{x}_t := (x_{t,1}, \ldots, x_{t,n_t}) \in \mathbb{F}_q^{n_t}) | 1 \le t \le d\})(x_{t,1} := 1)$$
$$\delta, \phi_0, \phi_{t,\iota}, \phi_{d+2,\iota}, \phi_{d+3,\iota} \xleftarrow{U} \mathbb{F}_q$$
$$\text{for } t = 1, \ldots, d, \iota = 1, \ldots, w_t,$$
$$k_0^* := (\delta, 0, \phi_0, 0)_{\mathbb{B}_0^*},$$
$$k_t^* := (\overbrace{\delta(x_{t,1}, \ldots, x_{t,n_t})}^{n_t}, \overbrace{0^{u_t}}^{u_t},$$
$$\overbrace{\phi_{t,1}, \ldots, \phi_{t,w_t}}^{w_t}, \overbrace{(0^{z_t})}^{z_t})_{\mathbb{B}_t^*} \text{ for } (t, \vec{x}_t) \in \Gamma,$$
$$k_{d+2}^* := (\delta, (1, 0), 0, 0, \phi_{d+2,1}, \phi_{d+2,2}, 0, 0)_{\mathbb{B}_{d+2}^*},$$
$$k_{d+3}^* := (\delta, (0, 1), 0, 0, \phi_{d+3,1}, \phi_{d+3,2}, 0, 0)_{\mathbb{B}_{d+2}^*},$$
$$T := \{0, d+2, d+3\} \cup \{t | 1 \le t \le d, (t, \vec{x}_t) \in \Gamma\},$$
$$sk_\Gamma := (\Gamma, \{k_t^*\}_{t \in T})$$
return $sk_\Gamma$.

Also, the Sig algorithm indicated in Formula 183 is rewritten as indicated in Formula 196.

[Formula 196]
$$\text{Sig}(pk, sk_\Gamma, m, \mathbb{S} := (M, \rho))$$
If $\mathbb{S} := (M, \rho)$ accepts $\Gamma := \{(t, \vec{x}_t)\}$,
then compute $I$ and $\{\alpha_i\}_{i \in I}$ such that
$$\sum_{i \in I} \alpha_i M_i = \vec{1}, \text{ and}$$

-continued $$I \subseteq$$
$$\{i \in \{1, \ldots, L\} | [\rho(i) = (t, \vec{v}_i) \wedge (t, \vec{x}_t) \in \Gamma \wedge \vec{v}_i \cdot \vec{x}_t = 0] \vee$$
$$[\rho(i) = \neg(t, \vec{v}_i) \wedge (t, \vec{x}_t) \in \Gamma \wedge \vec{v}_i \cdot \vec{x}_t \ne 0]\},$$
$$M_{L+1} := \vec{1} \in \mathbb{F}_q^r, \vec{v}_{L+1} := (1), \rho(L+1) := \neg(d+1, \vec{v}_{L+1})$$
$$\xi \xleftarrow{U} \mathbb{F}_q, \{\beta_i\} \xleftarrow{U} \left\{(\beta_1, \ldots, \beta_{L+1}) \middle| \sum_{i=1}^{L+1} \beta_i M_i = \vec{0} \right\},$$
$$s_0^* := \xi k_0^* + r_0^*, \text{ where } r_0^* \xleftarrow{U} \text{span}\langle b_{0,3}^* \rangle,$$
for $1 \le i \le L+1$,
$$s_i^* := \gamma_i \cdot \xi k_t^* + \beta_i \cdot \left(\sum_{\iota=1}^{n_t} y_{i,\iota} \cdot b_{t,\iota}^*\right) + r_i^*,$$
where $r_i^* \xleftarrow{U} \text{span}\langle b_{t,n_t+u_t+1}^*, \ldots, b_{t,n_t+u_t+w_t}^* \rangle,$
and $\gamma_i, \vec{y}_i := (y_{i,1}, \ldots, y_{i,n_t})$ are defined as
if $i \in I \wedge \rho(i) = (t, \vec{v}_i)$,
$$\gamma_i := \alpha_i, \vec{y}_i \xleftarrow{U} \{\vec{y}_i | \vec{y}_i \cdot \vec{v}_i = 0 \wedge y_{i,1} = 1\},$$
if $i \in I \wedge \rho(i) = \neg(t, \vec{v}_i), \gamma_i := \alpha_i/(\vec{v}_i \cdot \vec{x}_t),$
$$\vec{y}_i \xleftarrow{U} \{\vec{y}_i | \vec{y}_i \cdot \vec{v}_i = 1\},$$
if $i \notin I \wedge \rho(i) = (t, \vec{v}_i) \gamma_i := 0,$
$$\vec{y}_i \xleftarrow{U} \{\vec{y}_i | \vec{y}_i \cdot \vec{v}_i = 0 \wedge y_{i,1} = 1\},$$
if $i \notin I \wedge \rho(i) = \neg(t, \vec{v}_i), \gamma_i := 0,$
$$\vec{y}_i \xleftarrow{U} \{\vec{y}_i | \vec{y}_i \cdot \vec{v}_i = 1\},$$
$$s_{L+2}^* := \xi(k_{d+2}^* + m \cdot k_{d+3}^*) + r_{L+2}^*,$$
where $r_{L+2}^* \xleftarrow{U} \text{span}\langle b_{d+2,5}^*, b_{d+2,6}^* \rangle$
$$\vec{s}^* := (s_0^*, \ldots, s_{L+2}^*), sig := \{m, \mathbb{S}, \vec{s}^*\}.$$
return $sig$.

Also, the Ver algorithm indicated in Formula 193 is rewritten as indicated in Formula 197.

[Formula 197]
$$\text{Ver}(pk, m, \mathbb{S} := (M, \rho), \vec{s}^*)$$
$$\vec{f} \xleftarrow{R} \mathbb{F}_q^r, \vec{s}^T := (s_1, \ldots, s_L)^T := M \cdot \vec{f}^T,$$
$$s_0 := s_{L+1} := \vec{1} \cdot \vec{f}^T,$$
$$\eta_0, \eta_{L+1,1}, \eta_{L+1,2}, \theta_i, s_{L+2} \xleftarrow{U} \mathbb{F}_q (i = 1, \ldots, L+2),$$
$$c_0 := (-s_0 - s_{L+1}, 0, 0, \eta_0)_{\mathbb{B}_0},$$
for $1 \le i \le L+1$
if $\rho(i) = (t, \vec{v}_i := (v_{i,1}, \ldots, v_{i,n_t}) \in \mathbb{F}_q^{n_t}),$
$$\eta_{i,1}, \ldots, \eta_{i,z_t} \xleftarrow{U} \mathbb{F}_q,$$
$$c_i : (\overbrace{s_i + \theta_i v_{i,1}, \theta_i v_{i,2}, \ldots, \theta_i v_{i,n_t}}^{n_t}, \overbrace{0^{u_t}}^{u_t},$$
$$\overbrace{0^{w_t}}^{w_t}, \overbrace{\eta_{i,1}, \ldots, \eta_{i,z_t}}^{n_t})_{\mathbb{B}_t},$$
if $\rho(i) = \neg(t, \vec{v}_i := (v_{i,1}, \ldots, v_{i,n_t}) \in \mathbb{F}_q^{n_t}),$
$$\eta_{i,1}, \ldots, \eta_{i,z_t} \xleftarrow{U} \mathbb{F}_q,$$
$$c_i : (\overbrace{s_i(v_{i,1}, \ldots, v_{i,n_t})}^{n_t}, \overbrace{0^{u_t}}^{u_t}, \overbrace{0^{w_t}}^{w_t}, \overbrace{\eta_{i,1}, \ldots, \eta_{i,z_t}}^{z_t})_{\mathbb{B}_t},$$

-continued $$c_{L+1} :=$$

$$(s_{L+2} - \theta_{L+2}m, \theta_{L+2}, 0, 0, 0, 0, \eta_{L+2,1}, \eta_{L+2,2})_{\mathbb{B}_{d+2}},$$

$$\text{return } 1 \text{ if } \prod_{i=0}^{L+2} e(c_i, s_i^*) = 1, \text{ return } 0 \text{ otherwise.}$$

Also, each of $N_0$ and $N_{d+1}$ need not be 4 but may be an integer of 1 or more. When $N_0$ is 1, the bases $B_0$ and $B^*_0$ become one-dimensional. In this case, $k^*_{0,j}:=(\delta)_{B^*0}$ may be set in the KeyGen algorithm and $c_0:=(-s_0-s_{L+2})_{B0}$ may be set in the Ver algorithm.

Also, $N_{d+2}$ need not be 8 but may be an integer of 2 or more. When $N_{d+2}$ is 2, the bases $B_{d+2}$ and $B^*_{d+2}$ become two-dimensional. In this case, $k^*_{d+2} (\delta_j(1,0))_{B^*d+2}$ and $k^*_{d+3}:=(\delta_j(0,1))_{B^*d+2}$ may be set in the KeyGen algorithm, and $c_0:=(s_{L+2}-\theta_{L+2}m, \theta_{L+2})_{Bd+2}$ may be set in the Ver algorithm.

In the above description, the value of $v_{i,nt}$ is not particularly limited. However, a limitation of $v_{i,nt}:=1$ may be placed from the viewpoint of security proof From the viewpoint of security proof, $\rho(i)$ for each integer $i=1, \ldots, L$ may be a positive tuple $(t, v^{\rightarrow})$ or negative tuple $\neg (t, v^{\rightarrow})$ for different identification information t.

In other words, let a function $\rho^\sim$ be map of $\{1, \ldots, L\} \to \{1, \ldots, d\}$ with which $\rho^\sim(i)=t$ is established when $\rho(i)=(t, v^{\rightarrow})$ or $\rho(i)=\neg (t, v^{\rightarrow})$. In this case, $\rho^\sim$ may be injection. Note that $\rho(i)$ is $\rho(i)$ in the access structure $S:=(M, \rho(i))$ described above.

In the above description, in the row addition step (S1004) of the Sig algorithm, the first row of the vector $M_{L+1}$ is added, as the (L+1)th row, to the matrix M. However, any number of one or more rows may be added to the matrix M. In (S1004), the added rows are $M_{L+1}:=1^{\rightarrow}$. However, the rows to be added are not limited to $1^{\rightarrow}$ but other vectors.

In the above description, the label $\rho$ of the added (L+1)th row was $\rho(L+1):=\neg (d+1, v^{\rightarrow}_{L+1}:=(1))$. However, the label of the row to be added is not limited to this but suffices as far as the process is established.

More specifically, the label of the row may be set such that the information on the added rows is 0 when the pairing operation is performed in the pairing operation step (S1107) of the Ver algorithm.

If two or more rows are added, the number of repetition times of the process of the Sig algorithm or Ver algorithm need be changed in accordance with the number of added rows.

In order to enhance the security of the signature process, the Setup algorithm indicated in Formula 171 may be changed as in Formula 198, and the Sig algorithm indicated in Formula 183 may be changed as in Formula 199.

Setup($1^\lambda, \vec{\mu} := (d; n_1, \ldots, n_d)$) [Formula 198]

$(param_{\vec{\mu}}, \{\mathbb{B}_t, \mathbb{B}^*_t\}_{t=0,\ldots,d+2}) \xleftarrow{R} \mathcal{G}_{ob}(1^\lambda, \vec{\mu})$ $n_0 := n_{d+1} := 1, n_{d+2} := 2,$ $\hat{\mathbb{B}}_t := (b_{t,1}, \ldots, b_{t,n_t}, b_{t,3n_t+1}, \ldots, b_{t,4n_t})$ for $t = 0, \ldots, d+2$, $\hat{\mathbb{B}}^*_t := (b^*_{t,1}, \ldots, b^*_{t,n_t}),$ $\tilde{\mathbb{B}}^*_t := (b^*_{t,2n_t+1}, \ldots, b^*_{t,3n_t})$ for $t = 1, \ldots, d+2$, $\sigma, \psi_{t,i,\iota} \leftarrow \mathbb{F}_q$ for $t = 1, \ldots, d+1,$ $i = 1, \ldots, n_t, \iota = 1, \ldots, n_t,$ $p^*_{t,i} := (0^{i-1}, \sigma, 0^{n_t-i}, 0^{n_t}, \psi_{t,1,\iota}, \ldots, \psi_{t,n_t,\iota}, 0^{n_t})_{\mathbb{B}^*_t}$ for $t = 1, \ldots, d+1, \iota = 1, \ldots, n_t,$ $sk := (b^*_{0,1}, \{\hat{\mathbb{B}}^*_t\}_{t=1,\ldots,d+2}$ $pk := (1^\lambda, param_{\vec{\mu}}, \hat{\mathbb{B}}_0, b_{0,3},$ $\{\hat{\mathbb{B}}^*_t, \tilde{\mathbb{B}}^*_t\}_{t=1,\ldots,d+2}, \{p^*_{t,i}\}_{t=1,\ldots,d+2; i=1,\ldots,n_t}).$ return $sk, pk.$ Sig($pk, sk_\Gamma, m, \mathbb{S} := (M, \rho)$) [Formula 199]

If $\mathbb{S} := (M, \rho)$ accepts $\Gamma := \{(t, \vec{x}_t)\},$ then compute $I$ and $\{\alpha_i\}_{i \in I}$ such that $\sum_{i \in I} \alpha_i M_i = \vec{1},$ and $I \subseteq$ $\{i \in \{1, \ldots, L\} | [\rho(i) = (t, \vec{v}_i) \land (t, \vec{x}_t) \in \Gamma \land \vec{v}_i \cdot \vec{x}_t = 0] \lor$
$[\rho(i) = \neg (t, \vec{v}_i) \land (t, \vec{x}_t) \in \Gamma \land \vec{v}_i \cdot \vec{x}_t \neq 0]\},$ $M_{L+1} := \vec{1} \in \mathbb{F}^r_q, \vec{v}_{L+1} := (1), \rho(L+1) := \neg (d+1, \vec{v}_{L+1})$ $\xi \xleftarrow{U} \mathbb{F}_q, \{\beta_i\} \xleftarrow{U} \left\{(\beta_1, \ldots, \beta_{L+1}) \Big| \sum_{i=1}^{L+1} \beta_i M_i = \vec{0}\right\},$ $s^*_0 := \xi k^*_0 + r^*_0,$ where $r^*_0 \xleftarrow{U} \text{span}\langle b^*_{0,3}\rangle,$ for $1 \leq i \leq L+1,$ $s^*_i := \gamma_i \cdot \xi k^*_t + \beta_i \cdot \left(\sum_{\iota=1}^{n_t} y_{i,\iota} \cdot b^*_{t,\iota}\right) + r^*_i,$ where $r^*_i \xleftarrow{U} \text{span}\langle b^*_{t,2n_t+1}, \ldots, b^*_{t,3n_t}\rangle,$ and $\gamma_i, \vec{y}_i := (y_{i,1}, \ldots, y_{i,n_t})$ are defined as if $i \in I \land \rho(i) = (t, \vec{v}_i),$ $\gamma_i := \alpha_i, \vec{y}_i \xleftarrow{U} \{\vec{y}_i | \vec{y}_i \cdot \vec{v}_i = 0 \land y_{i,1} = 1\},$ if $i \in I \land \rho(i) = \neg (t, \vec{v}_i), \gamma_i := \alpha_i/(\vec{v}_i \cdot \vec{x}_t),$ $\vec{y}_i \xleftarrow{U} \{\vec{y}_i | \vec{y}_i \cdot \vec{v}_i = 1\},$ if $i \notin I \land \rho(i) = (t, \vec{v}_i), \gamma_i := 0,$ $\vec{y}_i \xleftarrow{U} \{\vec{y}_i | \vec{y}_i \cdot \vec{v}_i = 0 \land y_{i,1} = 1\},$ if $i \notin I \land \rho(i) = \neg (t, \vec{v}_i), \gamma_i := 0, \vec{y}_i \xleftarrow{U} \{\vec{y}_i | \vec{y}_i \cdot \vec{v}_i = 1\},$ $s^*_{L+2} := \xi(k^*_{d+2} + m \cdot k^*_{d+3}) + r^*_{L+2},$ where $r^*_{L+2} \xleftarrow{U} \text{span}\langle b^*_{d+2,5}, b^*_{d+2,6}\rangle$ $\vec{s}^* := (s^*_0, \ldots, s^*_{L+2}), sig := \{m, \mathbb{S}, \vec{s}^*\}$ return $sig.$ More specifically, the Setup algorithm is changed in that the confidential vector $p^*_{t,\iota}$ in which a random value is set is generated, and the Sig algorithm is changed in that the element $s^*_i$ of the signature vector $\vec{s}^*$ is generated using the confidential vector $p^*_{t,\iota}$. Also, the Setup algorithm is changed in that the basis $\hat{B}^*_t$ is included in the master key sk instead of in the public parameters pk, and is kept secret. This enhances the security of the signature process.

Even when the Setup algorithm and the Sig algorithm are changed in this manner, if the signature data sig is correct data, a value "1" can be obtained by performing the pairing operation in the algorithm, as indicated in Formula 200.

$$\prod_{i=0}^{L+2} e(c_i, s_i^*) = e(c_0, s_0^*) \cdot \prod_{i \in I} e(c_i, k_i^*)^{\xi\gamma_i} \cdot \qquad [\text{Formula 200}]$$

$$\prod_{i=1}^{L+1} e\left(c_i, \prod_{t=1}^{n_t} (p_{t,i}^*)^{y_{i,t}}\right)^{\beta_i} \cdot$$

$$e(c_{L+2}, s_{L+2}^*)$$

$$= g_T^{\xi\delta(-s_0 - s_{L+2})} \cdot \prod_{i \in I} g_T^{\xi\delta\alpha_i s_i} \cdot$$

$$\prod_{i=1}^{L+1} g_T^{\beta_i s_i} \cdot g_T^{\xi\delta s_{L+2}}$$

$$= g_T^{\xi\delta(-s_0 - s_{L+2})} \cdot g_T^{\xi\delta s_0} \cdot g_T^{\xi\delta s_{L+2}} = 1$$

In the Ver algorithm, $c_{L+2}$ ($s_0 - \theta_{L+2}m$, $\theta_{L+2}$, 0, 0, 0, 0, $\eta_{L+2,1}$, $\eta_{L+2,2}$) may be set in the cryptographic element generation step (S1106), instead of generating $c_0$. Then, in the pairing operation step (S1107), $\Pi_{i=1}^{L+2} e(c_i, s_i^*)$ may be calculated.

Namely, in the above description, $c_0$ and $c_{L+2}$ are linked by a random number $s_{L+2}$, and $s_{L+2}$ is canceled between $c_0$ and $c_{L+2}$ when the pairing operation is executed. Alternatively, $s_{L+2}$ need not be used in advance, so the process is simplified.

In this case, $k_0^*$ need not be generated in the KeyGen algorithm. Likewise, $s_0^*$ need not be generated in the Sig algorithm.

Embodiment 4

In Embodiment 1, from the viewpoint of security proof, $\rho(i)$ for each integer i=1, . . . , L was described as a positive tuple (t, $\vec{v}$) or negative tuple ¬ (t, $\vec{v}$) for different identification information t. That is, $\rho^\sim$ may be injection. However, $\rho^\sim$ need not be injection.

In this case, from the viewpoint of security proof, the Setup algorithm, the KeyGen algorithm, and the Enc algorithm of the Key-Policy functional encryption described in Embodiment 1 may be modified as follows. Only the modified portions of the respective algorithms of the Key-Policy functional encryption described in Embodiment 1 will be explained.

In this embodiment, let φ be a value indicated in Formula 201.

$$\phi \geq \max_{t=1}^{d} \#\{i | \tilde{\rho}(i) = t\} \qquad [\text{Formula 201}]$$

The Setup algorithm executes Setup($1^\lambda$, $\mu'^{\rightarrow} := (d; n_1', \ldots, n_d')$) when ($1^\lambda$, $\mu^{\rightarrow} := (d; n_1, \ldots, n_d)$) is inputted. Note that $n_t' := n_t + \phi$ for each integer t=1, . . . , d.

Regarding the KeyGen algorithm, the generating method of $k_i^*$ is modified as indicated in Formula 202.

$$\text{if } \rho(i) = (t, \vec{v}_i := (v_{i,1}, \ldots, v_{i,n_t}) \in \mathbb{F}_q^{n_t}), \qquad [\text{Formula 202}]$$

$$\eta_{i,1}, \ldots, \eta_{i,n_t'} \xleftarrow{U} \mathbb{F}_q,$$

$$k_i^* := (\overbrace{s_i + \theta_i v_{i,1}, \theta_i v_{i,2}, \ldots, \theta_i v_{i,n_t}}^{n_t'} 0^\varphi,$$

$$\overbrace{0^{n_t'}}, \overbrace{\eta_{i,1}, \ldots, \eta_{i,n_t'}}^{n_t'}, \overbrace{0^{n_t'}}_{\mathbb{B}_t^*})$$

$$\text{if } \rho(i) = \neg (t, \vec{v}_i := (v_{i,1}, \ldots, v_{i,n_t}) \in \mathbb{F}_q^{n_t}),$$

$$\eta_{i,1}, \ldots, \eta_{i,n_t'} \xleftarrow{U} \mathbb{F}_q,$$

$$k_i^* := (\overbrace{s_i(v_{i,1}, \ldots, v_{i,n_t})0^\varphi}^{n_t'}, \overbrace{0^{n_t'}}, \overbrace{\eta_{i,1}, \ldots, \eta_{i,n_t'}}^{n_t'}, \overbrace{0^{n_t'}}_{\mathbb{B}_t^*})$$

Regarding the Enc algorithm, the generating method of $c_t$ is modified as indicated in Formula 203.

$$c_t := (\overbrace{\delta(x_{t,1}, \ldots, x_{t,n_t}), 0^\varphi}^{n_t'}, \overbrace{0^{n_t'}}, \overbrace{0^{n_t'}}, \overbrace{\phi_{t,1}, \ldots, \phi_{t,n_t'}}^{n_t'})_{\mathbb{B}_t} \qquad [\text{Formula 203}]$$

Modification of the process for a case where $\rho^\sim$ is not injection has been described above only regarding the Key-Policy functional encryption described in Embodiment 1. The cryptographic process and the signature process described in other embodiments may be modified based on the same concept.

Embodiment 5

In the above embodiments, the method of implementing the cryptographic process and signature process in the dual vector spaces has been described. In Embodiment 5, a method of implementing a cryptographic process and signature process in dual additive groups will be described.

More specifically, in the above embodiments, the cryptographic process is implemented in the cyclic group of the prime order q. When a ring R is expressed using a composite number M as indicated in Formula 204, the cryptographic process described in the above embodiments can also be applied to an additive group having the ring R as a coefficient.

$$\mathbb{R} := \mathbb{Z}/M\mathbb{Z} \qquad [\text{Formula 204}]$$

where $\mathbb{Z}$: an integer; and

M: a composite number

For example, when the Key-Policy functional encryption described in Embodiment 1 is implemented in an additive group having a ring R as a coefficient, then Formulas 205 to 208 are resulted.

$$\text{Setup}(1^\lambda, \vec{\mu} := (d; n_1, \ldots, n_d)) \qquad [\text{Formula 205}]$$

$$(param_{\vec{\mu}}, \{\mathbb{B}_t, \mathbb{B}_t^*\}_{t=0,\ldots,d}) \xleftarrow{R} \mathcal{G}_{ob}(1^\lambda, \vec{\mu}),$$

$$\hat{\mathbb{B}}_0 := (b_{0,1}, b_{0,3}, b_{0,5}),$$

$$\hat{\mathbb{B}}_t := (b_{t,1}, \ldots, b_{t,n_t}, b_{t,3n_t+1}, \ldots, b_{t,4n_t})$$

for $t = 1, \ldots, d$, $$\hat{\mathbb{B}}_0^* := (b_{0,1}^*, b_{0,3}^*, b_{0,4}^*),$$

$$\hat{\mathbb{B}}_t^* := (b_{t,1}^*, \ldots, b_{t,n_t}^*, b_{t,2n_t+1}^*, \ldots, b_{t,3n_t}^*)$$

for $t = 1, \ldots, d$, $$sk := \{\hat{\mathbb{B}}_t^*\}_{t=0,\ldots,d}$$

$$pk := (1^\lambda, param_{\vec{\mu}}, \{\hat{\mathbb{B}}_t\}_{t=0,\ldots,d}).$$

return $sk, pk$.

Note that $$\mathcal{G}_{ob}(1^\lambda, \vec{\mu} := (d; n_1 \ldots, n_d)) : param_{\mathbb{G}} := (q, \mathbb{G}, \mathbb{G}_T g, e) \xleftarrow{R} \mathcal{G}_{bpg}(1^\lambda),$$

$$\psi \xleftarrow{U} \mathbb{R},$$

-continued $N_0 := 5$, $N_t := 4n_t$ for $t = 1, \ldots, d$,

For $t = 0, \ldots, d$, $$param_{\mathbb{V}_t} := (q, \mathbb{V}_t, \mathbb{G}_T, \mathbb{A}_t, e) := \mathcal{G}_{dpvs}(1^\lambda, N_t, param_{\mathbb{G}}),$$

$$X_t := (\chi_{t,i,j})_{i,j} \xleftarrow{U} GL(N_t, \mathbb{R}), (\upsilon_{t,i,j})_{i,j} := \psi \cdot (X_t^T)^{-1},$$

$$b_{t,i} := (\chi_{t,i,1}, \ldots, \chi_{t,i,N_t})_{\mathbb{A}_t} = \sum_{j=1}^{N_t} \chi_{t,i,j} a_{t,j}, \mathbb{B}_t := (b_{t,1}, \ldots, b_{t,N_t}),$$

$$b_{t,i}^* := (\upsilon_{t,i,1}, \ldots, \upsilon_{t,i,N_t})_{\mathbb{A}_t} = \sum_{j=1}^{N_t} \upsilon_{t,i,j} a_{t,j}, \mathbb{B}_t^* := (b_{t,1}^*, \ldots, b_{t,N_t}^*),$$

$$g_T := e(G, G)\psi, param_{\vec{\mu}} := (\{param_{\mathbb{V}_t}\}_{t=0,\ldots,d}, g_T)$$

return $(param_{\vec{\mu}}, \{\mathbb{B}_t, \mathbb{B}_t^*\}_{t=0,\ldots,d})$.

$KeyGen(pk, sk, \mathbb{S} := (M, \rho))$ [Formula 206]

$$\vec{f} \xleftarrow{U} \mathbb{R}^r, \vec{s}^T := (s_1, \ldots, s_L)^T := M \cdot \vec{f}^T, s_0 := \vec{1} \cdot \vec{f}^T,$$

$$\eta_0, \theta_i \xleftarrow{U} \mathbb{R}(i = 1, \ldots, L),$$

$$k_0^* := (-s_0, 0, 1, \eta_0, 0)_{\mathbb{B}_0^*},$$

for $1 \leq i \leq L$ if $\rho(i) = (t, v_i := (v_{i,1}, \ldots, v_{i,n_t}) \in \mathbb{R}^{n_t})$, $$\eta_{i,1}, \ldots, \eta_{i,n_t} \xleftarrow{U} \mathbb{R},$$

$$k_i^* := (\overbrace{s_i + \theta_i v_{i,1}, \theta_i v_{i,2}, \ldots, \theta_i v_{i,n_t}}^{n_t},$$

$$\overbrace{0^{n_t}}, \overbrace{\eta_{i,1}, \ldots, \eta_{i,n_t}}^{n_t}, \overbrace{0^{n_t}}^{n_t})_{\mathbb{B}_t^*}$$

if $\rho(i) = \neg (t, \vec{v_i} := (v_{i,1}, \ldots, v_{i,n_t}) \in \mathbb{R}^{n_t})$, $$\eta_{i,1}, \ldots, \eta_{i,n_t} \xleftarrow{U} \mathbb{R},$$

$$k_i^* := (\overbrace{s_i(v_{i,1}, \ldots, v_{i,n_t})}^{n_t}, \overbrace{0^{n_t}}, \overbrace{\eta_{i,1}, \ldots, \eta_{i,n_t}}^{n_t}, \overbrace{0^{n_t}}^{n_t})_{\mathbb{B}_t^*}$$

$$sk_{\mathbb{S}} := (\mathbb{S}, k_0^*, k_1^*, \ldots, k_L^*).$$

return $sk_{\mathbb{S}}$.

$Enc(pk, m, \Gamma :=$ [Formula 207]

$$\{(t, \vec{x_t} := (x_{t,1}, \ldots, x_{t,n_t}) \in \mathbb{F}_q^{n_i}) \mid 1 \leq t \leq d\}(x_{t,1} := 1)$$

$$\delta, \phi_0, \phi_{t,1}, \ldots, \phi_{t,n_t}, \zeta \xleftarrow{U} \mathbb{R} \text{ such that } (t, \vec{x_t}) \in \Gamma,$$

$$c_0 := (\delta, 0, \zeta, 0, \phi_0)_{\mathbb{B}_0},$$

$$c_t := (\overbrace{\delta(x_{i,1}, \ldots, x_{t,n_t})}^{n_t}, \overbrace{0^{n_t}, 0^{n_t}}, \overbrace{\phi_{t,1}, \ldots, \phi_{t,n_t}}^{n_t})_{\mathbb{B}_t}$$

for $(t, \vec{x_t}) \in \Gamma$, $$c_{d+1} := g_T^\zeta m, c := (\Gamma, c_0, \{c_t\}_{(t,\vec{x_t}) \in \Gamma}, c_{d+1}).$$

return $c$.

$Dec(pk, sk_{\mathbb{S}} := (\mathbb{S}, k_0^*, k_1^*, \ldots, k_L^*),$ [Formula 208]

$$c := (\Gamma, c_0, \{c_t\}_{(t,\vec{x_t}) \in \Gamma}, c_{d+1}))$$

If $\mathbb{S} := (M, \rho)$ accepts $\Gamma := \{(t, \vec{x_t})\}$, then compute $I$ and $\{\alpha_i\}_{i \in I}$ such that $$s_0 = \sum_{i \in I} \alpha_i s_i, \text{ and } I \subseteq \{i \in \{1, \ldots, L\} \mid [$$

$$\rho(i) = (t, \vec{v_i}) \wedge (t, \vec{x_t}) \in \Gamma \wedge \vec{v_i} \cdot \vec{x_t} = 0] \vee [$$

$$\rho(i) = \neg (t, \vec{v_i}) \wedge (t, \vec{x_t}) \in \Gamma \wedge \vec{v_i} \cdot \vec{x_t} \neq 0]\}.$$

$$K := e(c_0, k_0^*) \cdot \prod_{i \in I \wedge \rho(i) = (t, \vec{v_i})} e(c_t, k_i^*)^{\alpha_i} \cdot$$

$$\prod_{i \in I \wedge \rho(i) = \neg(t, \vec{v_i})} e(c_t, k_i^*)^{\alpha_i / (\vec{v_i} \cdot \vec{x_t})}$$

$m' = c_{d+1} / K$.

return $m'$.

The method of implementing the cryptographic process and signature process in an additive group having a ring R as a coefficient has been indicated only for the Key-Policy functional encryption described in Embodiment 1. As a principle, if the process described as a field $F_q$ in the above embodiments is replaced by a ring R, other cryptographic processes and signature processes described in the above embodiments can also be implemented in an additive group having a ring R as a coefficient.

The Setup algorithm in the above embodiments may be executed only once at the setup of the cryptographic processing system 10 or signature processing system 20, and need not be executed every time a decryption key is to be generated. In the above description, the Setup algorithm and the KeyGen algorithm are executed by the key generation device 100. Alternatively, the Setup algorithm and the KeyGen algorithm may be executed by different devices respectively.

In the above embodiments, the span program M^ accepts the input sequence δ if and only if linear combination of the rows of the matrix $M_\delta$ obtained from the matrix M^ by the input sequence δ gives $\vec{1}$. Alternatively, the span program M^ may accept the input sequence δ only if another vector $\vec{v}$ is obtained instead of $\vec{1}$.

In this case, in the KeyGen algorithm, $s_0 := \vec{v} \cdot \vec{f}^T$ may be set instead of $s_0 := \vec{1} \cdot \vec{f}^T$. Likewise, when calculating $\alpha_i$ in the Sig algorithm, $\alpha_i$ with which $\Sigma_{i \in I} \alpha_i M_i = \vec{v}$ may be calculated.

The cryptographic process in the above description can be adopted for authority delegation. Authority delegation means that a person having a decryption key generates a lower-level decryption key having weaker authority than the decryption key of his or her own. Weaker authority means that encrypted data that the decryption key can decrypt is limited.

For example, in the first hierarchical layer (highest order), bases $B_t$ and $B^*_t$ for t=1 are used, in the second hierarchical layer, bases $B_t$ and $B^*_t$ for t=1, 2 are used, . . . , in the k-th hierarchical layer, bases $B_t$ and $B^*_t$ for t=1, . . . , k are used. As the bases $B_t$ and $B^*_t$ to be used increase, a larger number of pieces of attribute information are set. Accordingly, authority of the decryption key is limited more.

For example, in the first hierarchical layer (highest order), bases $B_t$ and $B^*_t$ for t=1 are used, in the second hierarchical layer, bases B, and $B^*_t$ for t=1, 2 are used, in the k-th hierarchical layer, bases B, and $B^*_t$ for t–1, . . . , k are used. As the bases $B_t$ and $B^*_t$ to be used increase, a larger number of pieces of attribute information are set. Accordingly, authority of the decryption key is limited more.

The hardware configuration of the cryptographic processing system 10 (the key generation device 100, the encryption device 200, and the decryption device 300) and of the signature processing system 20 (the key generation device 100, the signature device 400, and the verification device 500) in the above embodiments will be described.

Figure 22:
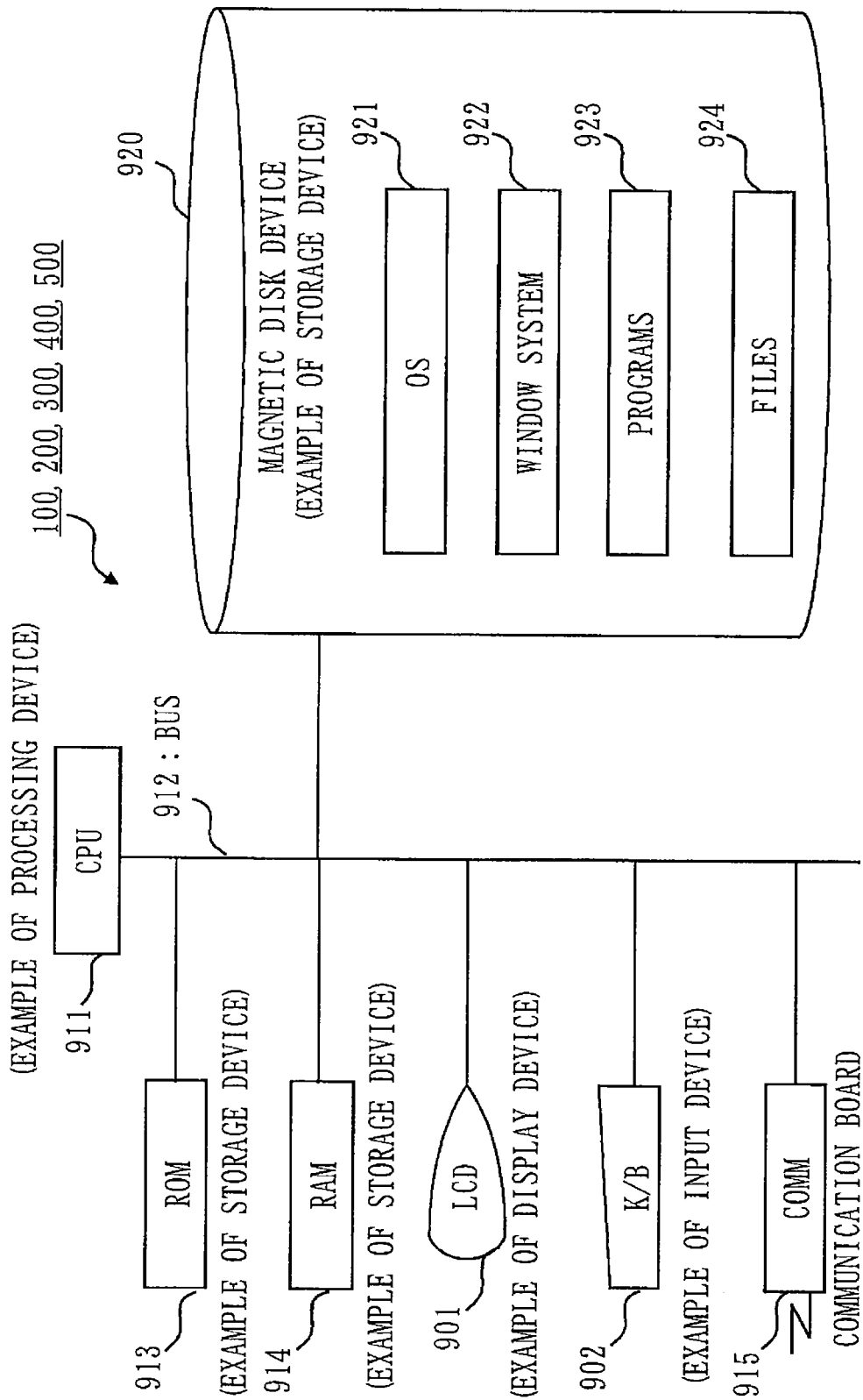
[FIG. 22] is a diagram showing an example of the hardware configuration of each of a key generation device 100, an encryption device 200, a decryption device 300, a signature device 400, and a verification device 500.

FIG. 22 is an illustration showing an example of the hardware configuration of each of the key generation device 100, encryption device 200, decryption device 300, signature device 400, and verification device 500.

As shown in FIG. 22, each of the key generation device 100, encryption device 200, decryption device 300, signature device 400, and verification device 500 includes a CPU 911 (also referred to as a Central Processing Unit, central processing device, processing device, computation device, microprocessor, microcomputer, or processor) which executes programs. The CPU 911 is connected to a ROM 913, a RAM 914, an LCD 901 (Liquid Crystal Display), the keyboard 902 (K/B), the communication board 915, and the magnetic disk device 920 via a bus 912, and controls these hardware devices. In place of the magnetic disk device 920 (fixed disk device), a storage device such as an optical disk device or memory card read/write device may be connected. The magnetic disk device 920 is connected via a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of the storage device (memory). The keyboard 902 and the communication board 915 are examples of an input device. The communication board 915 is an example of a communication device (network interface). Furthermore, the LCD 901 is an example of a display device.

The magnetic disk device 920, ROM 913, or the like stores an operating system 921 (OS), a window system 922, programs 923, and files 924. The CPU 911, the operating system 921, and the window system 922 execute each program of the programs 923.

The programs 923 store software and programs that execute the functions described as the "master key generation part 110", "master key storage part 120", "information input part 130", "decryption key generation part 140", "key distribution part 150", "public parameter acquisition part 210", "information input part 220", "encrypted data generation part 230", "data transmission part 240", "decryption key acquisition part 310", "data reception part 320", "span program calculation part 330", "complementary coefficient calculation part 340", "pairing operation part 350", "plaintext information calculation part 360", "signature key acquisition part 410", "information input part 420", "complementary coefficient calculation part 430", "signature generation part 450", "data transmission part 460", "public parameter acquisition part 510", "data reception part 520", "encrypted data generation part 530", "pairing operation part 540", and the like in the above description. The programs 923 store other programs as well. The programs are read and executed by the CPU 911.

The files 924 store information, data, signal values, variable values, and parameters such as the "public parameters pk", "master key sk", "encrypted data c", "decryption key $sk_s$", "decryption key $sk_\Gamma$", "access structure S", "attribute set Γ", "message m", "signature data sig", and the like of the above explanation, as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 911 through a read/write circuit, and are used for the operations of the CPU 911 such as extraction, search, look-up, comparison, computation, calculation, process, output, print, and display. The information, data, signal values, variable values, and parameters are temporarily stored in the main memory, cache memory, buffer memory, or the like during the operations of the CPU 1911 including extraction, search, look-up, comparison, computation, calculation, process, output, print, and display.

The arrows of the flowcharts in the above explanation mainly indicate input/output of data and signals. The data and signal values are stored in the memory of the RAM 914, the recording medium such as an optical disk, or in an IC chip. The data and signals are transmitted online via a transmission medium such as the bus 912, signal lines, or cables, or electric waves.

The "part" in the above explanation may be a "circuit", "device", "equipment", "means" or "function"; or a "step", "procedure", or "process". The "device" may be a "circuit", "equipment", "means", or "function"; or a "step", "procedure", or "process". The "process" may be a "step". Namely, the "part" may be implemented as firmware stored in the ROM 913. Alternatively, the "part" may be implemented by only software; by only hardware such as an element, a device, a substrate, or a wiring line; by a combination of software and hardware; or furthermore by a combination of software, hardware, and firmware. The firmware and software are stored, as programs, in the recording medium such as the ROM 913. The program is read by the CPU 911 and executed by the CPU 911. Namely, the program causes the computer to function as a "part" described above. Alternatively, the program causes the computer or the like to execute the procedure and method of the "part" described above.

Reference Signs List

10: cryptographic processing system; 20: signature processing system; 100: key generation device; 110: master key generation part; 120: master key storage part; 130: information input part; 140: decryption key generation part; 141: f vector generation part; 142: s vector generation part; 143: random number generation part; 144: key element generation part; 145: confidential element generation part; 150: key distribution part; 160: signature key generation part; 161: random number generation part; 162: key element generation part; 200: encryption device; 210: public parameter acquisition part; 220: information input part; 230: encrypted data generation part; 231: random number generation part; 232: cryptographic element generation part; 233: f vector generation part; 234: s vector generation part; 240: data transmission part; 300: decryption device; 310: decryption key acquisition part; 320: data reception part; 330: span program calculation part; 340: complementary coefficient calculation part; 350: pairing operation part; 360: plaintext information calculation part; 400: signature device; 410: signature key acquisition part; 420: information input part; 430: complementary coefficient calculation part; 440: matrix generation part; 450: signature generation part; 451: random number generation part; 452: signature element generation part; 460: data transmission part; 500: verification device; 510: public parameter acquisition part; 520: data reception part; 530: encrypted data generation part; 540; pairing operation part; 531: random number generation part; 532: cryptographic element generation part; 533: f vector generation part; 534: s vector generation part

The invention claimed is:

1. A cryptographic processing system comprising a key generation device, an encryption device, and a decryption device, and serving to execute a cryptographic process using a basis $B_t$ and a basis $B^*_t$ for each integer $t=0, \ldots, d$ (d is an integer of 1 or more), wherein the key generation device includes a first information input part which takes as input, a variable $\rho(i)$ for each integer $i=1, \ldots, L$ (L is an integer of 1 or more), which variable $\rho(i)$ is either one of a positive tuple $(t, \vec{v}_i)$ and a negative tuple $\neg(t, \vec{v}_i)$ of identification information t (t is any one integer of $t=1, \ldots, d$) and an attribute vector $\vec{v}_i := (v_{i,i'})$ ($i'=1, \ldots, n_t$ where $n_t$ is an integer of 1 or more), and a predetermined matrix M having L rows and r columns (r is an integer of 1 or more), and a decryption key generation part which generates an element $k^*_0$, and an element $k^*_i$ for each integer $i=1, \ldots, L$, based on a column vector $\vec{s}^T := (s_1, \ldots, s_L)^T := M \cdot \vec{f}^T$ generated based on a vector $\vec{f}$ and a vector $\vec{w}$, each having r pieces of elements, and the matrix M inputted by the first information input part; a value $s_0 := \vec{w} \cdot \vec{f}^T$; and a predetermined value $\theta_i$ ($i=1, \ldots, L$), the decryption key generation part being configured to generate the element $k^*_0$ by setting a value $-s_0$ as a coefficient for a basis vector $b^*_{0,p}$ (p is a predetermined value) of the basis $B^*_0$ and by setting a predetermined value $\kappa$ as a coefficient for a basis vector $b^*_{0,q}$ (q is a predetermined value different from prescribed p), and to generate the element $k^*_i$ for each integer $i=1, \ldots, L$, when the variable $\rho(i)$ is a positive tuple $(t, \vec{v}_i)$, by setting $s_i + \theta_i v_{i,1}$ as a coefficient for a basis vector $b^*_{t,1}$ of the basis $B^*_t$ indicated by identification information t of the positive tuple, and by setting $\theta_i v_{i,i'}$ as a coefficient for a basis vector $b^*_{t,i'}$ indicated by the identification information t and each integer $i'=2, \ldots, n_t$, and when the variable $\rho(i)$ is a negative tuple $\neg(t, \vec{v}_i)$, by setting $s_i v_{i,i'}$ as a coefficient for the basis vector $b^*_{t,i'}$ indicated by the identification information t of the negative tuple and by each integer $i'=1, \ldots, n_t$, wherein the encryption device includes a second information input part which takes as input, an attribute set $\Gamma$ having the identification information t and an attribute vector $\vec{x}_t := (x_{t,i'})$ ($i'=1, \ldots, n_t$ where $n_t$ is an integer of 1 or more) for at least one integer $t=1, \ldots, d$, and an encrypted data generation part which generates an element $c_0$, and an element $c_t$ concerning each identification information t included in the attribute set $\Gamma$, based on the attribute set $\Gamma$ inputted by the second information input part, the encrypted data generation part being configured to generate the element $c_0$ where a random value $\delta$ is set as a coefficient for a basis vector $b_{0,p}$ (p is prescribed p) of a basis $B_0$, and where a predetermined value $\zeta$ is set as a coefficient for a basis vector $b_{0,q}$ (q is prescribed q) of a basis $B_0$, and to generate the element $c_t$ where $x_{t,i'}$ multiplied by the random value $\delta$ is set as a coefficient for a basis vector $b_{t,i'}$ ($i'=1, \ldots, n_t$) of the basis $B_t$ for each identification information t included in the attribute set $\Gamma$; and wherein the decryption device includes a data acquisition part which acquires encrypted data c including the elements $c_0$ and $c_t$ and the attribute set $\Gamma$, the elements $c_0$ and $c_t$ being generated by the encrypted data generation part, a decryption key acquisition part which acquires a decryption key $sk_s$ including the elements $k^*_0$ and $k^*_i$ and the variable number $\rho(i)$, the elements $k^*_0$ and $k^*_i$ being generated by the decryption key generation part, a complementary coefficient calculation part which, based on the attribute set $\Gamma$ included in the encrypted data c acquired by the data acquisition part, and the variable $\rho(i)$ included in the decryption key $sk_s$ acquired by the decryption key acquisition part, specifies, among integers $i=1, \ldots, L$, a set I of an integer i for which the variable $\rho(i)$ is a positive tuple $(t, \vec{v}_i)$ and with which an inner-product of $\vec{v}_i$ the positive tuple and $\vec{x}_t$ included in $\Gamma$ indicated by identification information t of the positive tuple becomes 0, and an integer i for which the variable $\rho(i)$ is a negative tuple $\neg(t, \vec{v}_i)$ and with which an inner-product of $\vec{v}_i$ of the negative tuple and $\vec{x}_t$ included in $\Gamma$ indicated by identification information t of the negative tuple does not become 0; and calculates a complementary coefficient $\alpha_i$ with which a total of $\alpha_i s_i$ for i included in the set I specified becomes $s_0$, and a pairing operation part which calculates a value $K = g_T^{\zeta \kappa}$ by conducting a pairing operation indicated in Formula 1 for the elements $c_0$ and $c_t$ included in the encrypted data c and the elements $k^*_0$ and $k^*_i$ included in the decryption key $sk_s$, based on the set I specified by the complementary coefficient calculation part and on the complementary coefficient $\alpha_i$ calculated by the complementary coefficient calculation part $$K := e(c_0, k^*_0) \cdot \prod_{i \in I \land \rho(i)=(t,\vec{v}_i)} e(c_t, k^*_i)^{\alpha_i} \cdot \prod_{i \in I \land \rho(i)=\neg(t,\vec{v}_i)} e(c_t, k^*_i)^{\alpha_i/(\vec{v}_i \cdot \vec{x}_i)}.$$ [Formula 1]

2. The cryptographic processing system according to claim 1, which executes the cryptographic process using the basis $B_0$ having at least a basis vector $b_{0,i}$ ($i=1, \ldots, 5$), the basis $B_t$ ($t=1, \ldots, d$) having at least a basis vector $b_{t,i}$ ($i=1, \ldots, n_t, \ldots, n_t+u_t, \ldots, n_t+u_t+w_t, \ldots, n_t+u_t+w_t+z_t$) ($u_t$, $w_t$, and $z_t$ are each an integer of 1 or more), the basis $B^*_0$ having at least a basis vector $b^*_{0,i}$ ($i=1, \ldots, 5$), and the basis $B^*_t$ ($t=1, \ldots, d$) having at least a basis vector $b^*_{t,i}$ ($i=1, \ldots, n_t, \ldots, n_t+u_t, \ldots, n_t+u_t+w_t, \ldots, n_t+u_t+w_t+z_t$), wherein the decryption key generation part of the key generation device generates the element $k^*_0$ indicated in Formula 2 based on a random value $\eta_0$ and the predetermined value $\kappa$, generates the element $k^*_i$ indicated in Formula 3 based on the random value $\theta_i$ ($i=1, \ldots, L$) and a random value $\eta_{i,i'}$ ($i=1, \ldots, L, i'=1, \ldots, w_t$) when the variable $\rho(i)$ is a positive tuple $(t, \vec{v}_i)$, and generates the element $k^*_i$ indicated in Formula 4 based on the random value $\eta_{i,i'}$ ($i=1, \ldots, L, i'=1, \ldots, w_t$) when the variable $\rho(i)$ is a negative tuple $\neg(t, \vec{v}_i)$, and wherein the encrypted data generation part of the encryption device generates the element $c_0$ indicated in Formula 5 based on the random value $\delta$, a random value $\phi_0$, and a predetermined value $\zeta$, and generates the element $c_t$ indicated in Formula 6 based on the random value $\delta$ and a random value $\phi_{t,i}$ ($i=1, \ldots, z_t$)

$$k^*_0 := (-s_0, 0, \kappa, \eta_0, 0)_{B^*_0}$$ [Formula 2]

$$k^*_i := (s_i + \theta_i v_{i,1}, \theta_i v_{i,2}, \ldots, \theta_i v_{i,1}, 0^{u_t}, \eta_{i,1}, \ldots, \eta_{i,w_t}, 0^{z_t},)_{B^*_t}$$ [Formula 3]

$$k_i^* := (\overbrace{s_i(v_{i,1}, \ldots, v_{i,n_t})}^{n_t}, \overbrace{0^{u_t}}^{u_t}, \overbrace{\eta_{i,1}, \ldots, \eta_{i,w_t}}^{w_t}, \overbrace{0^{z_t}}^{z_t})_{\mathbb{B}_t^*}$$ [Formula 4]

$$c_0 := (\delta, 0, \zeta, 0, \phi_0)_{\mathbb{B}_0}$$ [Formula 5]

$$c_t := (\overbrace{\delta(x_{t,1}, \ldots, x_{t,n_t})}^{n_t}, \overbrace{0^{u_t}}^{u_t}, \overbrace{0^{w_t}}^{w_t}, \overbrace{\phi_{t,1}, \ldots, \phi_{t,z_t}}^{z_t})_{\mathbb{B}_t}$$ [Formula 6]

3. A key generation device which generates a decryption key $sk_s$, in a cryptographic processing system which executes a cryptographic process using a basis $\mathbb{B}_t$ and a basis $\mathbb{B}^*_t$ for each integer $t=0, \ldots, d$ (d is an integer of 1 or more), the key generation device comprising:
- a first information input part which takes as input, a variable $\rho(i)$ for each integer $i=1, \ldots, L$ (L is an integer of 1 or more), which is either one of a positive tuple $(t, \vec{v}_i)$ and a negative tuple $\neg (t, \vec{v}_i)$ of identification information t (t is any one integer of $t=1, \ldots, d$) and an attribute vector $\vec{v}_i:=(v_{i,i'})$ ($i'=1, \ldots, n_t$ where $n_t$ is an integer of 1 or more), and a predetermined matrix M having L rows and r columns (r is an integer of 1 or more);
- a decryption key generation part which generates an element $k^*_0$, and an element $k^*_i$ for each integer $i=1 \ldots, L$, based on a column vector $\vec{s}^T:=(s_1, \ldots, s_L)^T:=M \cdot \vec{f}^T$ generated based on a vector $\vec{f}$ and a vector $\vec{w}$, each having r pieces of elements, and the matrix M inputted by the first information input part; a value $s_0:=\vec{w} \cdot \vec{f}$; and a predetermined value $\theta_i$ ($i=1, \ldots, L$), the decryption key generation part being configured
  to generate the element $k^*_0$ by setting a value $-s_0$ as a coefficient for a basis vector $b^*_{0,p}$ (p is a predetermined value) of the basis $\mathbb{B}^*_0$ and by setting a predetermined value $\kappa$ as a coefficient for the basis vector $b^*_{0,q}$ (q is a predetermined value different from prescribed p), and
  to generate the element $k^*_i$ for each integer $i=1, \ldots, L$, when the variable $\rho(i)$ is a positive tuple $(t, \vec{v}_i)$, by setting $s_i + \theta_i v_{i,1}$ as a coefficient for a basis vector $b^*_{t,1}$ of the basis $\mathbb{B}^*_t$ indicated by identification information t of the positive tuple, and by setting $\theta_i v_{i,i'}$ as a coefficient for a basis vector $b^*_{t,i'}$ indicated by the identification information t and each integer $i'=2, \ldots, n_t$, and when the variable $\rho(i)$ is a negative tuple $\neg (t, \vec{v}_i)$, by setting $s_i v_{i,i'}$ as a coefficient for the basis vector $b^*_{t,i'}$ indicated by the identification information t of the negative tuple and by each integer $i'=1, \ldots, n_t$; and
- a key distribution part which distributes data including the variable $\rho(i)$ inputted by the first information input part and the elements $k^*_0$ and $k^*_i$ generated by the decryption key generation part, as the decryption key $sk_s$.

4. An encryption device which generates encrypted data c in a cryptographic processing system which executes a cryptographic encryption process using a basis $\mathbb{B}_t$ and a basis $\mathbb{B}^*_t$ for each integer $t=0, \ldots, d$ (1 is an integer of 1 or more), the encryption device comprising:
- a second information input part which takes as input, an attribute set $\Gamma$ having the identification information t and an attribute vector $\vec{x}_t:=(x_{t,i'})$ ($i'=1, \ldots, n_t$ where $n_t$ is an integer of 1 or more) for at least one integer $t=1, \ldots, d$;
- an encrypted data generation part which generates an element $c_0$, and an element $c_t$ concerning each identification information t included in the attribute set $\Gamma$, based on the attribute set $\Gamma$ inputted by the second information input part, the encrypted data generation part being configured
  to generate the element $c_0$ where a random value $\delta$ is set as a coefficient for a basis vector $b_{0,p}$ (p is prescribed p) of a basis $\mathbb{B}_0$, and where a predetermined value $\zeta$ is set as a coefficient for a basis vector $B_{0,q}$ (q is prescribed q) of a basis $\mathbb{B}_0$, and
  to generate the element $c_t$ where $x_{t,i'}$ multiplied by the random value $\delta$ is set as a coefficient for a basis vector $b_{t,i'}$ ($i'=1, \ldots, n_t$) of the basis $\mathbb{B}_t$ for each identification information t included in the attribute set; and
- a data output part which outputs the attribute set $\Gamma$ inputted by the second information input part and the elements $c_0$ and $c_t$ generated by the encrypted data generation part, as the encrypted data c.

5. A decryption device which decrypts encrypted data c with a decryption key $sk_s$ in a cryptographic processing system which executes a cryptographic process using a basis $\mathbb{B}_t$ and a basis $\mathbb{B}^*_t$ for each integer $t=0, \ldots, d$ (d is an integer of 1 or more), the decryption device comprising:
- a data acquisition part which acquires
  an element $c_0$ and an element $c_t$ (each integer included in the attribute set $\Gamma$) generated based on an attribute set $\Gamma$ having identification information t and an attribute vector $\vec{x}_t:=(x_{t,i'})$ ($i'=1, \ldots, n_t$ where $n_t$ is an integer of 1 or more) for at least one integer $t=1, \ldots, d$, together with the attribute set $\Gamma$, as the encrypted data c,
  the element $c_0$ being set with a random value $\delta$ as a coefficient for a basis vector $b_{0,p}$ (p is a predetermined value) of a basis $\mathbb{B}_0$ and being set with a predetermined value $\zeta$ as a coefficient for a basis vector $b_{0,q}$ (q is a predetermined value different from prescribed p) of the basis $\mathbb{B}_0$,
  the element $c_t$ being set with multiplied by the random value $\delta$, as a coefficient for a basis vector $b_{t,i'}$ ($i'=1, \ldots, n_t$) of a basis $\mathbb{B}_t$, for each identification information t included in the attribute set $\Gamma$;
- a decryption key acquisition part which acquires
  an element $k^*_0$ and an element $k^*_i$ (each integer $i=1 \ldots, L$) generated based on a column vector $\vec{s}^T:=(s_1, \ldots, s_L)^T:=M \cdot \vec{f}^T$ generated based on a vector $\vec{f}$ and a vector $\vec{w}$ each having r (r is an integer of 1 or more) pieces of elements, and a predetermined matrix M having L rows and r columns; a value $s_0:=\vec{w} \cdot \vec{f}$; a predetermined value $\theta_i$ ($i=1, \ldots, L$); and a variable $\rho(i)$ for each integer $i=1, \ldots, L$ (L is an integer of 1 or more), together with the variable $\rho(i)$, the variable $\rho(i)$ being either one of a positive tuple $(t, \vec{v}_i)$ and a negative tuple $\neg (t, \vec{v}_i)$, of the identification information t (t is any integer of $t=1, \ldots, d$) and an attribute vector $\vec{v}_i:=(v_{i,i'})$ ($i'=1, \ldots, n_t$, $n_t$ is an integer of 1 or more), as the decryption key $sk_s$,
  the element $k^*_0$ being set with the value $-s_0$ as a coefficient for a basis vector $b^*_{0,p}$ (p is prescribed p) of a basis $\mathbb{B}^*_0$ and being set with a predetermined value $\kappa$ as a coefficient for the basis vector $b^*_{0,q}$ (q is prescribed q) of the basis $\mathbb{B}^*_0$, and
  the element $k^*_i$ for each integer $i=1, \ldots, L$, when the variable $\rho(i)$ is a positive tuple $(t, \vec{v}_i)$, being set with $s_i + \theta_i v_{i,1}$ as a coefficient for a basis vector $b^*_{t,1}$ of the basis $\mathbb{B}^*_t$ indicated by identification information t of the positive tuple, and being set with $\theta_i v_{i,i'}$ as a coefficient of a basis vector $b^*_{t,i'}$ indicated by the identification information t and by each integer $i'=2, \ldots, n_t$, and when the variable $\rho(i)$ is a negative tuple $\neg (t, \vec{v}_i)$, being set with $s_i v_{i,i'}$ as a coefficient for the basis vector $b^*_{t,i'}$ indicated by the identification information t of the negative tuple and by each integer $i'=1, \ldots, n_t$;
- a complementary coefficient calculation part which, based on the attribute set $\Gamma$ included in the encrypted data c acquired by the data acquisition part, and the variable ρ(i) included in the decryption key $sk_s$ acquired by the decryption key acquisition part, specifies, among integers i=1, . . . , L, a set I of an integer i for which the variable ρ(i) is a positive tuple (t, $\vec{v}_i$) and with which an inner-product of $\vec{v}_i$ of the positive tuple and $\vec{x}_t$ included in Γ indicated by identification information t of the positive tuple becomes 0, and an integer i for which the variable ρ(i) is a negative tuple ¬ (t, $\vec{v}_i$) and with which an inner-product of $\vec{v}_i$ of the negative tuple and $\vec{x}_t$ included in Γ indicated by identification information t of the negative tuple does not become 0; and calculates a complementary coefficient $α_i$ with which a total of $α_i s_i$ for i included in the set I specified becomes $s_0$; and a pairing operation part which calculates a value $K=g_T^{ζα}$ by conducting a pairing operation indicated in Formula 7 for the elements $c_0$ and $c_t$ included in the encrypted data c and the elements $k^*_0$ and $k^*_t$ included in the decryption key $sk_s$, based on the set I specified by the complementary coefficient calculation part and on the complementary coefficient $α_i$ calculated by the complementary coefficient calculation part $$K := e(c_0, k_0^*) \cdot \prod_{i \in I \wedge ρ(i)=(t,\vec{v}_i)} e(c_t, k_t^*)^{α_i} \cdot \prod_{i \in I \wedge ρ(i)=¬(t,\vec{v}_i)} e(c_t, k_t^*)^{α_i/(\vec{v}_i \cdot \vec{x}_i)}. \quad \text{[Formula 7]}$$

6. A cryptographic processing system comprising a key generation device, an encryption device, and a decryption device, and serving to execute a cryptographic process using a basis $B_t$ and a basis $B^*_t$ for each integer t=0, . . . , d (d is an integer of 1 or more), wherein the key generation device includes a first information input part which takes as input, an attribute set Γ having identification information t and an attribute vector $\vec{x}_t:=(x_{t,i'})$ (i'=1, . . . , $n_t$ where $n_t$ is an integer of 1 or more) for at least one integer t=1, . . . , d, and a decryption key generation part which generates an element $k^*_0$, and an element $k^*_t$ concerning each identification information t included in the attribute set Γ, based on the attribute set Γ inputted by the first information input part, the decryption key generation part being configured to generate the element $k^*_0$ where a random value δ is set as a coefficient for a basis vector $b^*_{0,p}$ (p is a predetermined value) of a basis $B^*_0$, and where a predetermined value κ is set as a coefficient for a basis vector $b^*_{0,q}$ (q is a predetermined value different from prescribed p), and to generate the element $k^*_t$ where $x_{t,i'}$ multiplied by the random value δ is set as a coefficient for a basis vector $b^*_{t,i'}$ (i'=1, . . . , $n_t$) of the basis $B^*_t$, for each identification information t included in the attribute set Γ, wherein the encryption device includes a second information input part which takes as input, a variable ρ(i) for each integer i=1, . . . , L (L is an integer of 1 or more), which is either one of a positive tuple (t, $\vec{v}_i$) and a negative tuple ¬ (t, $\vec{v}_i$) of identification information t (t is any one integer of t=1, . . . , d) and an attribute vector $\vec{v}_i:=(v_{i,i'})$ (i'=1, . . . , $n_t$ where $n_t$ is an integer of 1 or more), and a predetermined matrix M having L rows and r columns (r is an integer of 1 or more), and a encrypted data generation part which generates an element $c_0$, and an element $c_t$ for each integer i=1 . . . , L, based on a column vector $\vec{s}^T:=(s_1, \ldots, s_L)^T:=M \cdot \vec{f}^T$ generated based on a vector $\vec{f}$ and a vector $\vec{w}$ each having r pieces of elements, and the matrix M inputted by the second information input part; a value $s_0:=\vec{w} \cdot \vec{f}^T$; and a predetermined value $θ_i$ (i=1, . . . , L), the encrypted data generation part being configured to generate the element $c_0$ by setting the value $-s_0$ as a coefficient for a basis vector $b_{0,p}$ (p is prescribed p) of the basis $B_0$ and by setting a predetermined value ζ as a coefficient for the basis vector $b_{0,q}$ (q is prescribed q), and to generate the element $c_i$ for each integer i=1, . . . , L, when the variable ρ(i) is a positive tuple (t, $\vec{v}_i$), by setting $s_i + θ_i v_{i,1}$ as a coefficient for a basis vector $b_{t,1}$ of the basis $B_t$ indicated by identification information t of the positive tuple, and by setting $θ_i v_{i,i'}$ as a coefficient for a basis vector $b_{t,i'}$ indicated by the identification information t and each integer i'=2, . . . , $n_t$, and when the variable ρ(i) is a negative tuple ¬ (t, $\vec{v}_i$), by setting $s_i v_{i,i'}$ as a coefficient for the basis vector $b_{t,i'}$ indicated by the identification information t of the negative tuple and by each integer i'=1, . . . , $n_t$, and wherein the decryption device includes a data acquisition part which acquires encrypted data c including the elements $c_0$ and $c_t$ and the variable ρ(i), the elements $c_0$ and $c_t$ being generated by the encrypted data generation part, a decryption key acquisition part which acquires the decryption key $sk_Γ$ including the elements $k^*_0$ and $k^*_t$ and the attribute set Γ, the elements $k^*_0$ and $k^*_t$ being generated by the decryption key generation part, a complementary coefficient calculation part which, based on the variable ρ(i) concerning each integer i=1, . . . , L included in the encrypted data c acquired by the data acquisition part and the attribute set Γ included in the decryption key $sk_Γ$ acquired by the decryption key acquisition part, specifies, among integers i=1, . . . , L, a set I of an integer i for which the variable ρ(i) is a positive tuple (t, $\vec{v}_i$) and with which an inner-product of $\vec{v}_i$ of the positive tuple and $\vec{x}_t$ included in Γ indicated by the identification information t of the positive tuple becomes 0, and an integer i for which the variable ρ(i) is a negative tuple ¬ (t, $\vec{v}_i$) and with which an inner-product of $\vec{v}_i$ of the negative tuple and $\vec{x}_t$ included in Γ indicated by the identification information t of the negative tuple does not become 0; and calculates a complementary coefficient $α_i$ with which a total of $α_i s_i$ for i included in the set I specified becomes $s_0$, and a pairing operation part which calculates a value $K=g_T^{ζα}$ by conducting a pairing operation indicated in Formula 8 for the elements $c_0$ and $c_t$ included in the encrypted data c and the elements $k^*_0$ and $k^*_t$ included in the decryption key $sk_Γ$, based on the set I specified by the complementary coefficient calculation part and the complementary coefficient $α_i$ calculated by the complementary coefficient calculation part $$K := e(c_0, k_0^*) \cdot \prod_{i \in I \wedge ρ(i)=(t,\vec{v}_i)} e(c_i, k_t^*)^{α_i} \cdot \prod_{i \in I \wedge ρ(i)=¬(t,\vec{v}_i)} e(c_i, k_t^*)^{α_i/(\vec{v}_i \cdot \vec{x}_t)}. \quad \text{[Formula 8]}$$

7. The cryptographic processing system according to claim 6, which executes the cryptographic process using the basis $B_0$ having at least a basis vector $b_{0,i}$ (i=1, . . . , 5), the basis $B_t$ (t=1, . . . , d) having at least a basis vector $b_{t,i}$ (i=1, . . . , $n_t$, . . . , $n_t+u_t$, . . . , $n_t+u_t+w_t$, . . . , $n_t+u_t+w_t+z_t$) ($u_t$, $w_t$, and $z_t$ are each an integer of 1 or more), the basis $B^*_0$ having at least a basis vector $b^*_{0,i}$ (i=1, . . . , 5), and the basis $B^*_t$ (t=1, . . . , d) having at least a basis vector $b^*_{t,i}$ (i=1, . . . , $n_t$, . . . , $n_t+u_t$, . . . , $n_t+u_t+w_t$, . . . , $n_t+u_t+w_t+z_t$), wherein the decryption key generation part of the key generation device generates the element $k^*_0$ indicated in Formula 9 based on the random value $\delta$, a random value $\phi_0$, and the predetermined value $\kappa$, and generates the element $k^*_t$ indicated in Formula 10 based on the random values $\delta$ and $\phi_{t,i}$ (i=1, . . . , $w_t$), and wherein the encrypted data generation part of the encryption device generates the element $c_0$ indicated in Formula 11 based on a random value $\eta_0$ and a predetermined value $\zeta$, generates an element $c_i$ indicated in Formula 12 based on a random value $\theta_i$ (i=1, . . . , L) and a random value $\eta_{i,i'}$ (i=1, . . . , L, i'=1, . . . , $z_t$) when the variable $\rho(i)$ is a positive tuple (t, $\vec{v}_i$), and generates an element $c_i$ indicated in Formula 13 based on the random value $\eta_{i,i'}$ (i=1, . . . , L, i'=1, . . . , $z_t$) when the variable $\rho(i)$ is a negative tuple $\neg$ (t, $\vec{v}_i$)

$$k^*_0 := (\delta, 0, \kappa, \phi_0, 0)_{B^*_0} \qquad \text{[Formula 9]}$$

$$k^*_t := (\overline{\delta(x_{t,1}, \ldots, x_{t,n_t})}, \overline{0^{u_t}}^{u_t}, \overline{\phi_{t,1}, \ldots, \phi_{t,w_t}}^{w_t}, \overline{0^{z_t}}^{z_t})_{B^*_t} \qquad \text{[Formula 10]}$$

$$c_0 := (-s_0, 0, \zeta, 0, \eta_0)_{B_0} \qquad \text{[Formula 11]}$$

$$c_i := (\overline{s_i + \theta_i v_{i,1}, \theta_i v_{i,2}, \ldots, \theta_i v_{i,n_t}}^{n_t}, \overline{0^{u_t}}^{u_t}, \overline{0^{w_t}}^{w_t}, \overline{\eta_{i,1}, \ldots, \eta_{i,z_t}}^{z_t})_{B_t} \qquad \text{[Formula 12]}$$

$$c_i := (\overline{s_i(v_{i,1}, \ldots, v_{i,n_t})}^{n_t}, \overline{0^{u_t}}^{u_t}, \overline{0^{w_t}}^{w_t}, \overline{\eta_{i,1}, \ldots, \eta_{i,z_t}}^{z_t})_{B_t} \qquad \text{[Formula 13]}$$

8. A key generation device which generates a decryption key $sk_\Gamma$ in a cryptographic processing system which executes a cryptographic process using a basis $B_t$ and a basis $B^*_t$ for each integer t=0, . . . , d (d is an integer of 1 or more), the key generation device comprising:

a first information input part which takes as input, an attribute set $\Gamma$ having identification information t and an attribute vector $\vec{x}_t:=(x_{t,i'})$ (i'=1, . . . , $n_t$ where $n_t$ is an integer of 1 or more) for at least one integer t=1, . . . , d;

a decryption key generation part which generates an element $k^*_0$, and an element $k^*_t$ concerning each identification information t included in the attribute set $\Gamma$, based on the attribute set $\Gamma$ inputted by the first information input part, the decryption key generation part being configured to generate the element $k^*_0$ where a random value $\delta$ is set as a coefficient for a basis vector $b^*_{0,p}$ (p is a predetermined value) of a basis $B^*_0$, and where a predetermined value $\kappa$ is set as a coefficient for a basis vector $b^*_{0,q}$ (q is a predetermined value different from prescribed p), and to generate the element $k^*_t$ where $x_{t,i'}$ multiplied by the random value $\delta$ is set as a coefficient for a basis vector $b^*_{t,i'}$ (i'=1, . . . , $n_t$) of the basis $B^*_t$ for each identification information t included in the attribute set $\Gamma$; and a key distribution part which distributes data including the attribute set $\Gamma$ inputted by the first information input part and the elements $k^*_0$ and $k^*_t$ generated by the decryption key generation part, as the decryption key $sk_s$.

9. An encryption device which generates encrypted data c in a cryptographic processing system which executes a cryptographic process using a basis $B_t$ and a basis $B^*_t$ for each integer t=0, . . . , d (d is an integer of 1 or more), the encryption device comprising:

a second information input part which takes as input, a variable $\rho(i)$ for each integer i=1, . . . , L (L is an integer of 1 or more), which is either one of a positive tuple (t, $\vec{v}_i$) and a negative tuple $\neg$ (t, $\vec{v}_i$) of identification information t (t is any one integer of t=1, . . . , d) and an attribute vector $\vec{v}_i:=(v_{i,i'})$ (i'=1, . . . , $n_t$ where $n_t$ is an integer of 1 or more), and a predetermined matrix M having L rows and r columns (r is an integer of 1 or more);

an encrypted data generation part which generates an element $c_0$, and an element $c_i$ for each integer i=1 . . . , L, based on a column vector $\vec{s}^T:=(s_1, \ldots, s_L)^T:=M \cdot \vec{f}^T$ generated based on a vector $\vec{f}$ and a vector $\vec{w}$ each having r pieces of elements, and the matrix M inputted by the second information input part; a value $s_0:=\vec{w} \cdot \vec{f}$; and a predetermined value $\theta_i$ (i=1, . . . , L), the encrypted data generation part being configured to generate the element $c_0$ by setting a value $-s_0$ as a coefficient for a basis vector $b^*_{0,p}$ (p is prescribed p) of a basis $B_0$ and by setting a predetermined value $\zeta$ as a coefficient for a basis vector $b_{0,q}$ (q is prescribed q), and to generate the element $c_i$ for each integer i=1, . . . , L, when the variable $\rho(i)$ is a positive tuple (t, $\vec{v}_i$), by setting $s_i+\theta_i v_{i,1}$ as a coefficient for a basis vector $b_{t,1}$ of the basis $B_t$ indicated by identification information t of the positive tuple, and by setting $\theta_i v_{i,i'}$ as a coefficient for a basis vector $b_{t,i'}$ indicated by the identification information t and each integer i'=2, . . . , $n_t$, and when the variable $\rho(i)$ is a negative tuple $\neg$ (t, $\vec{v}_i$), by setting $s_i v_{i,i'}$ as a coefficient for the basis vector $b_{t,i'}$ indicated by the identification information t of the negative tuple and by each integer i'=1, . . . , $n_t$; and a data output part which outputs the variable $\rho(i)$ inputted by the second information input part and the elements $c_0$ and $c_t$ generated by the encrypted data generation part, as the encrypted data c.

10. A decryption device which decrypts encrypted data c with a decryption key $sk_\Gamma$ in a cryptographic processing system which executes a cryptographic process using a basis $B_t$ and a basis $B^*_t$ for each integer t=0, . . . , d (d is an integer of 1 or more), the decryption device comprising:

a data acquisition part which acquires an element $c_0$ and an element $c_i$ (for each integer i=1 . . . , L) generated based on a column vector $\vec{s}^T:=(s_1, \ldots, s_L)^T:=M \cdot \vec{f}^T$ generated based on a vector $\vec{f}$ and a vector $\vec{w}$ each having r (r is an integer of 1 or more) pieces of elements, and a predetermined matrix M having L rows and r columns; a value $s_0:=\vec{w} \cdot \vec{f}$; a predetermined value $\theta_i$ (i=1, . . . , L); and a variable $\rho(i)$ for each integer i=1, . . . , L (L is an integer of 1 or more), together with the variable $\rho(i)$, the variable $\rho(i)$ being either one of a positive tuple (t, $\vec{v}_i$) and a negative tuple $\neg$ (t, $\vec{v}_i$), of identification information t (t is any integer of t=1, . . . , d) and an attribute vector $\vec{v}_i:=(v_{i,i'})$ (i'=1, . . . , $n_t$, $n_t$ is an integer of 1 or more), as the encrypted data c, the element $c_0$ being set with a value $-s_0$ as a coefficient for a basis vector $b_{0,p}$ (p is a predetermined value) of a basis $B_0$ and being set with a predetermined value $\zeta$ as a coefficient for a basis vector $b_{0,q}$ (q is a predetermined value different from prescribed p) of the basis $B_0$, and the element $c_i$ for each integer i=1, ..., L, when the variable ρ(i) is a positive tuple (t, $\vec{v}_i$), being set with $s_i + \theta_i v_{i,1}$ as a coefficient for a basis vector $b_{t,1}$ of the basis $B_t$ indicated by identification information t of the positive tuple, and being set with $\theta_i v_{i,i'}$ as a coefficient for a basis vector $b_{t,i'}$ indicated by the identification information t and by each integer i'=2, ..., $n_t$, and when the variable ρ(i) is a negative tuple ¬ (t, $\vec{v}_i$), being set with $s_i v_{i,i'}$ as a coefficient for the basis vector $b_{t,i'}$ indicated by the identification information t of the negative tuple and by each integer i'=1, ..., $n_t$;

a decryption key acquisition part which acquires an element $k^*_0$ generated based on an attribute set Γ having identification information t and an attribute vector $\vec{x}_t := (x_{t,i'})$ (i'=1, ..., $n_t$ where $n_t$ is an integer of 1 or more) for at least one integer t=1, ..., d, and an element $k^*_t$ (t is each integer included in the attribute set Γ), as the decryption key $sk_Γ$ together with the attribute set Γ, the element $k^*_0$ being set with a random value δ as a coefficient for a basis vector $b^*_{0,p}$ (p is prescribed p) of a basis $B^*_0$ and being set with a predetermined value κ as a coefficient for a basis vector $b^*_{0,q}$ (q is prescribed q) of the basis $B^*_0$, the element $k^*_t$ being set with $x_{t,i'}$ multiplied by the random value δ, as a coefficient for a basis vector $b^*_{t,i'}$ (i'=1, ..., $n_t$) of a basis $B^*_t$, for each identification information t included in the attribute set Γ;

a complementary coefficient calculation part which, based on the variable ρ(i) included in the encrypted data c acquired by the data acquisition part, and the attribute set Γ included in the decryption key $sk_s$ acquired by the decryption key acquisition part, specifies, among integers i=1, ..., L, a set I of an integer i for which the variable ρ(i) is a positive tuple (t, $\vec{v}_i$) and with which an inner-product of $\vec{v}_i$ of the positive tuple and $\vec{x}_t$ included in Γ indicated by identification information t of the positive tuple becomes 0, and an integer i for which the variable ρ(i) is a negative tuple ¬ (t, $\vec{v}_i$) and with which an inner-product of $\vec{v}_i$ of the negative tuple and $\vec{x}_t$ included in Γ indicated by identification information t of the negative tuple does not become 0; and calculates a complementary coefficient $α_i$ with which a total of $α_i s_i$ for i included in the set I specified becomes $s_0$; and a pairing operation part which calculates a value $K = g_T^{ζ·x}$ by conducting a pairing operation indicated in Formula 14 for the elements $c_0$ and $c_t$ included in the encrypted data c and the elements $k^*_0$ and $k^*_t$ included in the decryption key $sk_s$, based on the set I specified by the complementary coefficient calculation part and the complementary coefficient $α_i$ calculated by the complementary coefficient calculation part $$K := e(c_0, k^*_0) \cdot \prod_{i \in I \wedge \rho(i) = (t, \vec{v}_i)} e(c_t, k^*_t)^{\alpha_i} \cdot \prod_{i \in I \wedge \rho(i) = \neg(t, \vec{v}_i)} e(c_t, k^*_t)^{\alpha_i / (\vec{v}_i \cdot \vec{x}_i)}.$$ [Formula 14]

11. A signature processing system comprising a key generation device, a signature device, and a verification device, and serving to execute a signature process using a basis $B_t$ and a basis $B^*_t$ for each integer t=1, ..., d, d+2 (d is an integer of 1 or more), wherein the key generation device includes a first information input part which takes as input, an attribute set Γ having identification information t and an attribute vector $\vec{x}_t := (x_{t,i'})$ (i'=1, ..., $n_t$ where $n_t$ is an integer of 1 or more) for at least one integer t=1, ..., d, and a signature key generation part which generates an element $k^*_t$ concerning each identification information t included in the attribute set Γ, and an element $k^*_{d+2}$ and an element $k^*_{d+3}$ based on the attribute set Γ inputted by the first information input part, the signature key generation part being configured to generate the element $k^*_t$ where $x_{t,i'}$ multiplied by a random value δ is set as a coefficient for a basis vector $b^*_{t,i'}$ (i'=1, ..., $n_t$) of the basis $B^*_t$, for each identification information t included in the attribute set Γ, to generate the element $k^*_{d+2}$ where the random value δ is set as a coefficient for a basis vector $b^*_{d+2,p'}$ (p' is a predetermined value) of a basis $B^*_{d+2}$, and to generate the element $k^*_{d+3}$ where the random value δ is set as a coefficient for a basis vector $b^*_{d+2,q'}$ (q' is a predetermined value different from prescribed p') of the basis $B^*_{d+2}$, wherein the signature device includes a second information input part which takes as input, a variable ρ(i) for each integer i=1, ..., L (L is an integer of 1 or more), which is either one of a positive tuple (t, $\vec{v}_i$) and a negative tuple ¬ (t, $\vec{v}_i$) of identification information t (t is any one integer of t=1, ..., d) and an attribute vector $\vec{v}_i := (v_{i,i'})$ (i'=1, ..., $n_t$ where $n_t$ is an integer of 1 or more), a predetermined matrix M having L rows and r columns (r is an integer of 1 or more), and a message m, a signature key acquisition part which acquires the elements $k^*_t$, $k^*_{d+2}$, and $k^*_{d+3}$ generated by the signature key generation part, and the attribute set Γ, as a signature key $sk_Γ$, a complementary coefficient calculation part which, based on the variable ρ(i) for each integer i=1, ..., L and the attribute set Γ included in the signature key $sk_Γ$ acquired by the signature key acquisition part, specifies, among integers i=1, ..., L, a set I of an integer i for which the variable ρ(i) is a positive tuple (t, $\vec{v}_i$) and with which an inner-product of $\vec{v}_i$ of the positive tuple and $\vec{x}_t$ included in Γ indicated by identification information t of the positive tuple becomes 0, and an integer i for which the variable ρ(i) is a negative tuple ¬ (t, $\vec{v}_i$) and with which an inner-product of $\vec{v}_i$ of the negative tuple and $\vec{x}_t$ included in Γ indicated by the identification information t of the negative tuple does not become 0; and calculates a complementary coefficient $α_i$ with which a total of $α_i M_i$ for i included in the set I specified, based on $M_i$ which is an element on an i-th row of the matrix M inputted by the second information input part, becomes a predetermined vector $\vec{w}$, and a signature generation part which, based on the variable ρ(i), the attribute set Γ, the set I specified by the complementary coefficient calculation part, and the complementary coefficient $α_i$ calculated by the complementary coefficient calculation part, generates $s^*_i$ for each integer i=1, ..., L representing each row number of the matrix M, and $s^*_x$, as indicated in Formula 15, where $β_i$ is a value with which every element becomes 0 when $β_i M_i$ is totaled for each integer i representing each row number of the matrix M, and for each integer i representing each row number of the matrix M, when i∈I is established and the variable ρ(i) is a positive tuple (t, $\vec{v}_i$), let a value $\gamma_i := \alpha_i$, and let a vector $\vec{y}_i := (y_{i,\iota})$ (ι:=1, ..., $n_t$) be a vector with which an inner-product of $\vec{y}_i$ and $\vec{v}_i$ is 0 and $y_{i,1}=1$, when i∈I is established and the variable ρ(i) is a negative tuple ¬ (t, $\vec{v}_i$), let a value $\gamma_i := \alpha_i/(\vec{v}_i \cdot \vec{x}_i)$, and let a vector $\vec{y}_i := (y_{i,\iota})$ (ι:=1, ..., $n_t$) be a vector with which an inner-product of $\vec{y}_i$ and $\vec{v}_i$ is 1, when i∈I is not established and the variable ρ(i) is a positive tuple z,254 (t, $\vec{v}_i$), let a value $\gamma_i := 0$, and let a vector $\vec{y}_i := (y_{i,\iota})$ (ι:=1, ..., $n_t$) be a vector with which an inner-product of $\vec{y}_i$ and $\vec{v}_i$ is 0 and $y_{i,1}=1$, and when i∈I is not established and the variable ρ(i) is a negative tuple ¬ (t, $\vec{v}_i$), let a value $\gamma_i := 0$, and let a vector $\vec{y}_i := (y_{i,\iota})$ (ι:=1, ..., $n_t$) be a vector with which an inner-product of $\vec{y}_i$ and is 1, and wherein the verification device includes a data acquisition part which acquires signature data sig including $s^*_i$ and $s^*_x$ generated by the signature generation part, the message m, the variable ρ(i), and the matrix M, an encrypted data generation part which generates an element $c_i$ and an element $c_x$, the element $c_i$ being generated for each integer i representing a row number of the matrix M, based on a column vector $\vec{s}^T := (s_1, \ldots, s_L)^T := M \cdot \vec{f}^T$ generated based on a vector $\vec{f}$ having r pieces of elements, the vector $\vec{w}$, and the matrix M acquired by the data acquisition part; a value $s_0 = \vec{w} \cdot \vec{f}^T$; and a predetermined value $\theta_i$ (i is each row number of the matrix M, and X), the encrypted data generation part being configured to generate the element $c_i$ for each integer i=1 representing a row number of the matrix M, when the variable ρ(i) is a positive tuple (t, $\vec{v}_i$), by setting $s_i + \theta_i v_{i,1}$ as a coefficient for a basis vector $b_{t,1}$ of the basis $B_t$ indicated by identification information t of the positive tuple, and by setting $\theta_i v_{i,i'}$ as a coefficient for a basis vector $b_{t,i'}$ indicated by the identification information t and each integer i'=2, ..., $n_t$, and when the variable ρ(i) is a negative tuple ¬ (t, $\vec{v}_i$) by setting $s_i v_{i,i'}$ as a coefficient for the basis vector $b_{t,i'}$ indicated by the identification information t of the negative tuple and each integer i'=1, ..., $n_t$, and to generate the element $c_x$ by setting $s_0 - \theta_x m$ in a basis vector $b_{d+2,p'}$ (p' is prescribed p') of a basis vector $B_{d+2}$ and by setting $\theta_x$ in a basis vector $b_{d+2,q'}$ (q' is prescribed q') of the basis vector $B_{d+2}$, and a pairing operation part which verifies validity of the signature data sig by performing a pairing operation indicated in Formula 16 for each integer i indicating X and a row number of the matrix M $$s_i^* := \gamma_i \xi k_t^* + \beta_i (\Sigma_{\iota=1}^{n_t} y_{i,\iota} \cdot b_{t,\iota}^*) + r_i^*$$

$$s_X^* := \xi(k_{d+2}^* + m \cdot k_{d+3}^*) + r_X^* \quad \text{[Formula 15]}$$

where
ξ, $r_i^*$, and $r_X^*$ are predetermined values.

$$\Pi e(c_i, s_i^*). \quad \text{[Formula 16]}$$

12. The signature processing system according to claim 11, which executes the signature process using a basis $B_0$ having at least a basis vector $b_{0,i}$ (i=1, ..., 4), a basis $B_t$ (t=1, ..., d) having at least a basis vector $b_{t,i}$ (i=1, ..., $n_t$, ..., $n_t+u_t$, ..., $n_t+u_t+w_t$, ..., $n_t+u_t+w_t+z_t$) ($u_t$, $w_t$, and $z_t$ are each an integer of 1 or more), a basis $B_{d+1}$ having at least a basis vector $b_{d+1,i}$ (i=1, ..., 4), a basis $B_{d+2}$ having at least a basis vector $b_{d+2,i}$ (i=1, ..., 8), a basis $B^*_0$ having at least a basis vector $b^*_{0,i}$ (i=1, ..., 4), a basis $B^*_t$ (t=1, ..., d) having at least a basis vector $b^*_{t,i}$ (i=1, ..., $n_t$, ..., $n_t+u_t$, ..., $n_t+u_t+w_t$, ..., $n_t+u_t+w_t+z_t$), a basis $B^*_{d+1}$ having at least a basis vector $b^*_{d+1,i}$ (i=1, ..., 4), and the basis $B^*_{d+2}$ having at least a basis vector $b^*_{d+2,i}$ (i=1, ..., 8), wherein the signature key generation part of the key generation device generates an element $k^*_0$, an element $k^*_t$, an element $k^*_{d+2}$, and an element $k^*_{d+3}$, for each identification information t included in the attribute set Γ and each integer ι=1, ..., $w_t$, based on random values δ, $\phi_0$, $\phi_{t,\iota}, \phi_{d+2,1}, \phi_{d+2,2}, \phi_{d+3,1}$, and $\phi_{d+3,2}$, as indicated in Formula 17, wherein the signature device further includes a matrix generation part which adds a predetermined row vector $M_{L+1}$ to an (L+1)th row of the matrix M, wherein the signature generation part of the signature device generates $s^*_i$ for each integer i=1, ..., L+1, and $s^*_0$ and $s^*_{L+2}$ as $s^*_x$, based on the elements $k^*_0$, $k^*_t$, $k^*_{d+2}$, and $k^*_{d+3}$, and the random value ξ as indicated in Formula 18, wherein the encrypted data generation part of the verification device generates an element $c_i$, and elements $c_0$ and $c_{L+2}$ as an element $c_x$, for each integer i=1, ..., L+1 and each integer i'=1, ..., $z_t$, based on random values $\theta_i$, $\eta_{i,i'}$, $\eta_{L+2,1}$, and $\eta_{L+2,2}$, as indicated in Formula 19, and wherein the pairing operation part performs the pairing operation for each integer i=0, ..., L+2

$$k_0^* := (\delta, 0, \phi_0, 0)_{\mathbb{B}_0^*} \quad \text{[Formula 17]}$$

$$k_t^* := (\overbrace{\delta(x_{t,1}, \ldots, x_{t,n_t})}^{n_t}, \overbrace{0^{u_t}}^{u_t}, \overbrace{\phi_{t,1}, \ldots, \phi_{t,w_t}}^{w_t}, \overbrace{0^{z_t}}^{z_t})_{\mathbb{B}_t^*}$$

$$k_{d+2}^* := (\delta(1, 0), 0, 0, \phi_{d+2,1}, \phi_{d+2,2}, 0, 0)_{\mathbb{B}_{d+2}^*}$$

$$k_{d+3}^* := (\delta(0, 1), 0, 0, \phi_{d+3,1}, \phi_{d+3,2}, 0, 0)_{\mathbb{B}_{d+2}^*}$$

$$s_0^* := \xi k_0^* + r_0^*$$

$$s_i^* := \gamma_i \xi k_t^* + \beta_i (\Sigma_{\iota=1}^{n_t} y_{i,\iota} \cdot b_{t,\iota}^*) + r_i^*$$

$$s_{L+2}^* := \xi(k_{d+2}^* + m \cdot k_{d+3}^*) + r_{L+2}^* \quad \text{[Formula 18]}$$

where
ξ, $r_0^*$, $r_i^*$ and $r_{L+2}^*$ are predetermined values $$c_0 := (-s_0 - s_{L+2}, 0, 0, \eta_0)_{\mathbb{B}_0} \quad \text{[Formula 19]}$$

if $\rho(i) = (t, \vec{v}_i := (v_{i,1}, \ldots, v_{i,n_t}) \in \mathbb{F}_q^{n_t})$, $$\eta_{i,1}, \ldots, \eta_{i,z_t} \xleftarrow{U} \mathbb{F}_q,$$

$$c_i := (\overbrace{(s_i + \theta_i v_{i,1}, \theta_i v_{i,2}, \ldots, \theta_i v_{i,n_t}}^{n_t},$$
$$\overbrace{0^{u_t}}^{u_t}, \overbrace{0^{w_t}}^{w_t}, \overbrace{\eta_{i,1}, \ldots, \eta_{i,z_t}}^{z_t})_{\mathbb{B}_t},$$

if $\rho(i) = \neg (t, \vec{v}_i := (v_{i,1}, \ldots, v_{i,n_t}) \in \mathbb{F}_q^{n_t})$, $$\eta_{i,1}, \ldots, \eta_{i,z_t} \xleftarrow{U} \mathbb{F}_q,$$

$$c_i := (\overbrace{s_i(v_{i,1}, \ldots, v_{i,n_t})}^{n_t}, \overbrace{0^{u_t}}^{u_t}, \overbrace{0^{w_t}}^{w_t}, \overbrace{\eta_{i,1}, \ldots, \eta_{i,z_t}}^{z_t})_{\mathbb{B}_t},$$

$$c_{L+2} := (s_{L+2} - \theta_{L+2} m, \theta_{L+2}, 0, 0, 0, 0, \eta_{L+2,1}, \eta_{L+2,2})_{\mathbb{B}_{d+2}}.$$

13. A key generation device which generates a signature key $sk_\Gamma$ in a signature processing system which executes a signature process using a basis $B_t$ and a basis $B^*_t$ for each integer t=1, ..., d, d+2 (d is an integer of 1 or more), the key generation device comprising:
a first information input part which takes as input, an attribute set $\Gamma$ having identification information t and an attribute vector $\vec{x}_t:=(x_{t,i'})$ (i'=1, ..., $n_t$ where $n_t$ is an integer of 1 or more) for at least one integer t=1, ..., d;
a signature key generation part which generates an element $k^*_t$, an element $k^*_{d+2}$, and an element $k^*_{d+3}$ based on the attribute set $\Gamma$ inputted by the first information input part, the element $k^*_t$ concerning each identification information t included in the attribute set $\Gamma$, the signature key generation part being configured
to generate the element $k^*_t$ where $x_{t,i'}$ multiplied by the random value $\delta$ is set as a coefficient for a basis vector $b^*_{t,i'}$ (i'=1, ..., $n_t$) of a basis $B^*_t$, for each identification information t included in the attribute set $\Gamma$,
to generate the element $k^*_{d+2}$ where the random value $\delta$ is set as a coefficient for a basis vector $b^*_{d+2,p'}$ (p' is a predetermined value) of a basis $B^*_{d+2}$, and
to generate the element $k^*_{d+3}$ where the random value $\delta$ is set as a coefficient for a basis vector $b^*_{d+2,q'}$ (q' is a predetermined value different from prescribed p') of the basis $B^*_{d+2}$; and
a key distribution part which distributes data including the attribute set $\Gamma$ inputted by the information input part and the elements $k^*_t$, $k^*_{d+2}$, and $k^*_{d+3}$, as the signature key $sk_\Gamma$.

14. A signature device which generates signature data sig in a signature processing system which executes a signature process using a basis $B_t$ and a basis $B^*_t$ for each integer t=1, ..., d, d+2 (d is an integer of 1 or more), the signature device comprising:
a second information input part which takes as input, a variable $\rho(i)$ for each integer i=1, ..., L (L is an integer of 1 or more), which is either one of a positive tuple (t, $\vec{v}_i$) and a negative tuple $\neg$ (t, $\vec{v}_i$) of identification information t (t is any one integer of t=1, ..., d) and an attribute vector $\vec{v}_i:=(v_{i,i'})$(i'=1, ..., $n_t$ where $n_t$ is an integer of 1 or more), a predetermined matrix M having L rows and r columns (r is an integer of 1 or more), and a message m;
a signature key acquisition part which acquires an element $k^*_t$, an element $k^*_{d+2}$, and an element $k^*_{d+3}$ generated for at least one integer t=1, ..., d, based on an attribute set $\Gamma$ having identification information t and an attribute vector $\vec{x}_t:=(x_{t,i'})$ (i'=1, ..., $n_t$ where $n_t$ is an integer of 1 or more) (t is each identification information included in the attribute set $\Gamma$), together with the attribute set $\Gamma$, as a signature key $sk_\Gamma$, the signature key acquisition part being configured
to generate the element $k^*_t$ being set with $x_{t,i'}$ multiplied by the random value $\delta$ as a coefficient for a basis vector $b^*_{t,i'}$ (i'=1, ..., $n_t$) of a basis $B^*_t$, for each identification information t included in the attribute set $\Gamma$,
to generate the element $k^*_{d+2}$ being set with the random value $\delta$ as a coefficient for a basis vector $b^*_{d+2,p'}$ (p' is a predetermined value) of a basis $B^*_{d+2}$, and
to generate the element $k^*_{d+3}$ being set with the random value $\delta$ as a coefficient for a basis vector $b^*_{d+2,q'}$ (q' is a predetermined value different from prescribed p') of the basis $B^*_{d+2}$;
a complementary coefficient calculation part which, based on the variable $\rho(i)$ for each integer i=1, ..., L and the attribute set $\Gamma$ included in the signature key $sk_\Gamma$ acquired by the signature key acquisition part, specifies, among integers i=1, ..., L, a set I of an integer i for which the variable $\rho(i)$ is a positive tuple (t, $\vec{v}_i$) and with which an inner-product of $\vec{v}_i$ of the positive tuple and $\vec{x}_t$ included in $\Gamma$ indicated by identification information t of the positive tuple becomes 0, and an integer i for which the variable $\rho(i)$ is a negative tuple $\neg$ (t, $\vec{v}_i$) and with which an inner-product of $\vec{v}_i$ of the negative tuple and $\vec{x}_t$ included in $\Gamma$ indicated by the identification information t of the negative tuple does not become 0; and calculates a complementary coefficient $\alpha_i$ with which a total of $\alpha_i M_i$ for i included in the set I specified, based on $M_i$ which is an element on an i-th row of the matrix M inputted by the second information input part, becomes a predetermined vector $\vec{w}$;
a signature generation part which, based on the variable $\rho(i)$, the attribute set $\Gamma$, the set I specified by the complementary coefficient calculation part, and the complementary coefficient $\alpha_i$ calculated by the complementary coefficient calculation part, generates $s^*_i$ for each integer i representing each row number of the matrix M, and $s^*_x$, as indicated in Formula 20, where
$\beta_i$ is a value with which every element becomes 0 when $\beta_i M_i$ is totaled for each integer i representing each row number of the matrix M, and
for each integer i representing each row number of the matrix M,
when i∈I is established and the variable $\rho(i)$ is a positive tuple (t, $\vec{v}_i$), let a value $\gamma_i:=\alpha_i$, and let a vector $\vec{y}_i:=(y_{i,\iota})$ ($\iota$:=1, ..., $n_t$) be a vector with which an inner-product of $\vec{y}_i$ and $\vec{v}_i$ is 0 and $y_{i,1}$=1,
when i∈I is established and the variable $\rho(i)$ is a negative tuple $\neg$ (t, $\vec{v}_i$), let a value $\gamma_i:=\alpha_i/(\vec{v}_i \cdot \vec{x}_t)$, and let a vector $\vec{y}_i:=(y_{i,\iota})$ ($\iota$:=1, ..., $n_t$) be a vector with which an inner-product of $\vec{y}_i$ and $\vec{v}_i$ is 1,
when i∈I is not established and the variable $\rho(i)$ is a positive tuple (t, $\vec{v}_i$), let a value $\gamma_i:=0$, and let a vector $\vec{y}_i:=(y_{i,\iota})$ ($\iota$:=1, ..., $n_t$) be a vector with which an inner-product of $\vec{y}_i$ and $\vec{v}_i$ is 0 and $y_{i,1}$=1, and
when i∈I is not established and the variable $\rho(i)$ is a negative tuple $\neg$ (t, $\vec{v}_i$), let a value $\gamma_i:=0$, and let a vector $\vec{y}_i:=(y_{i,\iota})$ ($\iota$:=1, ..., $n_t$) be a vector with which an inner-product of $\vec{y}_i$ and $\vec{v}_i$ is 1; and
a data output part which outputs data including the variable $\rho(i)$, the matrix M, and the message m which are inputted by the information input part, and $s^*_0$, $s^*_i$, and $s^*_x$ generated by the signature generation part, as signature data sig $$s_i^* := \gamma_i \cdot \xi k_t^* + \beta_i \cdot (\Sigma_{\iota=1}^{n_t} y_{i,\iota} \cdot b_{t,\iota}^*) + r_i^*$$

$$s_{X^*} := \xi(k_{d+2}^* + m \cdot k_{d+3}^*) + r_X^* \quad \text{[Formula 20]}$$

where
$\xi$, $r_i^*$, and $r_X^*$ are predetermined values.

15. A verification device which verifies signature data sig in a signature processing system which executes a signature process using a basis $B_t$ and a basis $B^*_t$ for each integer t=1, ..., d, d+2 (d is an integer of 1 or more), the verification device comprising:
a data acquisition part which acquires the signature data sig including $s^*_i$, $s^*_x$, a message M, a variable number $\rho(i)$, and a matrix M, out of: elements $k^*_t$, $k^*_{d+2}$, $k^*_{d+3}$; a set I and a complementary coefficient $\alpha_i$; and $S^*_i$ and $S^*_x$;
wherein the elements $k^*_t$, $k^*_{d+2}$, and $k^*_{d+3}$ are generated for at least one integer t=1, ..., d, based on an attribute set $\Gamma$ having identification information t and an attribute vector $\vec{y}_t:=(x_{t,i'})$ (i'=1, ..., $n_t$ where $n_t$ is an integer of 1 or more) (t is each identification information included in the attribute set $\Gamma$),
the element $k^*_t$ being set with $x_{t,i'}$ multiplied by the random value $\delta$, as a coefficient for a basis vector $b^*_{t,i'}$ (i'=1, ...

, $n_t$) of a basis $B^*_t$, for each identification information t included in the attribute set Γ, the element $k^*_{d+2}$ being set with the random value δ, as a coefficient for a basis vector $b^*_{d+2,p'}$ (p' is a predetermined value) of a basis $B^*_{d+2}$, and the element $k^*_{d+3}$ being set with the random value δ, as a coefficient for a basis vector $b^*_{d+2,q'}$ (q' is a predetermined value different from prescribed p') of the basis $B^*_{d+2}$, wherein the set I and the complementary coefficient $\alpha_i$ are calculated based on a variable ρ(i) for each integer i=1, . . . , L (L is an integer of 1 or more), which is either one of a positive tuple (t, $\vec{v}_i$) and a negative tuple ¬ (t, $\vec{v}_i$) of identification information t (t is any one integer of t=1, . . . , d) and an attribute vector $\vec{v}_i := (v_{i,i'})$ (i'=1, . . . , $n_t$ where $n_t$ is an integer of 1 or more), and based on the attribute set Γ, the set I being a set of, among integers i=1, . . . , L, an integer i for which the variable ρ(i) is a positive tuple (t, $\vec{v}_i$) and with which an inner-product of $\vec{v}_i$ of the positive tuple and $\vec{x}_t$ included in Γ indicated by the identification information t of the positive tuple becomes 0, and an integer i for which the variable ρ(i) is a negative tuple ¬ (t, $\vec{v}_i$) and with which an inner-product of $\vec{v}_i$ the negative tuple and $\vec{x}_t$ included in Γ indicated by the identification information t of the negative tuple does not become 0, the complementary coefficient $\alpha_i$ being such that with which a total of $\alpha_i M_i$ for i included in the set I, based on $M_i$ which is an element on an i-th row of the matrix M inputted, becomes a predetermined vector $\vec{w}$, and wherein $s^*_i$ (each integer of i=1, . . . , L) and $s^*_x$ are generated based on the variable ρ(i), the attribute set Γ, the set I, and the complementary coefficient $\alpha_i$, as indicated in Formula 21, where $\beta_i$ is a value with which every element becomes 0 when $\beta_i M_i$ is totaled for each integer i representing each row number of the matrix M, and for each integer i representing each row number of the matrix M, when i∈I is established and the variable ρ(i) is a positive tuple (t, $\vec{v}_i$), let a value $\gamma_i := \alpha_i$, and let a vector $\vec{y}_i := (y_{i,\iota})$ (ι=1, . . . , $n_t$) be a vector with which an inner-product of $\vec{y}_i$ and $\vec{v}_i$ is 0 and $y_{i,1}=1$, when i∈I is established and the variable ρ(i) is a negative tuple ¬ (t, $\vec{v}_i$), let a value $\gamma_i := \alpha_i/(\vec{v}_i \cdot \vec{x}_t)$, and let a vector $\vec{y}_i := (y_{i,\iota})$ (ι=1, . . . , $n_t$) be a vector with which an inner-product of $\vec{y}_i$ and $\vec{v}_i$ is 1, when i∉I is not established and the variable ρ(i) is a positive tuple (t, $\vec{v}_i$), let a value $\gamma_i := 0$, and let a vector $\vec{y}_i := (y_{i,\iota})$ (ι=1, . . . , $n_t$) be a vector with which an inner-product of $\vec{y}_i$ and $\vec{v}_i$ is 0 and $y_{i,1}=1$, and when i∉I is not established and the variable ρ(i) is a negative tuple ¬ (t, $\vec{v}_i$), let a value $\gamma_i := 0$, and let a vector $\vec{y}_i := (y_{i,\iota})$ (ι=1, . . . , $n_t$) be a vector with which an inner-product of $\vec{y}_i$ and $\vec{v}_i$ is 1;

an encrypted data generation part which generates an element $c^i$ and an element $c_x$, the element $c_i$ being generated for each integer i=1, . . . , L, based on a column vector $\vec{s}^T := (s_i, \ldots, s_L)^T := M \cdot \vec{f}^T$ generated based on a vector $\vec{f}$ having r pieces of elements, the vector $\vec{W}$, and the matrix M inputted by the data acquisition part; a value $s_0 := \vec{w} \cdot \vec{f}^T$; and a predetermined value $\theta_i$ (i is each row number of the matrix M, and X), the encrypted data generation part being configured to generate the element $c_i$, for each integer i=1 representing a row number of the matrix M, when the variable ρ(i) is a positive tuple (t, $\vec{v}_i$), by setting $s_i + \theta_i v_{i,1}$ as a coefficient for a basis vector $b_{t,1}$ of the basis $B_t$ indicated by identification information t of the positive tuple, and by setting $\theta_i v_{i,i'}$ as a coefficient for a basis vector $b_{t,i'}$ indicated by the identification information t and each integer i'=2, . . . , $n_t$, and when the variable ρ(i) is a negative tuple ¬ (t, $\vec{v}_i$), by setting $s_i v_{i,i'}$ as a coefficient for the basis vector $b_{t,i'}$ indicated by the identification information t of the negative tuple and each integer i'=1, . . . , $n_t$, and to generate the element $c_x$ by setting $s_0 - \theta_x m$ in a basis vector $b_{d+2,p'}$ ('p is prescribed p') of a basis vector $B_{d+2}$ and by setting $\theta_x$ in a basis vector $b_{d+2,q'}$ ('q is prescribed q') of the basis vector $B_{d+2}$; and a pairing operation part which verifies validity of the signature data sig by performing a pairing operation indicated in Formula 22 for each integer i indicating X and a row number of the matrix M $s_i^* := \gamma_i \cdot \xi k_t^* + \beta_i \cdot (\Sigma_{\iota=1}^{n_t} y_{i,\iota} \cdot b_{t,\iota}^*) + r_i^*$ $s_X^* := \xi(k_{d+2}^* + m \cdot k_{d+3}^*) + r_X^*$  [Formula 21]

where

ξ, $r_i^*$ and $r_X^*$ are predetermined values $\Pi e(c_i, s_i^*)$.  [Formula 22]

* * * * *